US012662305B2

(12) United States Patent
Ford, III

(10) Patent No.: US 12,662,305 B2
(45) Date of Patent: Jun. 23, 2026

(54) LATERALLY COMBINABLE MULTIPURPOSE RELOCATABLE STRUCTURES

(71) Applicant: Irish Dawg Industries, LLC, Stuart, FL (US)

(72) Inventor: Harry Ralph Ford, III, Stuart, FL (US)

(73) Assignee: Irish Dawg Industries, LLC, Stuart, FL (US)

( * ) Notice: Subject to any disclaimer, the term of this patent is extended or adjusted under 35 U.S.C. 154(b) by 0 days.

(21) Appl. No.: 18/900,096

(22) Filed: Sep. 27, 2024

(65) Prior Publication Data

US 2025/0019153 A1      Jan. 16, 2025

Related U.S. Application Data

(63) Continuation of application No. 18/316,827, filed on May 12, 2023, now Pat. No. 12,151,877, which is a
(Continued)

(51) Int. Cl.
B65D 88/12          (2006.01)
B65D 88/74          (2006.01)
(Continued)

(52) U.S. Cl.
CPC ......... B65D 88/121 (2013.01); B65D 88/745 (2013.01); B65D 90/008 (2013.01);
(Continued)

(58) Field of Classification Search
CPC .. B65D 88/121; B65D 88/745; B65D 90/008; B65D 90/00; B65D 90/10; B65D 88/12;
(Continued)

(56) References Cited

U.S. PATENT DOCUMENTS 2,499,498 A      3/1950  Hammond, Jr.
3,553,823 A      1/1971  Torsten
(Continued)

FOREIGN PATENT DOCUMENTS

CA          2854516          5/2015
DE      202009002015 U1      8/2010
(Continued)

*Primary Examiner* — Robert L Deberadinis
(74) *Attorney, Agent, or Firm* — Thomas | Horstemeyer, LLP

(57)          ABSTRACT

Multipurpose relocatable structures that are, in various embodiments, substantially in the shape of an elongated rectangular prism having a length that is greater than its width. In various embodiments: (1) the plurality of walls comprise a first lateral side wall and a second lateral side wall; (2) the first and second lateral side walls are disposed so that they are co-facing and at least substantially parallel to and spaced apart from each other; (3) the first lateral side wall comprises a first access opening that is sized to permit an adult human to walk through the first access opening in an upright orientation; (4) the second lateral side wall comprises a second access opening that is sized to permit an adult human to walk through the second access opening in an upright orientation; and (5) the first and second access openings are co-facing and spaced apart from each other.

25 Claims, 42 Drawing Sheets

Related U.S. Application Data continuation of application No. 17/521,272, filed on Nov. 8, 2021, now Pat. No. 11,655,098, which is a continuation of application No. 17/214,063, filed on Mar. 26, 2021, now Pat. No. 11,167,915.

(51) Int. Cl.

| | | |
|---|---|---|
| *B65D 90/00* | (2006.01) | |
| *B65D 90/10* | (2006.01) | |
| *H01M 50/20* | (2021.01) | |
| *E04H 1/12* | (2006.01) | |
| *H02B 1/26* | (2006.01) | |

(52) U.S. Cl.

CPC ............ *B65D 90/10* (2013.01); *H01M 50/20* (2021.01); *E04H 2001/1283* (2013.01); *H02B 1/26* (2013.01)

(58) Field of Classification Search

CPC ......... B65D 88/74; H01M 50/20; H02B 1/26; E04H 2001/1283; E04H 1/12

See application file for complete search history.

(56) References Cited

U.S. PATENT DOCUMENTS

| | | | |
|---|---|---|---|
| 3,623,296 | A | 11/1971 | Joseph |
| 3,754,516 | A | 8/1973 | Van Gompel |
| 3,963,290 | A | 6/1976 | Rennemann |
| 4,049,149 | A | 9/1977 | Durenec |
| 4,305,505 | A | 12/1981 | Hickey |
| 4,521,941 | A | 6/1985 | Gerhard |
| 4,766,708 | A | 8/1988 | Sing |
| 4,875,814 | A | 10/1989 | Weller |
| 4,910,932 | A | 3/1990 | Honigman |
| 5,072,845 | A | 12/1991 | Grogan |
| 5,171,113 | A | 12/1992 | Hove |
| 5,706,614 | A | 1/1998 | Wiley, Jr. et al. |
| 6,105,511 | A | 8/2000 | Bridges |
| 6,220,468 | B1 | 4/2001 | Lee |
| 6,926,482 | B2 | 8/2005 | Gohlke |
| 6,957,613 | B2 | 10/2005 | Taylor et al. |
| 7,185,779 | B2 | 3/2007 | Payne |
| 7,507,061 | B2 | 3/2009 | Wells et al. |
| D625,529 | S | 10/2010 | Grainger |
| 7,823,338 | B2 * | 11/2010 | Slagel .................. E04H 1/1205 52/33 |
| 8,066,134 | B2 | 11/2011 | Davidson |
| 8,157,491 | B2 | 4/2012 | Pavlov |
| 8,556,112 | B2 | 10/2013 | Tujague, Sr. et al. |
| 8,763,314 | B2 | 7/2014 | Yoo |
| 8,881,934 | B2 | 11/2014 | Tujague, Sr. et al. |
| 9,422,083 | B1 | 8/2016 | Embleton et al. |
| 9,499,334 | B2 | 11/2016 | Aldo |
| 9,617,748 | B2 | 4/2017 | Wilson et al. |
| 9,738,402 | B2 | 8/2017 | Brown |
| 9,966,739 | B2 | 5/2018 | Chen et al. |
| 10,340,697 | B2 | 7/2019 | Paine et al. |
| 10,549,908 | B2 | 2/2020 | Kochanowski |
| 10,704,251 | B1 | 7/2020 | Rubler |
| 10,865,040 | B2 | 12/2020 | Oltman et al. |
| 11,254,494 | B2 | 2/2022 | Ford, III |
| 11,274,446 | B2 | 3/2022 | Wakiyama et al. |
| 11,440,660 | B1 | 9/2022 | Karni |
| D1,001,716 | S | 10/2023 | Buscema |
| 2005/0193643 | A1 | 9/2005 | Pettus |
| 2007/0056967 | A1 | 3/2007 | Dobrinski et al. |
| 2009/0032530 | A1 | 2/2009 | Chu |
| 2009/0084800 | A1 | 4/2009 | Hartley et al. |
| 2010/0089917 | A1 | 4/2010 | Gilbert et al. |
| 2010/0147842 | A1 | 6/2010 | Reynard et al. |
| 2010/0191615 | A1 | 7/2010 | Thomas |
| 2012/0006369 | A1 | 1/2012 | Cantin et al. |
| 2018/0050862 | A1 | 2/2018 | Wu et al. |
| 2018/0237216 | A1 | 8/2018 | Saer |
| 2020/0154596 | A1 | 5/2020 | Roy |
| 2021/0198888 | A1 | 7/2021 | Unger |

FOREIGN PATENT DOCUMENTS

| | | | |
|---|---|---|---|
| DE | 202013012030 | U1 | 12/2014 |
| DE | 102017111609 | B3 | 10/2018 |
| FR | 1291776 | A | 4/1962 |
| GB | 2415444 | A | 12/2005 |
| WO | 2007090061 | A2 | 8/2007 |
| WO | 2009105050 | A1 | 8/2009 |
| WO | 2014128120 | A2 | 8/2014 |

* cited by examiner

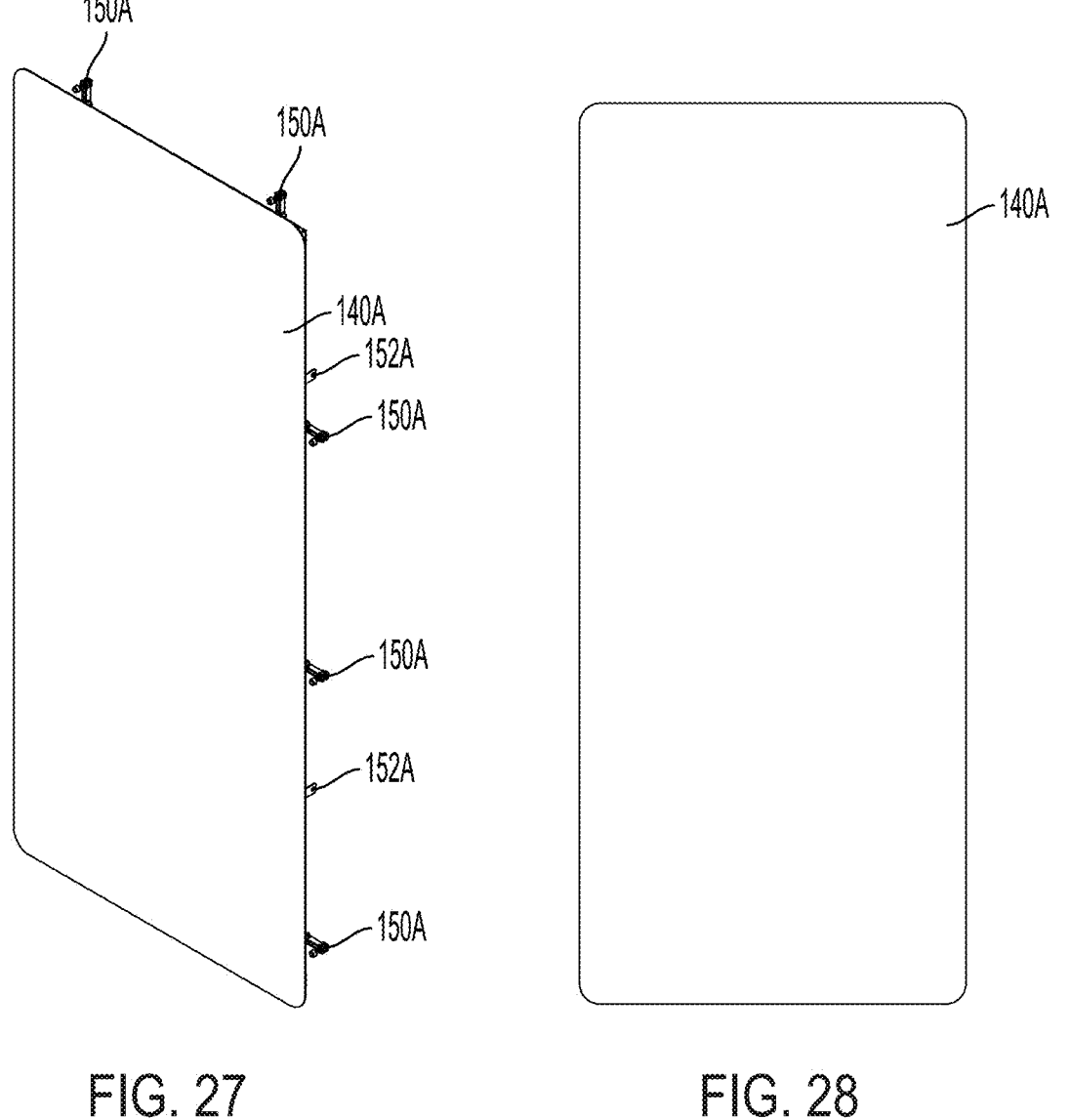
FIG. 27                    FIG. 28

SEE FIG. 31

LATERALLY COMBINABLE MULTIPURPOSE RELOCATABLE STRUCTURES

CROSS-REFERENCE TO RELATED APPLICATIONS

This application is a continuation of U.S. patent application Ser. No. 18/316,827, filed May 12, 2023, which is a continuation of U.S. patent application Ser. No. 17/521,272, filed Nov. 8, 2021, now U.S. Pat. No. 11,655,098, issued May 23, 2023, which is a continuation of U.S. patent application Ser. No. 17/214,063, filed Mar. 26, 2021, now U.S. Pat. No. 11,167,915, issued Nov. 9, 2021. The disclosures of all of the above patents and patent applications are hereby incorporated herein by reference in their entirety.

BACKGROUND

Standardized shipping containers are commonly used throughout the world for shipping goods and cargo. These containers are referred to as ISO (International Organization for Standardization) containers, and intermodal freight containers, among other names. Shipping containers are typically configured in standard sizes, including 10-feet, 20-feet, and 40-feet in length.

Military use of containers is common and often a critical component of fast and efficient mobilization, as well as of sustained operations at deployed locations. There is a need for military, humanitarian, and other organizations to be able to ship equipment all over the world by sea, land, and rail, and to use these containers and the equipment within to set up mobile or temporary operations quickly and effectively. Military and commercial users have therefore adapted the ISO container for uses beyond storage. However, this design is limited by its dimensions, specialized lifting and moving requirements, and especially in the military context, the price of ISO-derivative designs. There is a need for a reasonably priced mobile structure in a size between the ISO 10 and 20-foot container footprint that is pre-configurable for virtually any use and easily deployable.

In addition, there is a need for modular multipurpose relocatable structures that may be easily transported using conventional military and commercial infrastructure where the structures may be selectively assembled to create larger structures.

Various embodiments of the present multipurpose relocatable structure and methods recognize and address the foregoing considerations, and others, of prior art devices.

SUMMARY

It should be appreciated that this Summary is provided to introduce a selection of concepts in a simplified form that are further described below in the Detailed Description. This Summary is not intended to be used to limit the scope of the claimed subject matter.

A multipurpose relocatable structure, according to various embodiments, comprises: (1) a floor system; (2) a framework secured adjacent the floor system, the framework comprising a plurality of corner posts, a pair of upper end posts, and a pair of upper side posts; (3) a ceiling pan secured adjacent the framework; (4) a plurality of walls secured adjacent the framework; and (5) a door comprising an access hole and a hatch disposed adjacent the access hole to selectively prevent passage of a person through the access hole.

A multipurpose relocatable structure, according to particular embodiments, comprises: (1) a floor system; (2) a framework secured adjacent the floor system, the framework comprising a plurality of corner posts, a pair of upper end posts, and a pair of upper side posts; (3) a ceiling pan secured adjacent the framework; (4) a plurality of walls secured adjacent the framework; (5) a door positioned in an end wall of the plurality of walls, the door comprising an access hole sized to allow a person to egress through the access hole; (6) an emergency escape hatch positioned within the door, the emergency escape hatch comprising: (a) a body portion sized to substantially fill the access hole in the door; (b) an engagement surface positioned on an exterior side of the body portion of the emergency escape hatch and sized to abut an exterior surface of the door when the body portion is positioned within the access hole such that the engagement surface prevents the emergency escape hatch from traversing through the access hole to an interior of the multipurpose relocatable structure; and (c) a plurality of release handles operatively coupled to a plurality of latch mechanisms positioned on an interior side of the body portion. In particular embodiments, the plurality of latch mechanisms are configured to engage an interior surface of the door when the body portion is positioned within the access hole and the latch mechanisms are engaged such that the plurality of latch mechanisms prevent the emergency escape hatch from traversing through the access hole to an exterior of the multipurpose relocatable structure, and the plurality of latch mechanisms are configured to disengage the interior surface of the door in response to movement of the plurality of release handles to allow the emergency escape hatch to traverse through the access hole to the exterior of the multipurpose relocatable structure.

A multipurpose relocatable structure according to various embodiments comprises: (1) a floor system; (2) a framework secured adjacent the floor system, the framework comprising a plurality of corner posts, a pair of upper end posts, and a pair of upper side posts; (2) a ceiling pan secured adjacent the framework; and (3) a plurality of walls secured adjacent the framework. In particular embodiments, the multipurpose relocatable structure comprises an interior configured for battery charging and storage and the interior comprises a plurality of shelves sized to receive a plurality of batteries, and a plurality of electrical connections positioned at a plurality of positions of the plurality of shelves, each electrical connection configured to attach to a battery of the plurality of batteries and to deliver an electrical signal from an external power source to the battery.

A multipurpose relocatable structure according to various embodiments comprises: (1) a floor system; (2) a framework secured adjacent the floor system, the framework comprising a plurality of corner posts, a pair of upper end posts, and a pair of upper side posts; (3) a ceiling pan secured adjacent the framework; (4) a plurality of walls secured adjacent the framework; and (5) an environmental control unit (ECU) system that is selectively configurable between a transport configuration in which the ECU system is substantially positioned within an interior of the multipurpose relocatable structure and an operational configuration in which the ECU system is substantially positioned outside of the multipurpose relocatable structure while fluidly coupling external air to the interior.

A multipurpose relocatable structure according to particular embodiments comprises: (1) a floor system; (2) a framework secured adjacent the floor system, the framework comprising (a) a plurality of corner posts, (b) a pair of upper end posts, (c) a pair of upper side posts; (3) a ceiling pan secured adjacent the framework; and (4) a plurality of walls secured adjacent the framework; and a protected electrical connector configured to receive an external electrical connector from an external power source and to provide electricity to an internal circuit breaker, the protected electrical connector positioned within a wall between a plane defined by an external surface of the wall and an interior of the multipurpose relocatable structure.

A multipurpose relocatable structure according to various embodiments comprises: (1) a floor system; (2) a framework secured adjacent the floor system, the framework comprising a plurality of corner posts, a pair of upper end posts, a pair of upper side posts; (3) a ceiling pan secured adjacent the framework; (4) a plurality of walls secured adjacent the framework; and (5) a plurality of lifting and tie down corners, each lifting corner comprising a securement aperture defined by a first circular opening and a second circular opening connected by tangential cuts to create a front aperture edge and a rear aperture edge, wherein a first radius of the first circular opening is larger than a second radius of the second circular opening.

A multipurpose relocatable structure, according to particular embodiments, comprises: (1) a floor system; (2) a framework secured adjacent the floor system; (3) a ceiling pan secured adjacent the framework; (4) a plurality of walls secured adjacent the framework; (5) a door positioned in an end wall of the plurality of walls, the door comprising an access hole sized to allow a person to egress through the access hole; and (6) an emergency escape hatch positioned adjacent the access hole of the door to selectively prevent passage of a person through the access hole, the emergency escape hatch releasable from an interior of the multipurpose relocatable structure and configured to be pushed outward to an exterior of the multipurpose relocatable structure after being released.

A multipurpose relocatable structure, according to various embodiments, comprises: (1) a floor system; (2) a framework secured adjacent the floor system, the framework comprising a plurality of corner posts, a pair of upper end posts, and a pair of upper side posts; (3) a ceiling pan secured adjacent the framework; (4) a plurality of walls secured adjacent the framework; (5) a door comprising an access hole and a hatch disposed adjacent the access hole to selectively prevent passage of a person through the access hole; and (5) equipment for at least one of storage, maintenance, milling, machining, fabrication, welding, or weapon repair.

A multipurpose relocatable structure, according to particular embodiments, comprises: (1) a floor; (2) a framework secured adjacent the floor; (3) a ceiling pan secured adjacent the framework; (4) a plurality of walls secured adjacent the framework; and (5) an environmental control unit (ECU) that is selectively configurable between a transport configuration in which the ECU is substantially positioned within an interior of the multipurpose relocatable structure and an operational configuration in which the ECU system is substantially positioned outside of the multipurpose relocatable structure.

A multipurpose relocatable structure according to various embodiments comprises: (1) a floor; (2) a framework secured adjacent the floor; (3) a ceiling pan secured adjacent the framework; and (4) a plurality of walls secured adjacent the framework. In various embodiments: (1) the multipurpose relocatable structure is substantially in the shape of an elongated rectangular prism having a length that is greater than its width; (2) the plurality of walls comprise a first lateral side wall and a second lateral side wall, the first and second lateral side walls being disposed so that they are co-facing and at least substantially parallel to and spaced apart from each other; (3) the first lateral side wall comprises a first access opening that is sized to permit an adult human to walk through the first access opening in an upright orientation; (4) the second lateral side wall comprises a second access opening that is sized to permit an adult human to walk through the second access opening in an upright orientation; and (5) the first and second access openings are co-facing and spaced apart from each other.

A method of constructing a temporary relocatable structure comprising: (1) providing a first multipurpose relocatable structure comprising: (A) a floor; (B) a framework secured adjacent the floor; (C) a ceiling pan secured adjacent the framework; and (C) a plurality of walls secured adjacent the framework. In various embodiments, (1) the first multipurpose relocatable structure is substantially in the shape of an elongated rectangular prism having a length that is greater than its width; (a) the first multipurpose relocatable structure comprises a first lateral side wall and a second lateral side wall, the first and second lateral side walls of the first multipurpose relocatable structure being disposed so that they are co-facing and at least substantially parallel to and spaced apart from each other; (b) the first lateral side wall of the first multipurpose relocatable structure comprises a first access opening that is sized to permit an adult human to walk through the first access opening of the first multipurpose relocatable structure in an upright orientation; the second lateral side wall of the first multipurpose relocatable structure comprises a second access opening that is sized to permit an adult human to walk through the second access opening of the first multipurpose relocatable structure in an upright orientation; (c) the first and second access openings of the first multipurpose relocatable structure are co-facing and spaced apart from each other; (2) providing a second multipurpose relocatable structure comprising: (A) a floor; (B) a framework secured adjacent the floor; (C) a ceiling pan secured adjacent the framework; and (D) a plurality of walls secured adjacent the framework. In various embodiments, (1) the second multipurpose relocatable structure is substantially in the shape of an elongated rectangular prism having a length that is greater than its width; (2) the second multipurpose relocatable structure comprises a first lateral side wall and a second lateral side wall, the first and second lateral side walls of the second multipurpose relocatable structure being disposed so that they are co-facing and at least substantially parallel to and spaced apart from each other; (3) the first lateral side wall of the second multipurpose relocatable structure comprises a first access opening that is sized to permit an adult human to walk through the first access opening of the second multipurpose relocatable structure in an upright orientation; (4) the second lateral side wall of the second multipurpose relocatable structure comprises a second access opening that is sized to permit an adult human to walk through the second access opening of the second multipurpose relocatable structure in an upright orientation, and (5) the first and second access openings of the second multipurpose relocatable structure are co-facing and spaced apart from each other. The method may further comprise: (1) positioning the first multipurpose relocatable structure and the second multipurpose relocatable structure in a particular physical arrangement in which the first access opening of the first multipurpose relocatable structure is adjacent and at least substantially aligns with the second access opening of the second multipurpose relocatable structure, so that an adult human can pass between the first and second multipurpose relocatable structures through an opening that includes the first access opening of the first multipurpose relocatable structure and the second access opening of the second multipurpose relocatable structure; and (2) fastening the first multipurpose relocatable structure and the second multipurpose relocatable structure together so that they are maintained in the particular physical arrangement.

A multipurpose relocatable structure, according to various embodiments, comprises a floor system and a framework secured adjacent the floor system. In particular embodiments, the framework comprises: (1) a plurality of corner posts; (2) a pair of upper end posts; (3) a pair of upper side posts; (4) a ceiling pan secured adjacent the framework; and (5) a plurality of walls secured adjacent the framework. In particular embodiments: (1) the multipurpose relocatable structure is substantially in the shape of an elongated rectangular prism having a length that is greater than its width; (2) the first lateral side wall comprises a first access opening that is sized to permit an adult human to walk through the first access opening in an upright orientation; (3) the second lateral side wall comprises a second access opening that is sized to permit an adult human to walk through the second access opening in an upright orientation, and (4) the first and second access openings are co-facing and spaced apart from each other.

BRIEF DESCRIPTION OF THE DRAWINGS

Various embodiments of the invention will be described below. In the course of the description, reference will be made to the accompanying drawings, which are not necessarily drawn to scale, and wherein:

FIG. 27 is a perspective view of a door panel according to a particular embodiment.

FIG. 28 is a front plan view the door panel of FIG. 27.

Figures 29, 30, 31, 32:
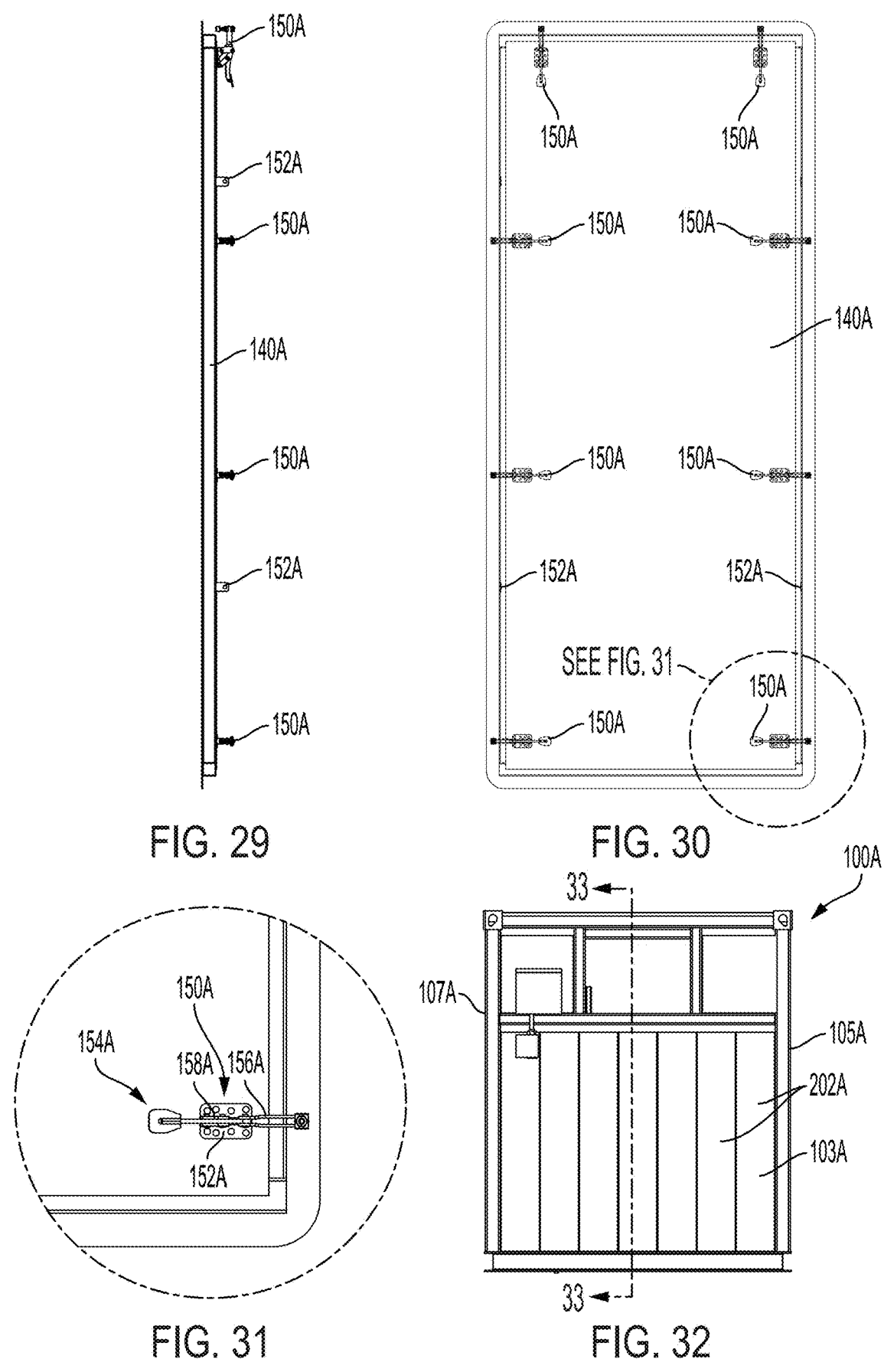

FIG. 29 is a first side elevation view of the door panel of FIG. 27.

FIG. 30 is a rear elevation view of the door panel of FIG. 27.

FIG. 31 is a detail plan view of an attachment member according to a particular embodiment.

FIG. 32 is a rear elevation view of the multipurpose relocatable structure of FIG. 26.

DETAILED DESCRIPTION OF VARIOUS EMBODIMENTS

Figure 1:
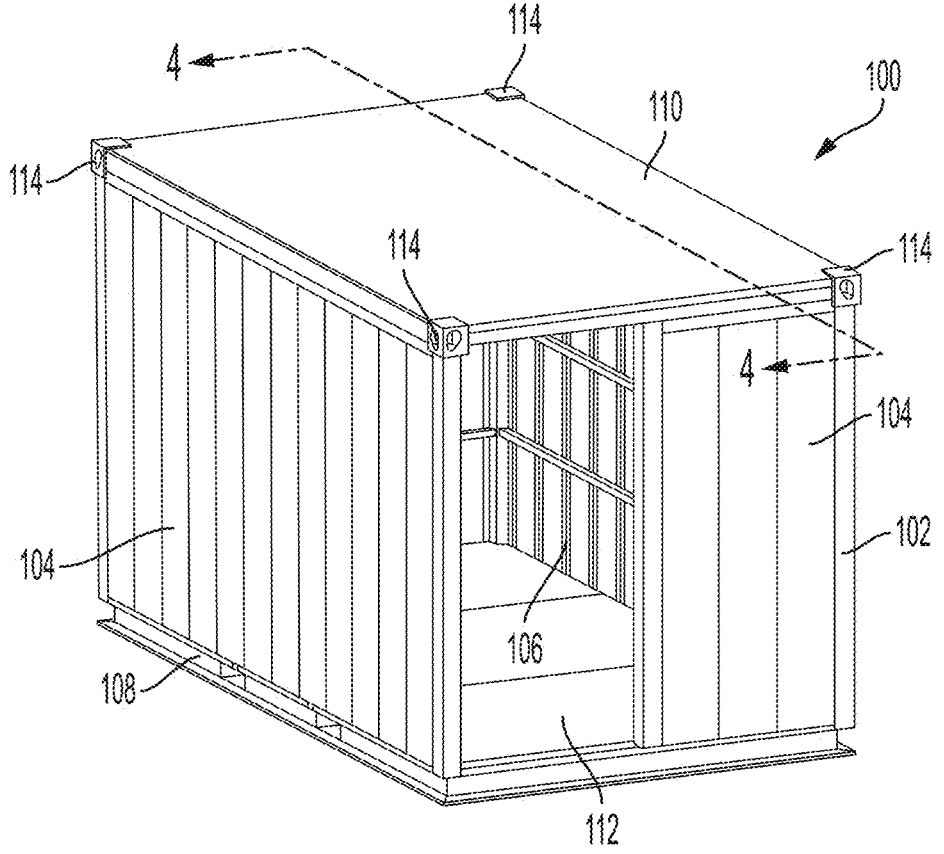
FIG. 1 is a front perspective view of a 12-foot standard version of a multipurpose relocatable structure according to various embodiments described below.

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

There is a need for military, humanitarian, and other organizations to efficiently establish mobile or temporary operations at deployed locations. This need is not adequately covered by conventional shipping containers, or structures designed within that footprint for the reasons articulated above. Other structures closer to the footprint of the subject structure likewise have characteristics that lessen their utility in comparison. Some conventional structures of near comparable size are not capable of being placed on the ground and must remain on the transport vehicle. Furthermore, the construction of those structures emphasizes lightweight characteristics and a less building-like structure, including a lower roof height. These characteristics impair its utility as a working space for maintenance and heavy storage and negatively impacts the utility as a building-like workspace. Furthermore, the honeycomb aluminum panels used in some of those structures are considered structural members. Any penetrations to the wall of the container can result in a compromise of a structural member, which requires that the container structure be deemed non-usable and non-deployable since the unit is not mission capable at the time of the damage. Given the complexity of the wall material, proper field repair can also be challenging. Even if the penetration is minor and has minimal to no effect on the structural capabilities of the container, the container may need to be shipped off station for repair. Doing so may significantly impact the mission capability of the affected military unit.

A specialized 12-foot structure fills this void, as it maximizes size without being too large to fit on internationally common transportation vehicles and is capable of using common lifting equipment. This product is designed to be highly mobile and still retains many benefits of building-like functionality which offers a platform for multiple operational interior configurations. Interior configurations can be provided by the manufacturer as "turnkey" options and/or set up or modified by the customer using equipment on hand.

The multipurpose relocatable structure described herein can function like a robust building-like structure that offers turnkey functionality either hooked up to an electrical source from a building, or to a generator, most anywhere in the world with minimal set up time. Due to its more expansive height and overall building-like design, the structure can function like a small facility for use as command, operations, communications, and mobile meeting spaces. Due to its heavyweight and more building-like design, it can be configured to accommodate the heavy equipment necessary for various mobile maintenance applications. Because it can be picked up and removed from the vehicle for operation, it can also house activities that due to hazards or other concerns need to be separated from permanent structures or need to move around to supply the function in various locations for optimal efficiency. Its utility is equally broad in the civilian world, offering almost limitless options as a mobile structure in multiple fields from medical, construction, film, disaster relief, oil and gas exploration, industrial sitework or maintenance, to remote equipment and supplies housing and movement.

The multipurpose relocatable structures described herein include two primary structural configurations, although the interiors of both may be configured in any desirable manner to accommodate the intended mission of the structure. According to one embodiment, the multipurpose relocatable structure will be referred to as a 12-foot structure. One embodiment of the 12-foot structure includes dimensions that are approximately 82 inches wide, 96 inches high, and 144 inches long. According to another embodiment described in greater detail below, the multipurpose relocatable structure will be referred to as a 12-foot "shorty" structure. The shorty is approximately 82 inches wide, 88 inches high, and 144 inches long. Generally, embodiments of the 12-foot structure include configuring the structure as a facility according to a particular purpose or mission. Because of the reduced height of the shorty structure, the shorty structure is particularly desirable when configured for equipment or material storage, or for a particular equipment purpose or mission (e.g., battery charging and storage). The shorty structure is sized for insertion into standard ISO containers (1EE or 1CC under the ISO 668 classification), for shipment, or may alternatively be shipped independently as they possess the structural components and associated capabilities with lifting corners, as described in detail below. Except where otherwise specified, the embodiments described herein are applicable to both the 12-foot and the shorty structure embodiments.

The multipurpose relocatable structure described herein is not configured to fit inside of a conventional size container (1EE or 1CC under the ISO 668 classification), although it is designed so it can fit into a high cube container (1AAA or 1BBB under the ISO 668 classification), or a flat rack for overseas transport. It is also capable of being transported by itself via any suitably sized and rated commercial motor vehicle, as well as train, with minimal preparation. It also has the dimensions to be moved by aircraft. Some buildouts can be operated still attached to a (parked) FMTV or commercial trailer without being disengaged.

The shorty multipurpose relocatable structure shares some of the design features of its larger cousin but differs in its mobility options. Its width and height are the same, but it is shorter to accommodate shipment in a conventional 20- or 40-foot intermodal shipping container (1EE or 1CC under the ISO 668 classification). This product is generally not designed to be conditioned occupiable space (although it is still a structure that houses the equipment securely from the elements). It is also more of an industrial structure. It is hallmarked by a strong frame, multiple doors and easily accessible spaces. This product design can still facilitate a number of operational functions within the military (and the civilian side). Its dimensions allow it to be placed and carried inside of an ISO container anywhere in the world with very little expertise or equipment needed, other than a properly sized forklift. This feature also increases its utility as a mobile storage structure that can be removed from the container after shipment and immediately utilized as a self-contained, pre-organized room for whatever materials it stores. In addition, in some embodiments, the specific dimensions of both versions of the structure fit the M35 series truck without alteration of the vehicle. Specifically, troop seats lining the bed of the truck need not be removed and stored, like with conventional designs.

Each version of this structure also has incorporated into its design four lift and tie down points, facilitating securing the structure for loading without the need for separate equipment or hardware (other than the chains or other tie downs). These same corner points are designed to facilitate the lifting and movement of the structure when all four points are used. Along with forklift pockets on multiple sides, the structure has built in two methods to move the structure when desired.

Utilizing the concepts and techniques described herein, a multipurpose relocatable structure provides a structure that is deployable via almost limitless types of vehicles using the same standardized hardware for securing the structure, lifting corners and forklift pockets that facilitate lifting and securing the structure without external components that are prone to damage, an infrastructure and wall panel configuration and dimensions that provides increased load capacity and building like functionality over structures of similar size, and an overall design and dimensions that facilitate much greater utility due to its operational interior options.

Turning now to FIG. 1, a multipurpose relocatable structure 100 is shown. According to one embodiment, the multipurpose relocatable structure 100 is a 12-foot multipurpose relocatable structure 102 (or 12-foot structure 102). According to another embodiment discussed briefly above and described in greater detail below with respect to FIGS. 9A-9F, the multipurpose relocatable structure 100 includes a 12-foot "shorty" structure. Generally, embodiments of the 12-foot structure 102 include configuring the structure as a facility according to a particular purpose or mission. Because of the reduced height of the shorty structure described below, the shorty structure is typically configured for equipment or material storage, or for a particular equipment purpose or mission (e.g., battery charging and storage). The shorty structure is sized for insertion into standard ISO containers for shipment or may alternatively be shipped independently as they possess the structural components and associated capabilities with lifting corners, as described in detail below. Except where otherwise specified, the embodiments described herein are applicable to both the 12-foot and the shorty structure embodiments.

The multipurpose relocatable structure 100 includes walls 104 supported by a framework 106, a floor system 108 (including a treadplate 112), and ceiling 110. Lifting corners 114 provide a mechanism for lifting the 12-foot structure 102, which can also be used to tie down or secure the 12-foot structure 102 in a vehicle. The multipurpose relocatable structure 100 is shown without an end door so that the interior may be seen. According to various embodiments, the 12-foot structure 102 may include one or more end doors positioned on a front side of the structure and/or one or more side doors positioned on one or more sides of the structure. These doors are shown and described below with respect to FIGS. 3 and 9.

Figure 2:
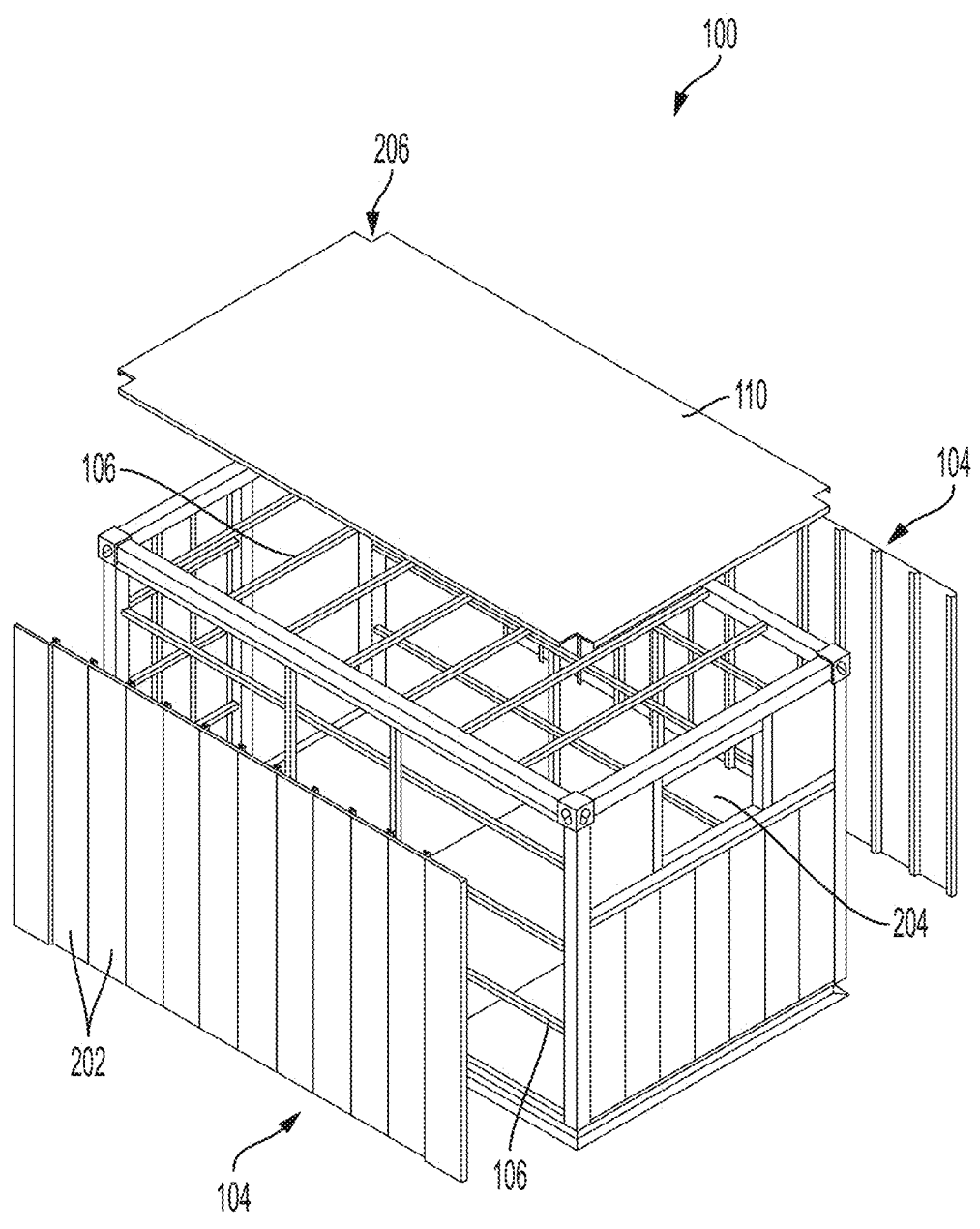
FIG. 2 is an exploded rear perspective view of a 12-foot standard version of a multipurpose relocatable structure according to various embodiments described below.

FIG. 2 shows an exploded rear perspective view of the multipurpose relocatable structure 100. The multipurpose relocatable structure 100 includes a framework 106 made up of a number of horizontal and vertical supports extending between larger corner and edge beams. The details of this framework 106 will be discussed in greater detail below with respect to FIGS. 4 and 6. Walls 104 are supported on the vertical portions of the framework 106, with a ceiling pan 110 positioned on top. The ceiling pan 110 may be manufactured from a single piece of material or may alternatively be manufactured from two or more ceiling panels that are secured adjacent to and abutting one another to create the ceiling pan 110. To weatherproof the structure, the adjacent ceiling panels may be welded along a seam or otherwise sealed. The ceiling pan 110 is shown as a single piece of material, which may help to ensure weatherproofing. In other embodiments, the ceiling pan 110 may comprise multiple pieces of material. According to one embodiment, the ceiling pan 110 is manufactured from 10-gauge steel. Any suitable gauge metal may be utilized without departing from the scope of this disclosure. In various embodiments, the metal is selected so that it supplies sufficient structural support to withstand normal snow and personnel loads on the roof. As seen in FIG. 2, the ceiling pan 110 may have corner notches 206 to accommodate the lifting corners 114.

The walls 104 are made up of a number of parallel, adjacent panels 202. The panels 202 are welded or otherwise secured to one another to form the walls 104 of appropriate dimensions to cover the vertical portions of the framework 106. The framework 106 provides all of the structural support for the 12-foot structure 102 without the panels 202. For this reason, and because the walls 103 are made up of panels 202, any damage to or penetration of a wall 104 does not structurally impair the multipurpose relocatable structure 100 or require the multipurpose relocatable structure 100 to be shipped off station for repair as is required with conventional structures. Rather, if a wall 104 is penetrated and repair is desired, repair merely entails patching of a panel 202, which can be done on-site.

Figure 7B:
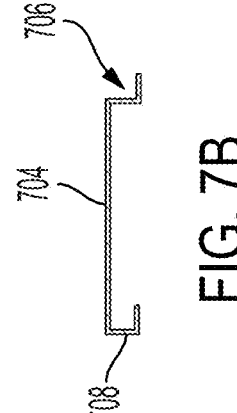
FIGS. 7A and 7B show perspective and cross-sectional views, respectively, of a first wall panel configuration according to various embodiments described below.
Figure 7A:
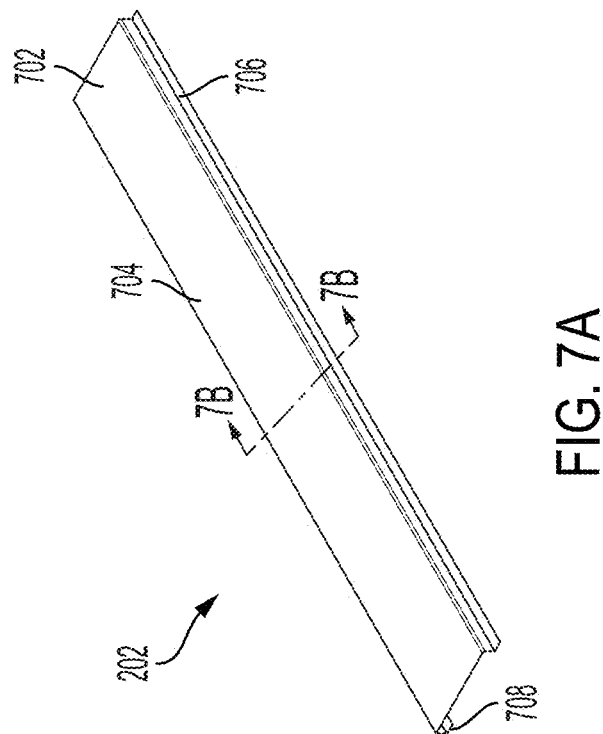

Turning to FIGS. 7A-8B, two configurations of the panels 202 will now be described. FIG. 7A shows a panel 202 according to a first configuration 702. In this example, the panel 202 includes a front face 704, a first side 706, and a second side 708 opposite the first side. FIG. 7B shows a cross section of the panel 202 of FIG. 7A. As seen in the cross section, the first side 706 and the second side 708 of this first configuration 702 each have a generally vertical member extending downward from the front face 704 and a generally horizontal member extending to the right from the generally vertical member to form a substantially "L-shaped" configuration. In doing so, the second side 708 of one panel 202 may nest within the first side 706 of an adjacent panel 202, similar to a tongue and groove arrangement. The adjacent panels 202 may then be welded or otherwise fastened together, repeating the process for additional adjacent panels 202 until the wall 104 is complete. The interlocking configuration of the panels 202 increases the structural integrity of the multipurpose relocatable structure 100, specifically providing improved capabilities to carry large compressive loads.

Figure 8B:
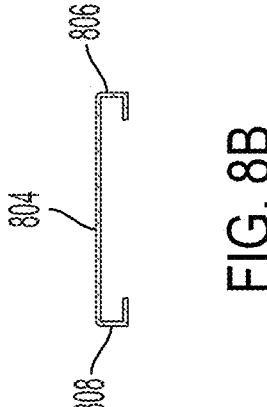
FIGS. 8A and 8B show perspective and cross-sectional views, respectively, of a second wall panel configuration according to various embodiments described below.
Figure 8A:
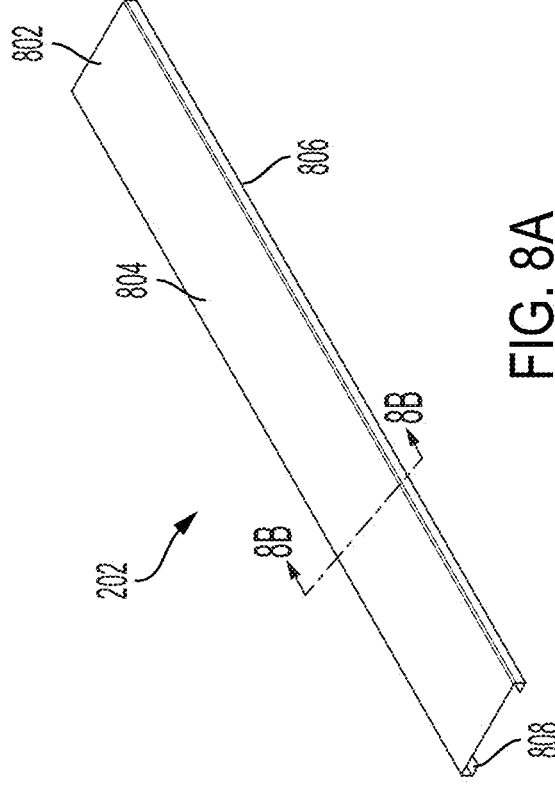

FIGS. 8A and 8B show a panel 202 and cross-sectional view of the panel 202, respectively, according to a second configuration 802. In this example, the panel 202 includes a front face 804, a first side 806, and a second side 808 opposite the first side. As seen in the cross section of FIG. 8B, the first side 806 and the second side 808 of this second configuration 802 are mirror images of one another. Specifically, the first side 806 has a generally vertical member extending downward from the front face 804 and a generally horizontal member extending to the left from the generally vertical member to form a substantially backwards "L-shaped" configuration. The second side 808 has a generally vertical member extending downward from the front face 804 and a generally horizontal member extending to the right from the generally vertical member to form a substantially "L-shaped" configuration. In doing so, the vertically oriented members of the first and second sides of adjacent panels 202 may abut. The adjacent panels 202 may then be welded or otherwise fastened together, repeating the process for additional adjacent panels 202 until the wall 104 is complete. According to one embodiment, the panels 202 may comprise 14-gauge steel, although any suitable gauge or suitable material may be used without departing from the scope of this disclosure.

Figures 3A, 3B, 3C:
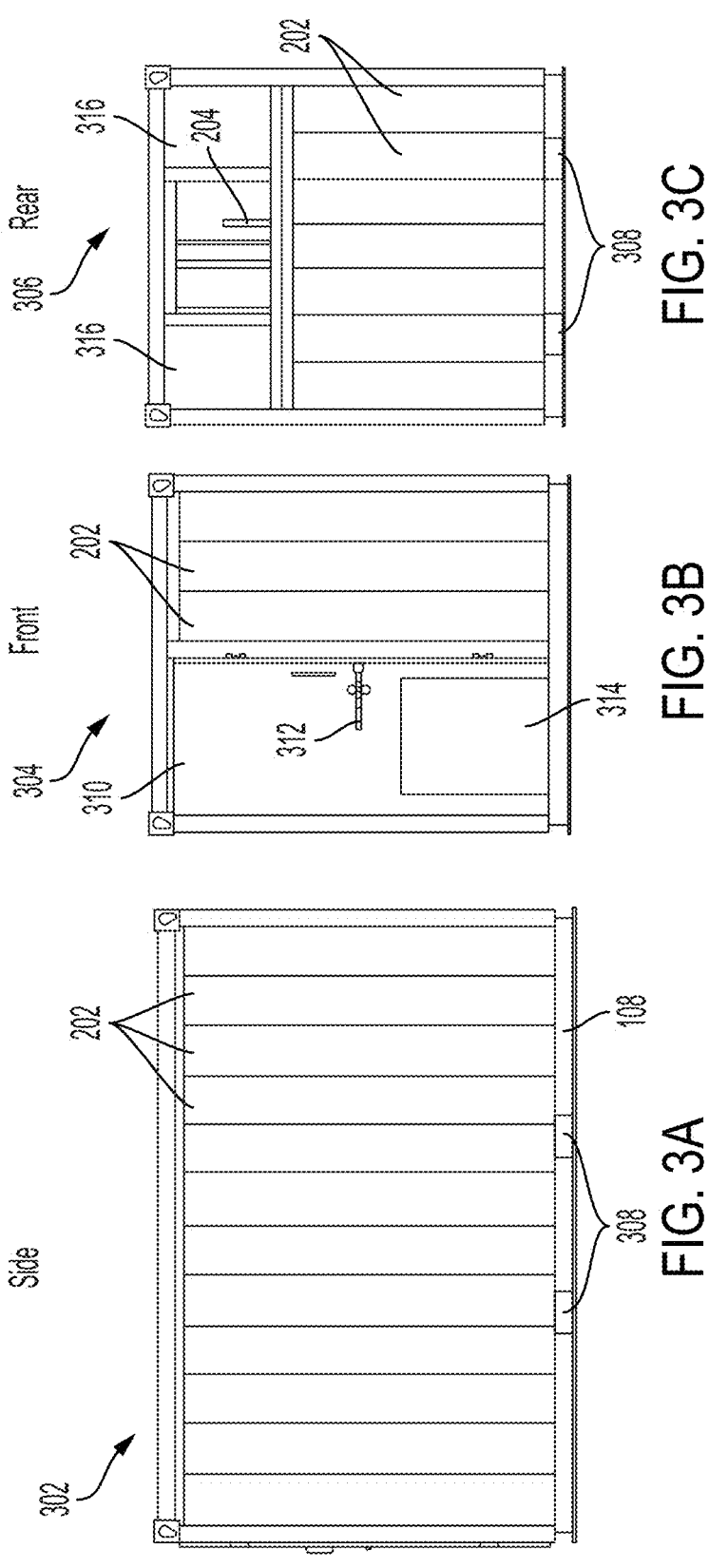
FIGS. 3A, 3B, and 3C show side, front, and rear views, respectively of a 12-foot standard version of a multipurpose relocatable structure according to various embodiments described below.

Returning now to FIGS. 3A-3C, a structure side 302, a structure front 304, and a structure rear 306, respectively, of the multipurpose relocatable structure 100 will be discussed. The multipurpose relocatable structure 100 of FIGS. 3A-3C may represent a 12-foot structure that may be configured as a facility with any type of internal configuration desired according to a designated mission for the structure. FIG. 3A shows a structure side 302 according to one embodiment. The side view shows panels 202 coupled together to create the side wall. The floor system 108 can also be seen at the bottom of the structure. The floor system 108 may include forklift apertures 308 that facilitate movement of the multipurpose relocatable structure 100 by forklift. The structure side 302 shown in FIG. 3A shows only one side. The multipurpose relocatable structure 100 has an opposite side that may be a mirror image or the structure side 302 that is shown in FIG. 3A.

FIG. 3B shows a structure front 304 according to one embodiment. The structure front 304 includes panels 202 that are coupled together to create a front wall adjacent to or around a door 310. The door 310 includes a door latch 312 that is operative to selectively secure and unsecure the door 310 upon rotating the handle upwards and downward. And appropriate door latch 312 may be used without departing from the scope of this disclosure. The door 310 may include an emergency escape hatch 314, which will be described in greater detail with respect to FIGS. 10-12.

FIG. 3C shows a structure rear 306 that according to this particular embodiment, has an environmental control unit (ECU) opening 204. The ECU opening 204 is sized to receive an ECU for conditioning the air inside the structure. One or more rear upper panels 316 fill the space adjacent to or surrounding the ECU opening 204. Panels 202 are coupled together to create a lower wall below the ECU opening 204. It should be appreciated that the ECU opening 204 may be positioned at any location within the structure rear 306, or alternatively within a structure side 302 or the structure front 304. The floor system 108 may include forklift apertures 308 that are accessible from the structure rear 306 that facilitate movement of the multipurpose relocatable structure 100 by forklift. Various embodiments provide for forklift apertures 308 accessible from the structure front 304 and/or the structure rear 306, as well as from the structure sides 302. By doing so, the multipurpose relocatable structure 100 provides for easy loading and unloading to and from any type of vehicle and placement in the operating position at the deployed location.

Figure 4:
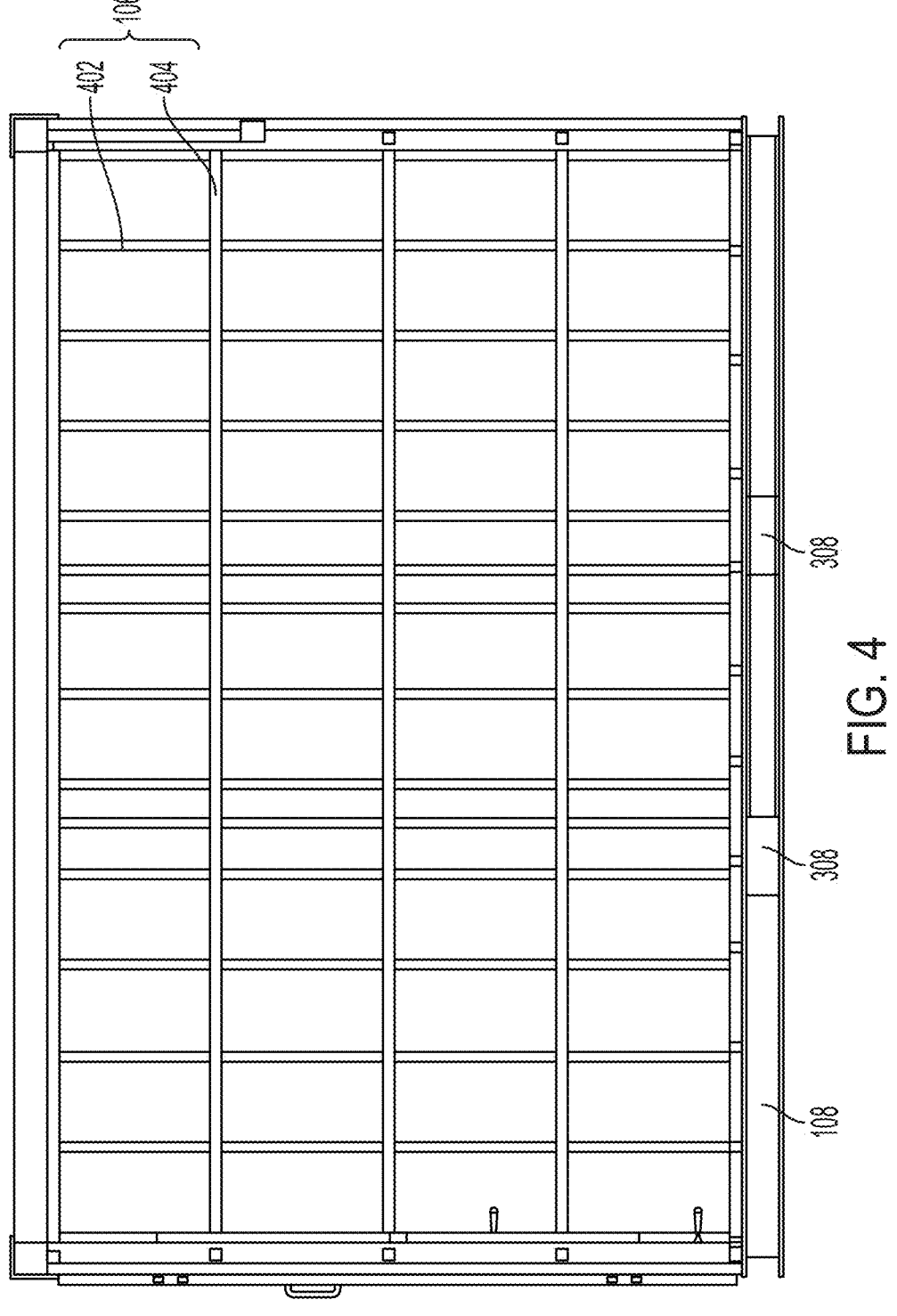
FIG. 4 is a cross-sectional view of the multipurpose relocatable structure of FIG. 1 according to various embodiments described below.

FIG. 4 shows a cross-sectional view of a multipurpose relocatable structure 100 taken along lines 4-4 of FIG. 1. The cross-sectional view shows the framework 106 that provides the structural support for the multipurpose relocatable structure 100 and for mounting the panels 202 that create the walls 104. The framework 106 includes a number of vertical support members 402 and a number of horizontal support members 404. The number, spacing, and characteristics of the vertical and horizontal support members 402 and 404 may be determined according to the structural requirements of the multipurpose relocatable structure 100 to satisfy any given mission requirements. According to one embodiment, the vertical support members 402 and the horizontal support members 404 each comprise 14-gauge, 1.5-inch square steel tubing, with the horizontal support members 404 spaced approximately 20 inches apart.

Figure 5A:
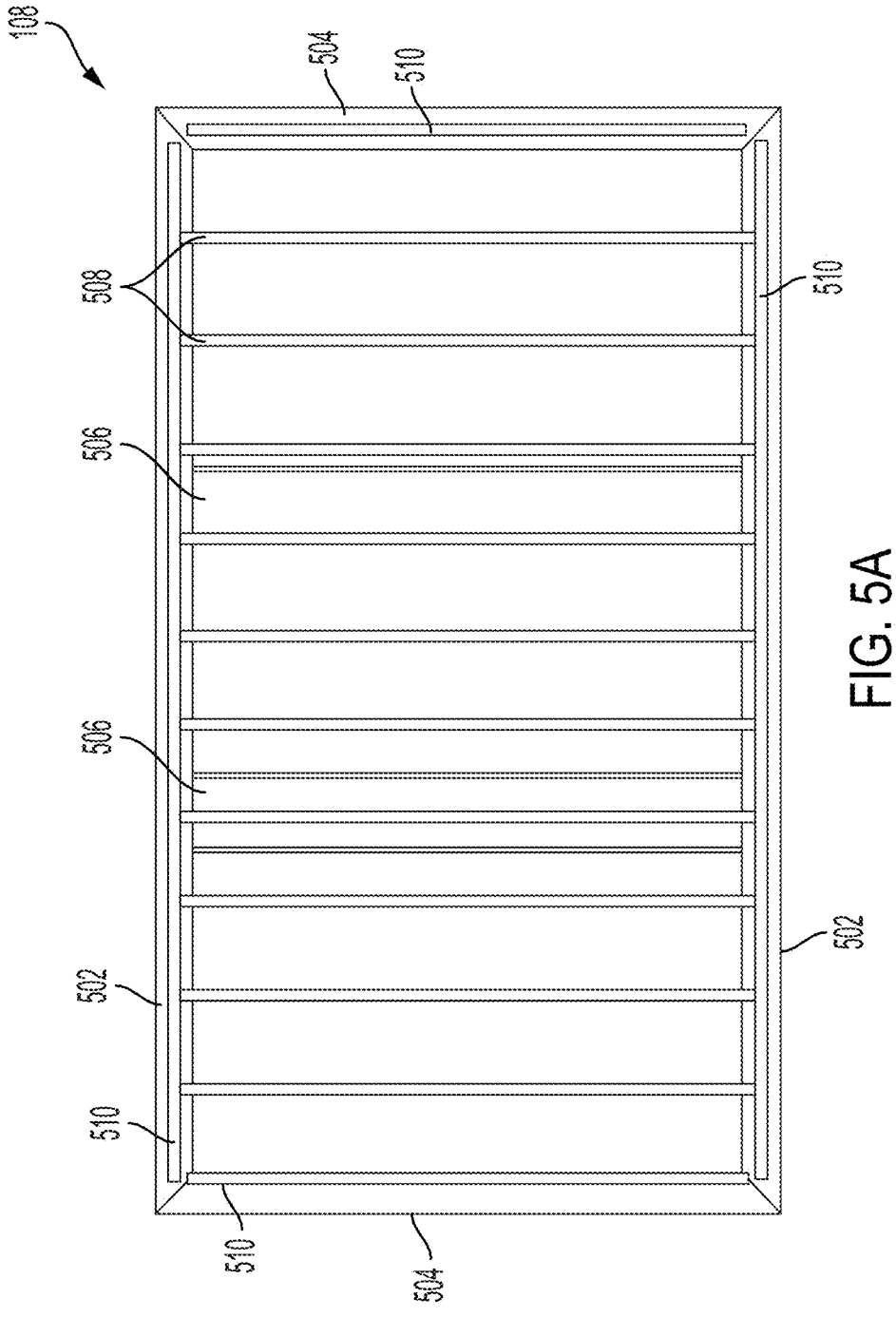
FIG. 5A is a top view of a floor system of a multipurpose relocatable structure according to various embodiments described below.
Figure 5B:
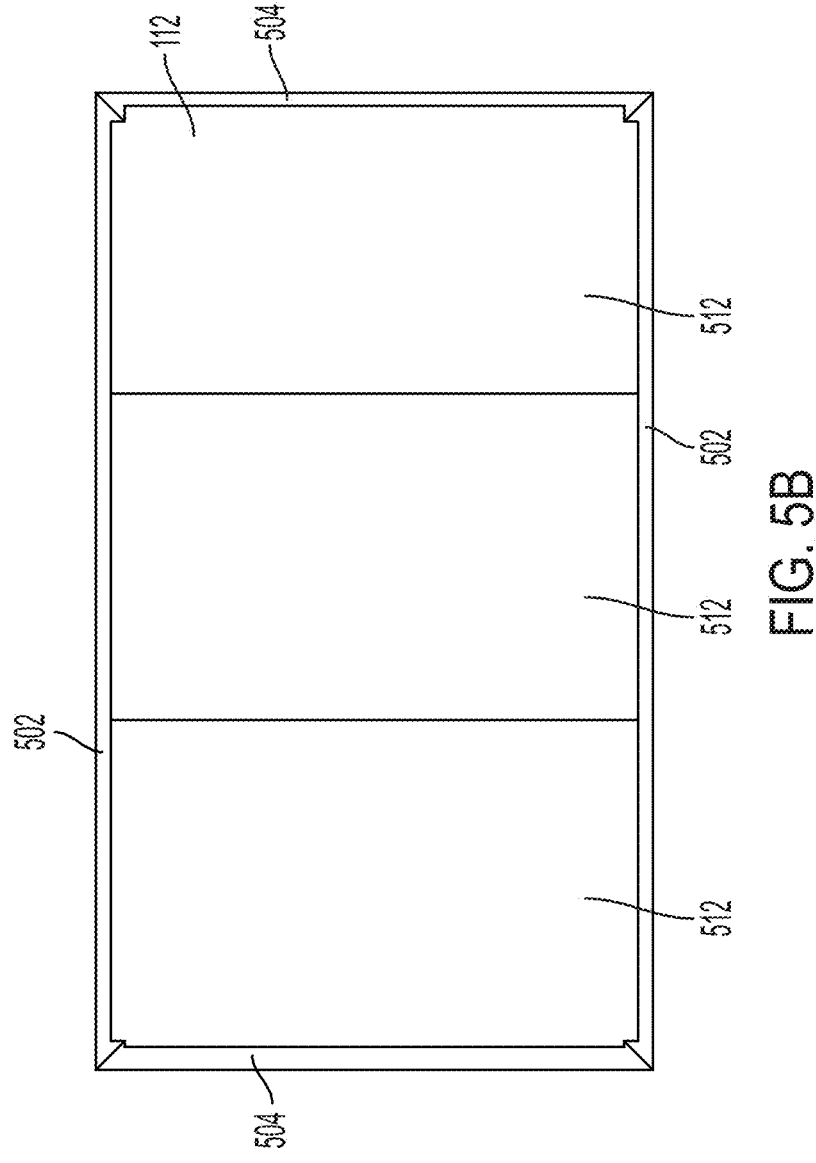
FIG. 5B is a top view of a floor system, including a treadplate, of a multipurpose relocatable structure according to various embodiments described below.

FIG. 5A shows a top view of a floor system 108 without the treadplate 112 installed. FIG. 5B shows the same view with the treadplate 112 installed. As seen in FIG. 5A, according to one embodiment, the floor system 108 includes side beams 502 and end beams 504 configured in a generally rectangular configuration. Side beams 502 and end beams 504 may be steel I-beams, or wide-flanged or W-beams. The floor system 108 additionally includes at least two tubes or conduits 506 with substantially rectangular cross-sections to provide the forklift apertures 308 for moving the multipurpose relocatable structure 100.

While the term "forklift apertures" is used herein, it should be appreciated that the conduits 506 and corresponding apertures 308 may have any suitable cross-sectional shape configured to receive tines of a forklift or other corresponding portions of any type of transfer vehicle for engaging with the multipurpose relocatable structure 100 for lifting or relocation. The forklift apertures 308 are accessible through the side beams 502 via apertures cut or otherwise created in the side beams 502. Alternatively, the side beams 502, may be formed from three separate beam sections welded or coupled together to allow for the conduits 506 that create the forklift apertures 308. According to other embodiments (e.g., as shown in FIG. 3C), alternative or additional conduits 506 may be used to create forklift apertures 308 in the end beams 504 in the same manner as described above with respect to the forklift apertures 308 formed in the side beams 502.

As seen in FIG. 5A, treadplate support members 508 (e.g., tubing manufactured from steel, other metal, polymer, and/or composite material) are arranged in parallel rows across the floor system 108. The treadplate support members 508 are welded or otherwise coupled to side beams 502. Perimeter treadplate support members 510 are similarly secured to the treadplate support members 508 and the side beams 502. The treadplate support members 508 and the perimeter treadplate support members 510 provide support for the treadplate 112. The number and orientation of the treadplate support members are not intended to limit the scope of this disclosure. Rather, any components or structural members may be used to support the treadplate 112. According to one embodiment, the treadplate support members 508 comprise 1.5-inch square steel tubing, with the treadplate support members 508 spaced approximately 9.5-13 inches apart. The perimeter treadplate support members 510 may be generally "L-shaped" and manufactured from 14-gauge steel.

FIG. 5B shows the floor system 108 with the treadplate 112 in place on the treadplate support members 508 and the perimeter treadplate support members 510. The treadplate 112 may be manufactured from a single plate of material, or in multiple plates 512 as shown in FIG. 5B. The treadplate 112 may be secured to the treadplate support members 508 and the perimeter treadplate support members 510 via welds, fasteners, or any suitable type of mechanism for permanently or removably mounting the treadplate 112. According to one embodiment, the treadplate 112 is made from 10-gauge steel.

Figure 6:
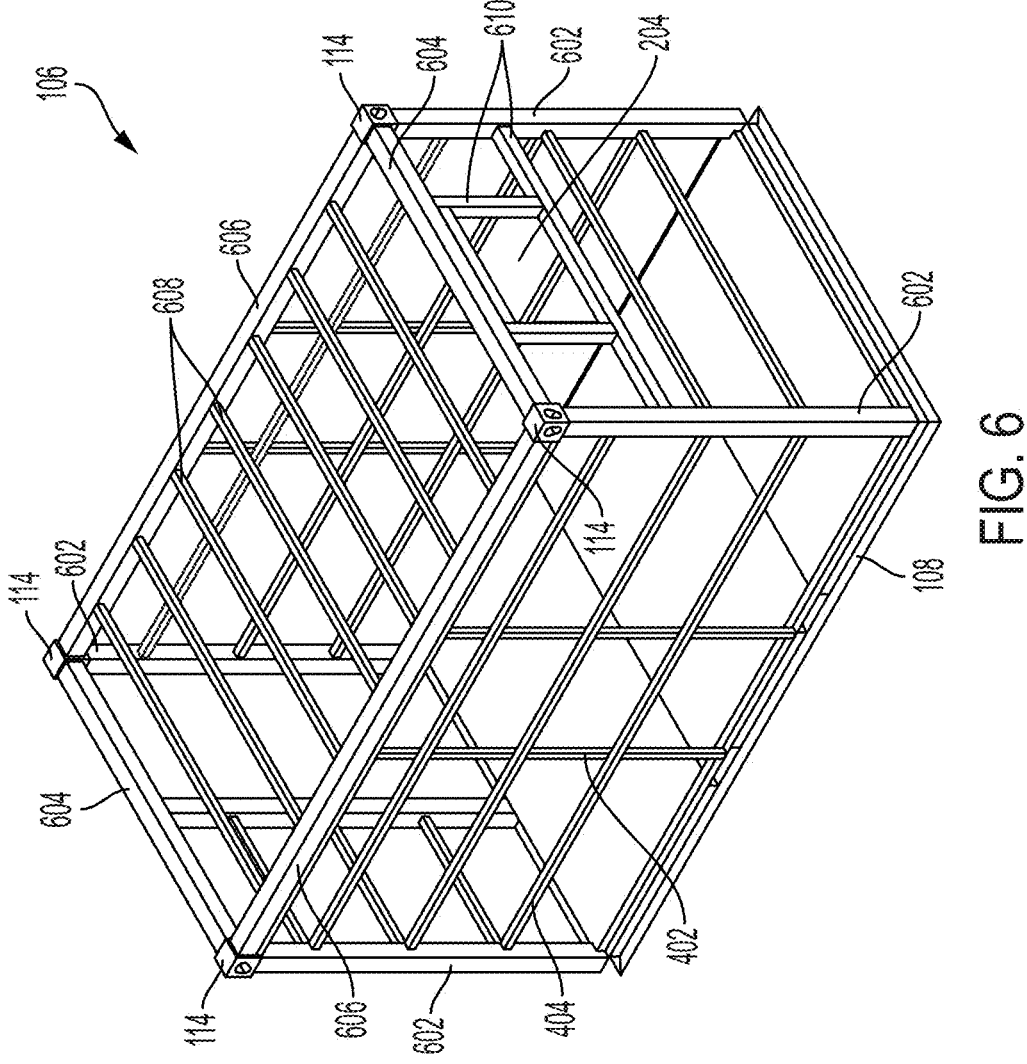
FIG. 6 is a perspective view of a multipurpose relocatable structure without the walls and ceiling to show the framework according to various embodiments described below.

FIG. 6 is a rear perspective view of a multipurpose relocatable structure 100 without the walls and ceiling to show the framework 106 according to various embodiments. The framework includes corner posts 602, upper end posts 604, and upper side posts 606. The corner posts 602, upper end posts 604, and upper side posts 606 are coupled together via welds or other fastening mechanisms at the lifting corners 114. The corner posts 602 are secured to the floor system 108, specifically to the side beams 502 and end beams 504. According to one embodiment, the side beams 502 and end beams 504 are made from 5@16 wide flange steel. According to another embodiment, the side beams 502 and end beams 504 are made from 10-gauge, 4-inch square steel tubing. The tubing 610 surrounding the ECU opening 204 may be manufactured from 10-gauge, 3-inch square steel tubing. Ceiling supports 608 may be 14-gauge, 1.5-inch square steel tubing, spaced approximately 16 inches apart.

FIGS. 9A-9F show various views of a multipurpose relocatable structure 100 according to various embodiments. The multipurpose relocatable structure 100 of FIGS. 9A-9F may be a shorty structure 902 as described above. In this example, the multipurpose relocatable structure 100 may be configured as a battery charging and maintenance structure. It should be appreciated that although the multipurpose relocatable structure 100 is shown and described as a battery charging and maintenance structure, the structures may be configured in virtually endless configurations according to the desired use. Such configurations include, but are not limited to, petroleum oil and lubricant storage and maintenance, glycol recycling and/or generation, milling and machining, fabrication and welding shop, small arms repair, hydraulic fabrication and repair, mobile water treatment, a mobile solar power facility, and a general maintenance facility.

Figure 9A:
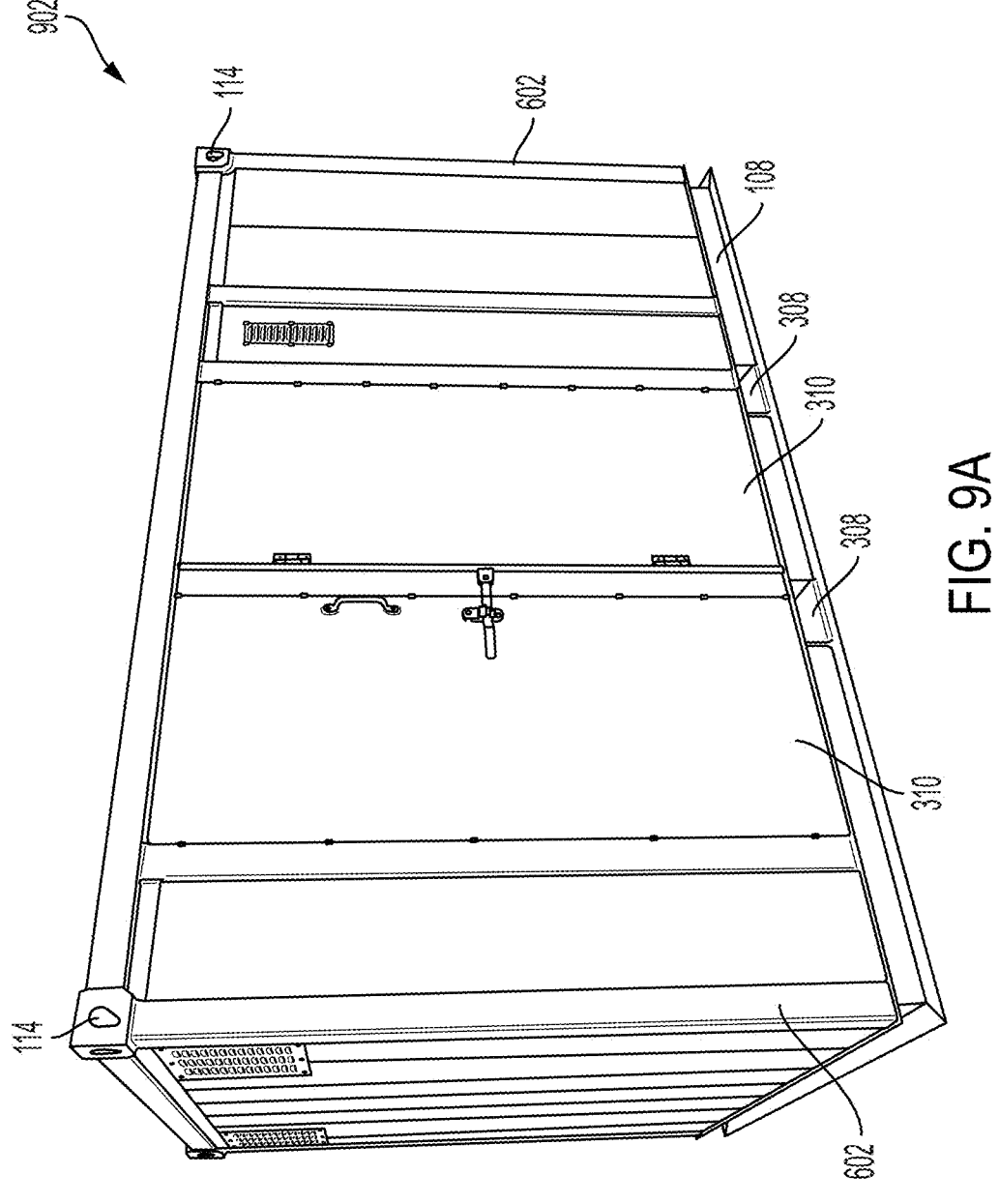
FIG. 9A is a perspective view of a shorty version of a multipurpose relocatable structure with side doors closed according to various embodiments described below.
Figure 9B:
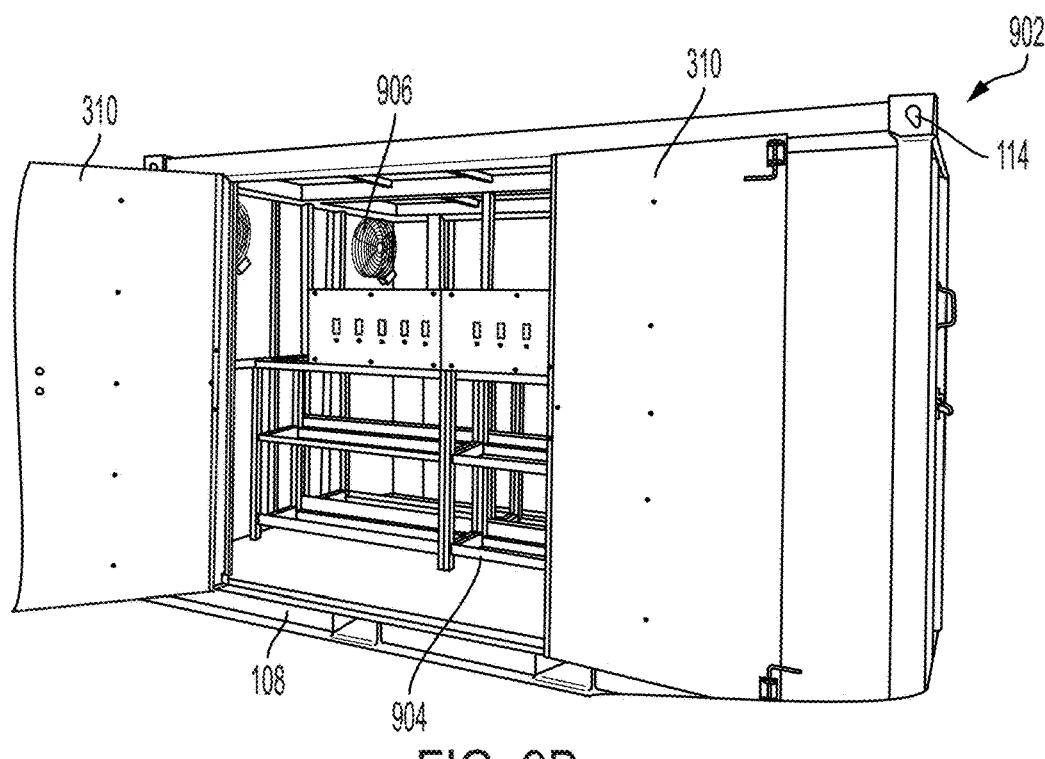
FIG. 9B is a perspective view of a shorty version of a multipurpose relocatable structure with side doors open showing a battery charging build out according to various embodiments described below.
Figure 9C:
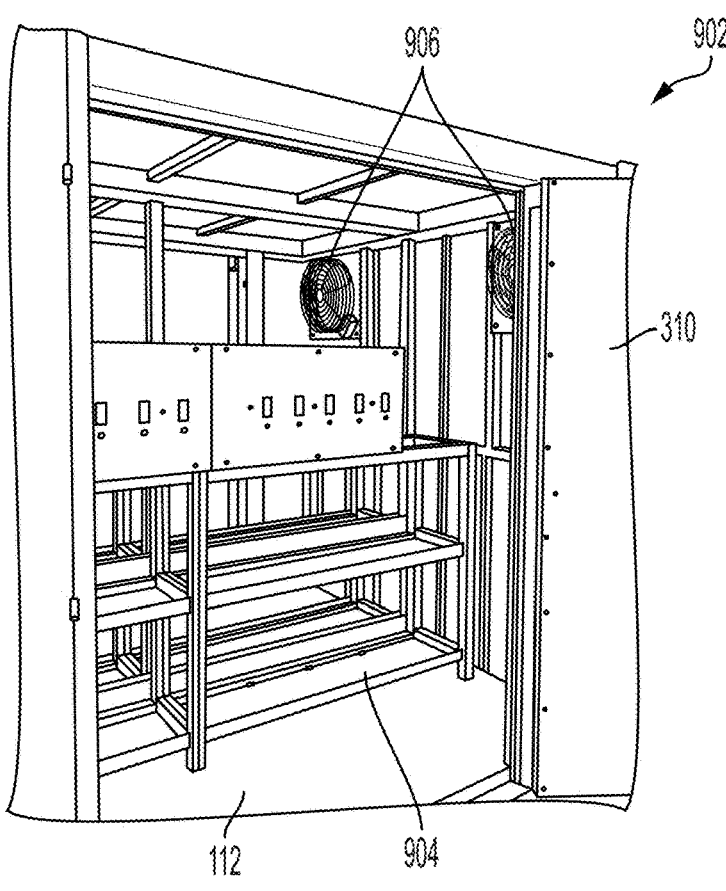
FIG. 9C is a perspective view of an interior of a shorty version of a multipurpose relocatable structure with side doors open showing a battery charging build out according to various embodiments described below.
Figure 9D:
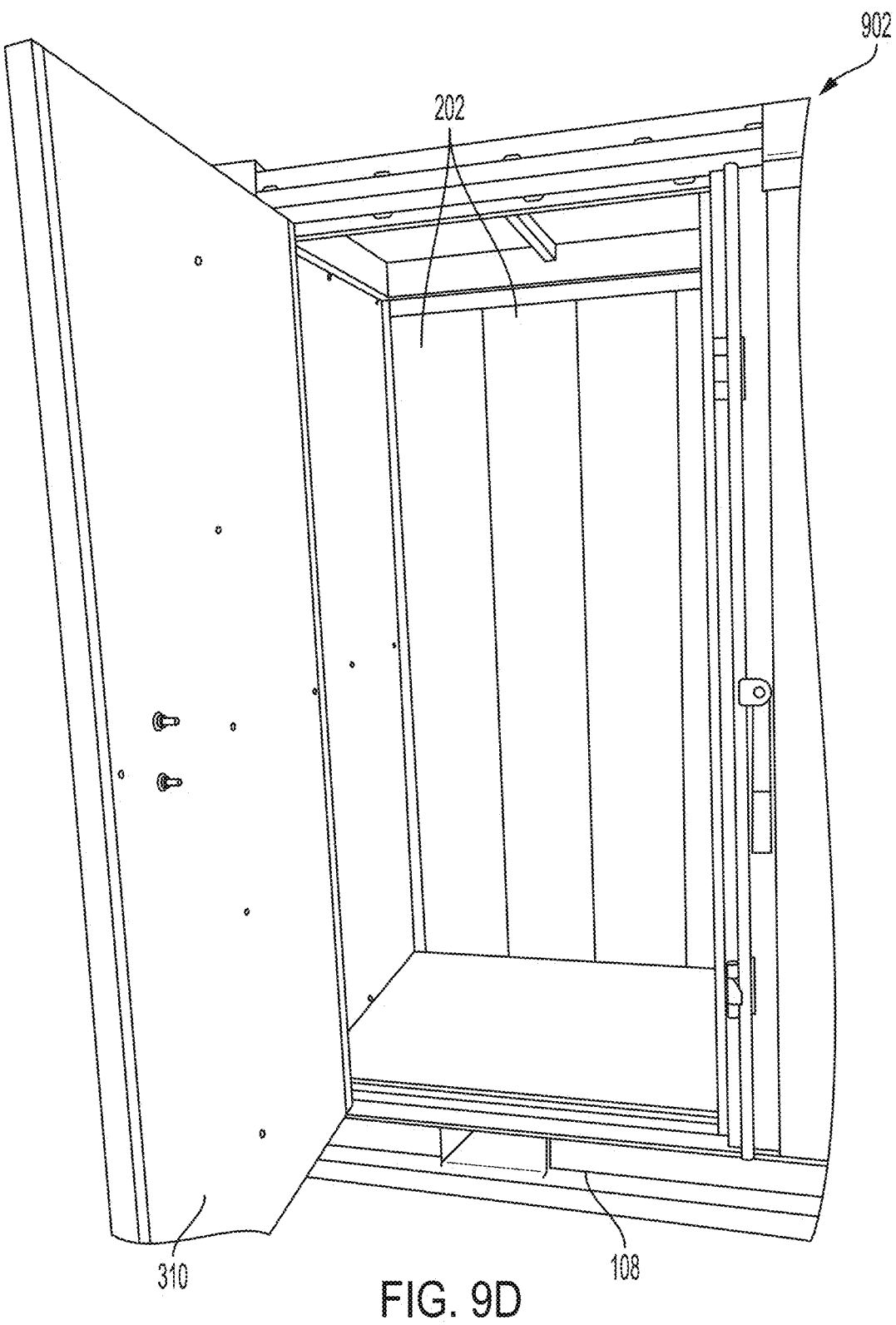
FIG. 9D is a front view of an interior of a shorty version of a multipurpose relocatable structure with an end door open according to various embodiments described below.
Figures 9E, 9F:
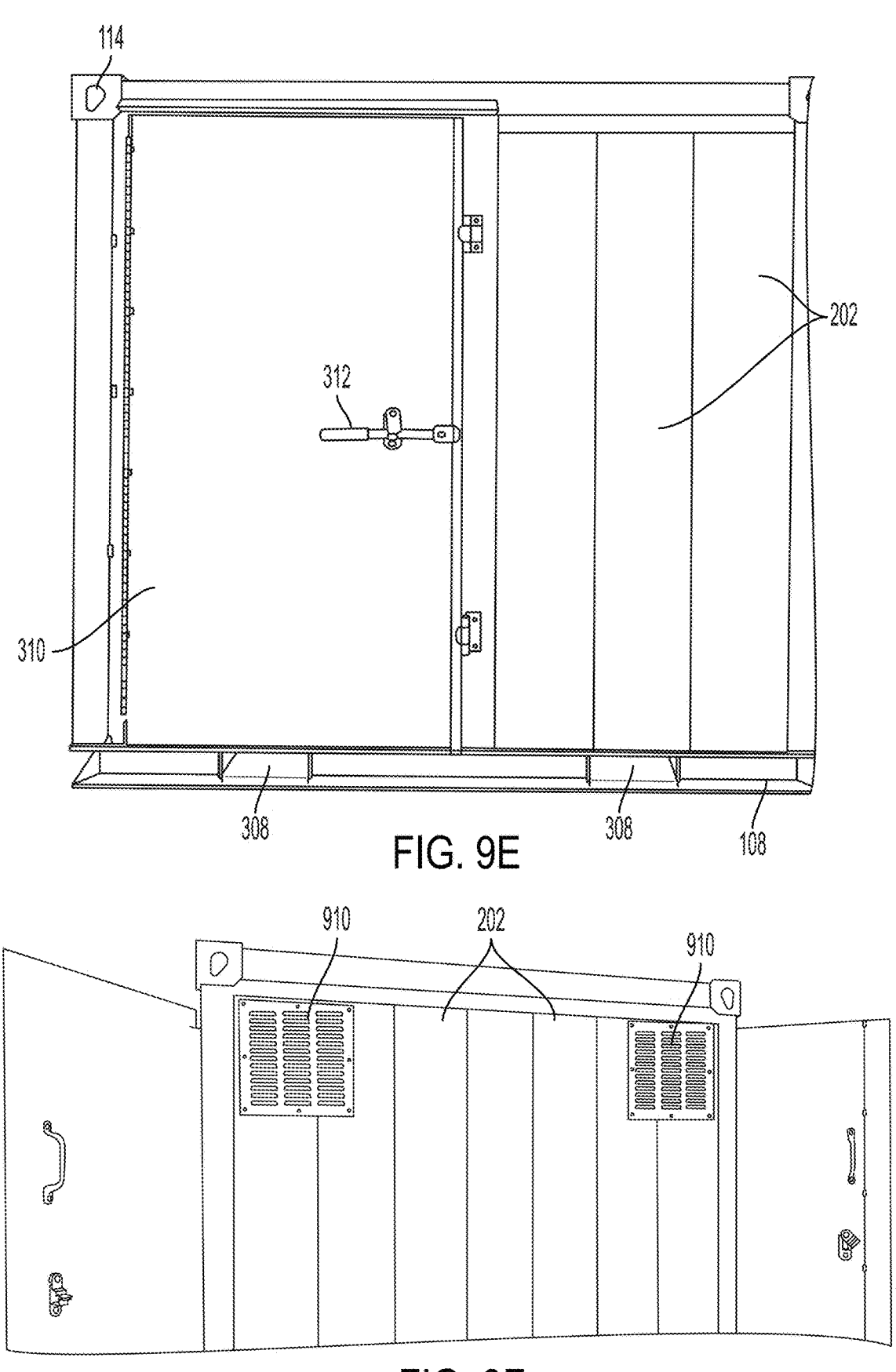
FIG. 9E is a front view of a shorty version of a multipurpose relocatable structure with an end door closed according to various embodiments described below.
FIG. 9F is a rear view of a shorty version of a multipurpose relocatable structure according to various embodiments described below.

In this example configuration, the multipurpose relocatable structure 100 has double side doors 310 in the side of the structure, as well as an end door 310 on one end of the structure. Any number and positioning of doors 310 may be used without departing from the scope of this disclosure. As shown in the interior views of FIGS. 9B and 9C, the interior configuration 904 includes battery shelves and charging stations. The structure is configured with sufficient electrical power and corresponding connections suitable for the particular configuration, which in this example is for charging batteries. Any number and type of ventilation fans 906 may be mounted to the interior of the structure. Similarly, any number of vents 910 (as shown in FIG. 9F) may be placed within one or more walls 104 of the structure to facilitate airflow and cooling through the interior. FIG. 9D illustrates how panels 202 or other dividing mechanisms may be used to partition any portion of the interior of a structure as desired according to the specific implementation and needs of the structure.

Figure 10:
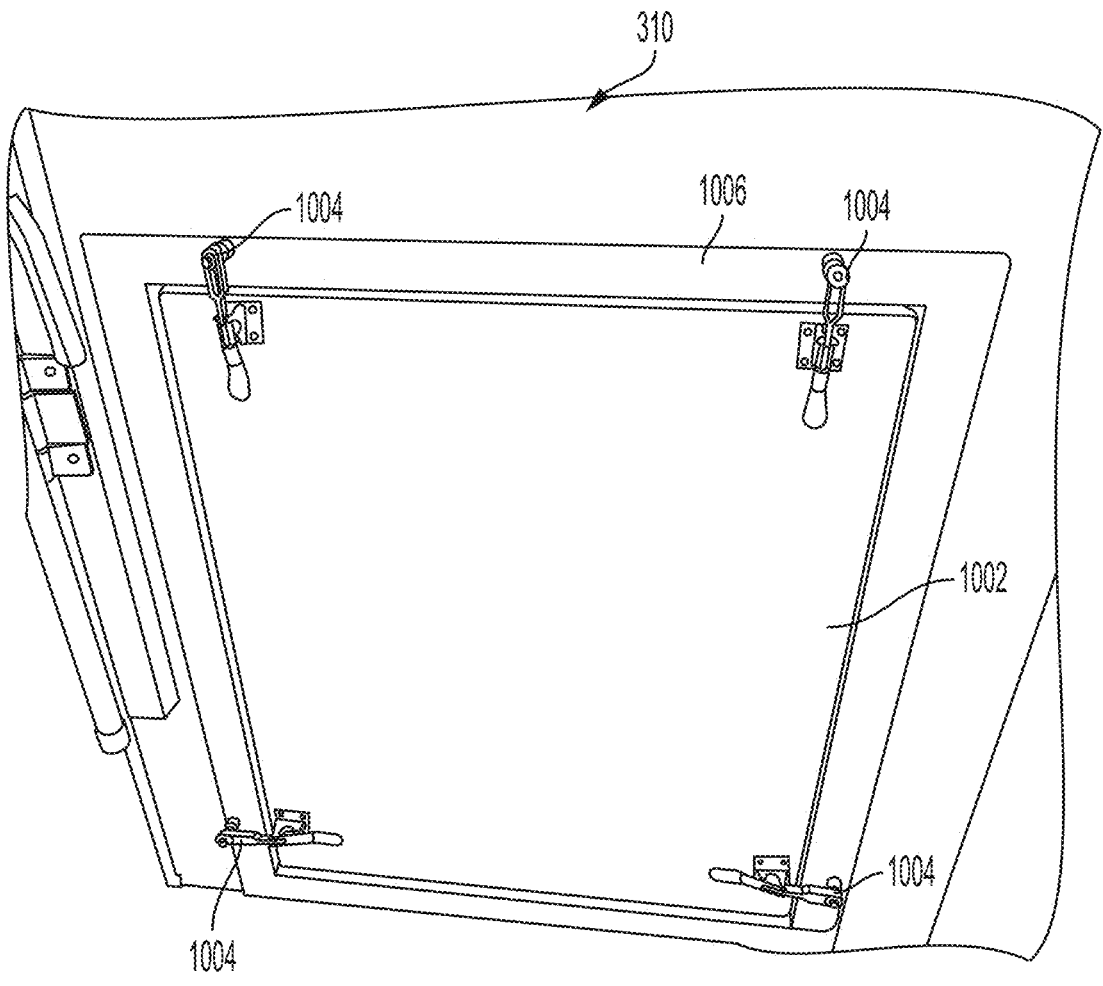
FIG. 10 is a front view of an emergency exit panel of a multipurpose relocatable structure according to various embodiments described below.
Figure 11:
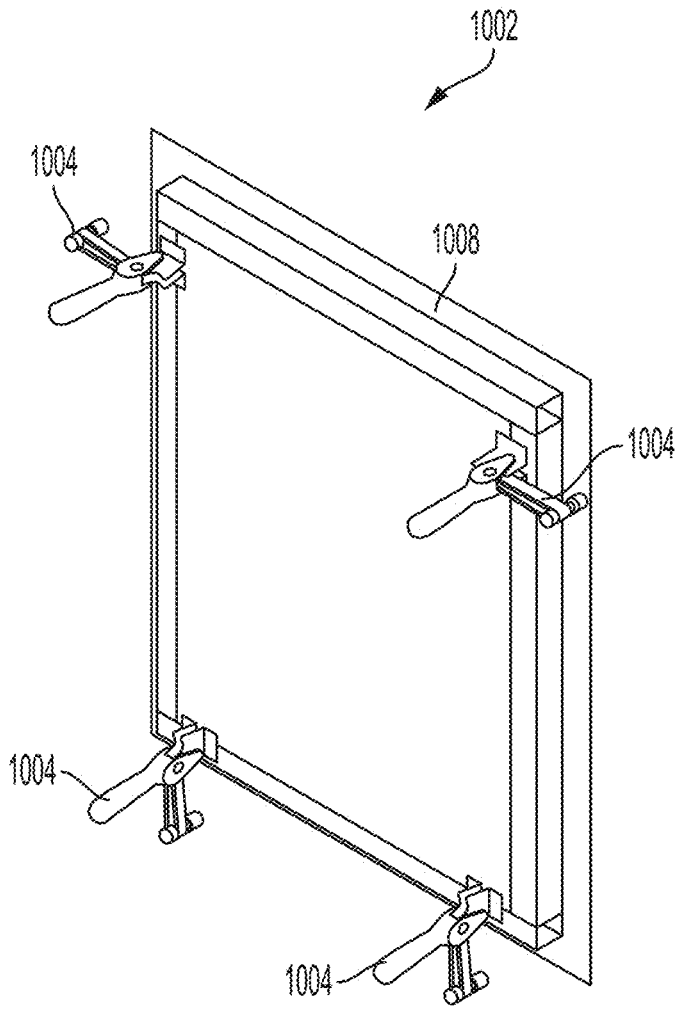
FIG. 11 is a rear perspective view of an emergency exit panel of a multipurpose relocatable structure according to various embodiments described below.
Figure 12:
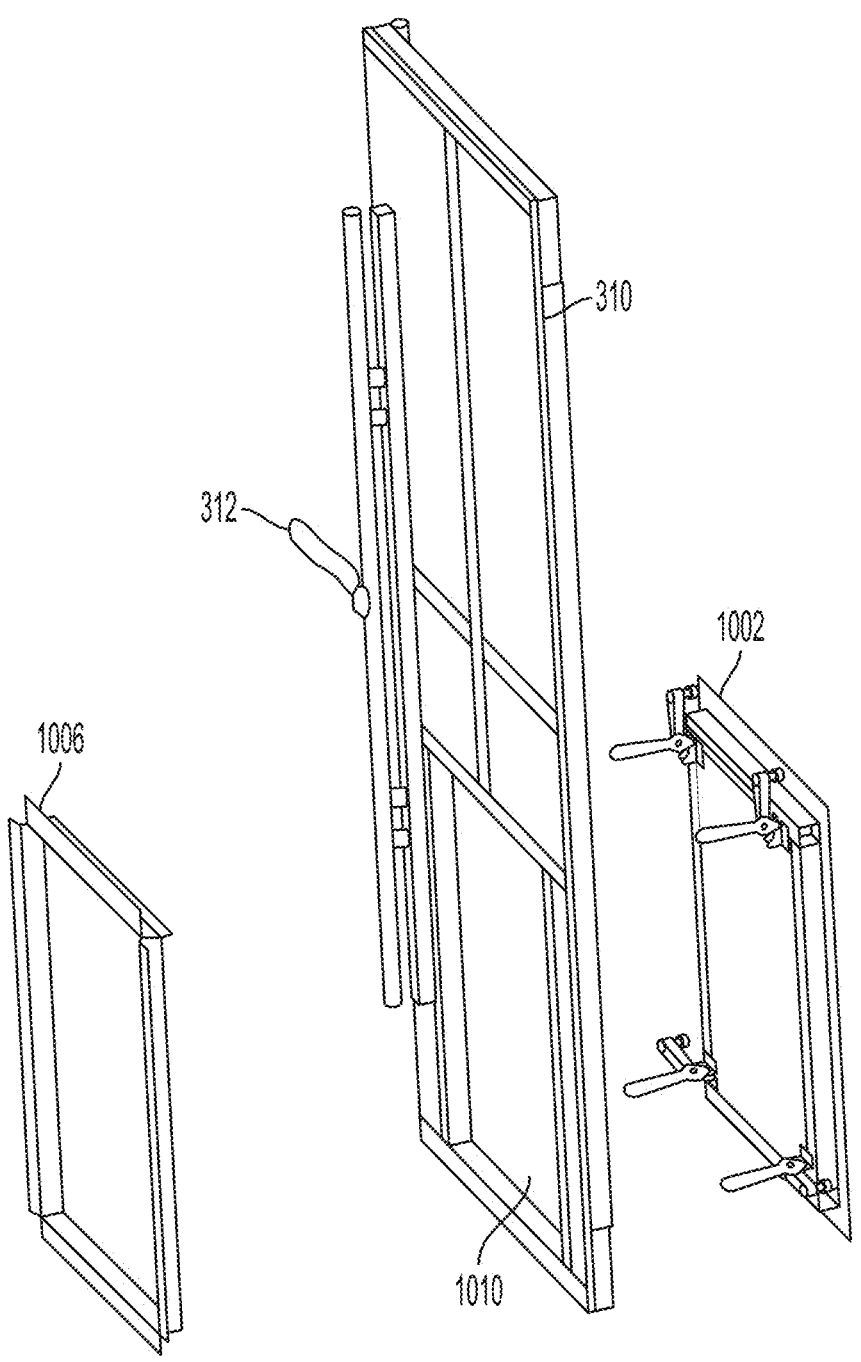
FIG. 12 is an exploded view of a door of a multipurpose relocatable structure showing an emergency exit panel according to various embodiments described below.

According to various embodiments, the multipurpose relocatable structure 100 may include one or more emergency escape hatches 314 within one or more doors 310 or walls 104. FIGS. 10-12 show various views of an emergency escape hatch 314. FIG. 10 shows an emergency escape hatch 314 installed within a door 310, as viewed from an interior of the multipurpose relocatable structure 100. In this example, the emergency escape hatch 314 has four release handles 1004 that, when pulled toward the user, are operative to disengage from a reinforced border 1006 of the door 310. After disengagement, the emergency escape hatch 314 may be pushed or kicked outward and through the door 310 to an exterior of the structure, providing an access hole 1010 (shown in FIG. 12) through which persons may egress the structure. FIG. 11 shows the emergency escape hatch 314 with the release handles 1004 pulled to disengage the corresponding latch mechanisms from the reinforced border 1006. Any number and type of release handles 1004 may be used without departing from the scope of this disclosure.

As shown in FIG. 11, the emergency escape hatch 314 has an exterior panel that is larger than the opening through the door 310, which results in an engagement surface 1008 that extends around the perimeter of the emergency escape hatch 314. FIG. 12 shows an exploded view of the door 310 and corresponding emergency escape hatch 314 and reinforced border 1006. The engagement surface 1008 abutting a surface of the exterior of the door 310 prevents the emergency escape hatch 314 from traversing through the access hole 1010 into the interior of the structure. The latch mechanisms operatively coupled to the release handles 1004 abut and apply a force to the reinforced border 1006 when the release handles 1004 are in an engaged configuration adjacent to an interior surface of the escape hatch, preventing the emergency escape hatch 314 from traversing through the access hole 1010 to the exterior of the structure. However, when the release handles are pulled inward toward the interior of the structure, the corresponding latch mechanisms release the force applied to the reinforced border 1006 and move inward, allowing the emergency escape hatch 314 to traverse through the access hole 1010 to the exterior of the structure and providing access to the access hole 1010 for egress.

Figures 13, 14:
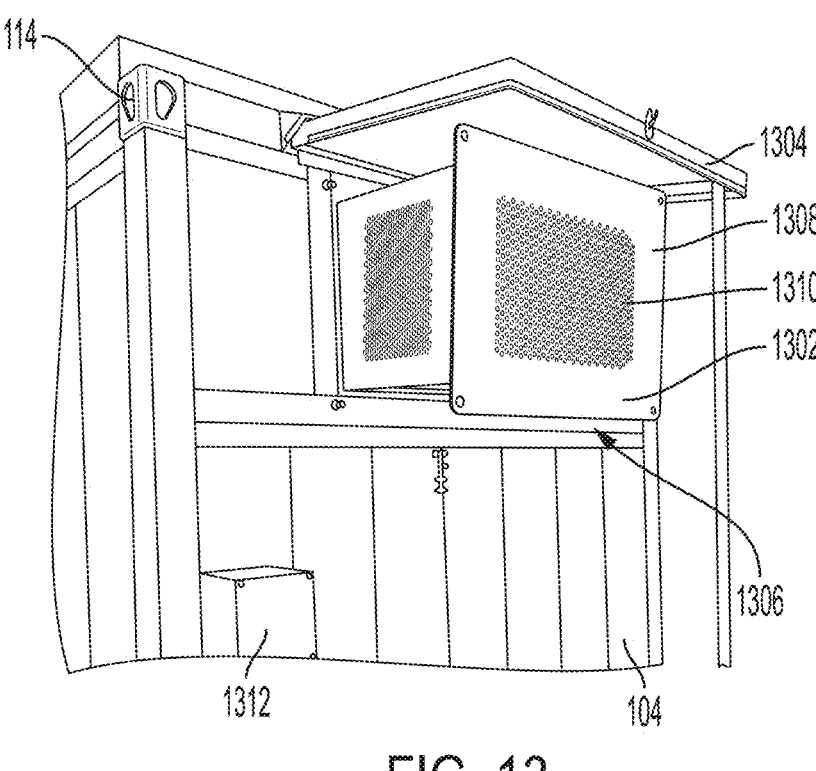
FIG. 13 is a rear perspective view of a multipurpose relocatable structure showing an environmental control unit (ECU) in an operational configuration according to various embodiments described below.
FIG. 14 is a close-up view of an ECU from the interior of a multipurpose relocatable structure showing the ECU in the operational configuration according to various embodiments described below.
Figure 15:
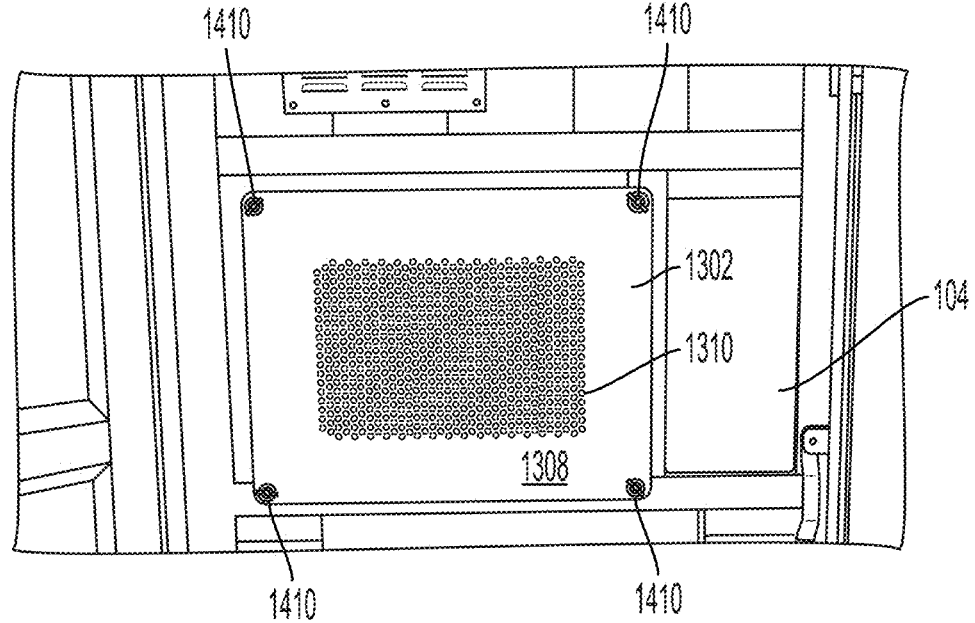
FIG. 15 is a close-up view of an ECU from the exterior of a multipurpose relocatable structure showing the ECU in a transport configuration according to various embodiments described below.

Turning now to FIGS. 13-15, various configurations of an ECU system 1302 of a multipurpose relocatable structure 100 will be described. The multipurpose relocatable structure 100, and especially the shorty version, is configured to minimize any projection of components beyond an exterior plane of each wall, as defined by the lifting corners 114. In doing so, the multipurpose relocatable structure 100 may be, placed in structures, transported, positioned abutting other structures and structures, and generally maneuvered without fear of damaging any components that project outward from the structure. One corresponding feature of the multipurpose relocatable structure 100 that maximizes the interior volume of the structure during use while minimizing the exterior footprint for transport includes the reconfigurable ECU system 1302.

FIG. 13 is a rear perspective view of a multipurpose relocatable structure 100 showing an ECU system 1302 in an operational configuration. The ECU system 1302 includes an ECU that is slideable to extend substantially within the structure for transport, and to extend from the exterior wall 104 for operational use. In the operational configuration shown in FIG. 13, the ECU system 1302 extends outward from an exterior wall 104 such that the ECU system 1302 is substantially positioned on the outside of the structure while fluidly coupled to the interior. According to one embodiment, a protective cover 1304 may rotate upward to an open position in which the ECU system 1302 is substantially covered from above to protect from rain and the elements. When the ECU system 1302 is not present or in a transport configuration, the protective cover 1304 may be rotated downward to cover the ECU system 1302 or the aperture receiving the ECU system 1302. The ECU system 1302 has an outer plate 1308 that has an inlet 1310 for receiving external air. The outer plate 1308 has an outer border 1306 that is sized to abut the wall 104 of the structure when positioned in the transport configuration.

FIG. 14 shows the ECU system 1302 from the interior of the structure when the ECU is configured in the operational configuration in which the ECU system 1302 projects outward from the exterior wall 104 as shown in FIG. 13. An inner plate 1402 abuts the inside surface of the wall 104, which has bolts that extend through the inner plate 1402 to receive wingnuts 1410 for securing the ECU system 1302 in the operational configuration. Handles 1404 extend from the inner plate 1402 for gripping while reconfiguring the ECU system 1302 between operational and transport configurations. The inner plate 1402 has an outlet 1406 for routing conditioned air from the ECU system 1302 to the interior of the structure. Controls 1408 allow for the user to adjust the characteristics of the conditioned air from the ECU system 1302.

FIG. 15 shows the ECU system 1302 from the exterior of the structure when the ECU is configured in the transport configuration. In this configuration, the ECU system 1302 is substantially positioned within the interior volume of the structure such that the outer plate 1308 abuts the outside of the wall 104 of the structure and is secured in place via wingnuts 1410. In this transport configuration, the ECU system 1302 is substantially positioned within the structure and protected from damage. Any type of known rails or sliding mechanism may be used to facilitate movement between the operational and transport configurations, as well as to support the ECU system 1302 as it extends from a wall.

As discussed briefly above, the multipurpose relocatable structure 100 provides substantial lifting and tie down capabilities. Specifically, the lifting corners 114 of the multipurpose relocatable structure 100 provide a mechanism by which the multipurpose relocatable structure 100 may be readily attached to a crane or other lifting vehicle or device or used as tie down anchors for securing the structure to a vehicle. According to one example, the lifting corners 114 are structurally robust enough to provide, along with the structural characteristics of the multipurpose relocatable structure 100 itself, a load capacity of approximately 8,250 pounds, with a safety factor of 3.2. These features significantly increase the lifting capacity of the multipurpose relocatable structure 100.

Figure 16:
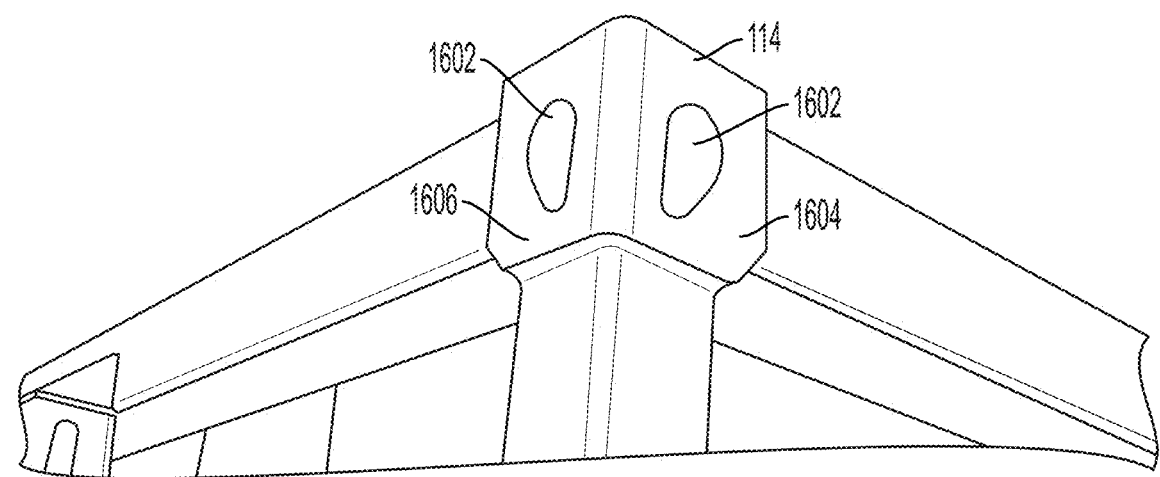
FIG. 16 is a close-up perspective view of a lifting corner of a multipurpose relocatable structure according to various embodiments described below.
Figure 17:
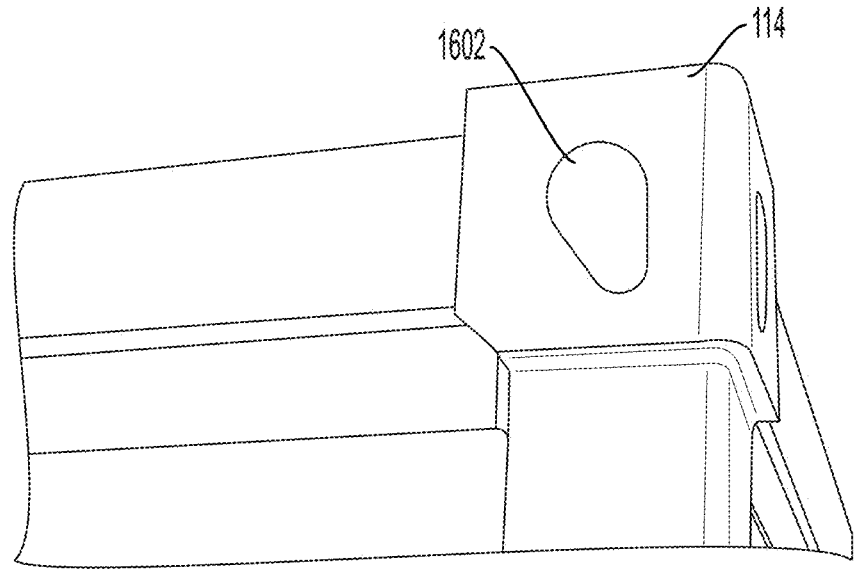
FIG. 17 is a close upside view of a lifting corner of a multipurpose relocatable structure according to various embodiments described below.

FIGS. 16 and 17 show a close-up perspective view and a side view, respectively, of a lifting corner 114. According to this embodiment, the lifting corner 114 includes a first face 1604 and a second face 1606. The first face 1604 is substantially parallel with a first plane defined by a first wall of the structure. The second face 1606 is substantially parallel with a second plane defined by a second wall of the structure that is adjacent to the first wall. For example, the first face 1604 may be facing an end wall of the structure and the second face 1606 is facing a side wall that is separated from the end wall by a corner post 602. In this manner, the first face 1604 defines the first plane that is substantially normal to the second plane defined by the second face 1606. According to one embodiment, the lifting corner 114 may include 3 pieces of ½ inch or other suitable steel, including a solid top face, the first face 1604, and the second face 1606.

Figure 18A:
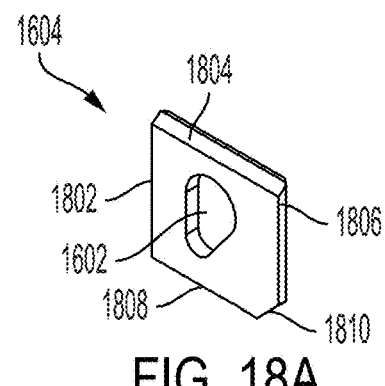
FIG. 18A is a perspective view of a first face of a lifting corner of a multipurpose relocatable structure according to various embodiments described below.
Figure 18B:
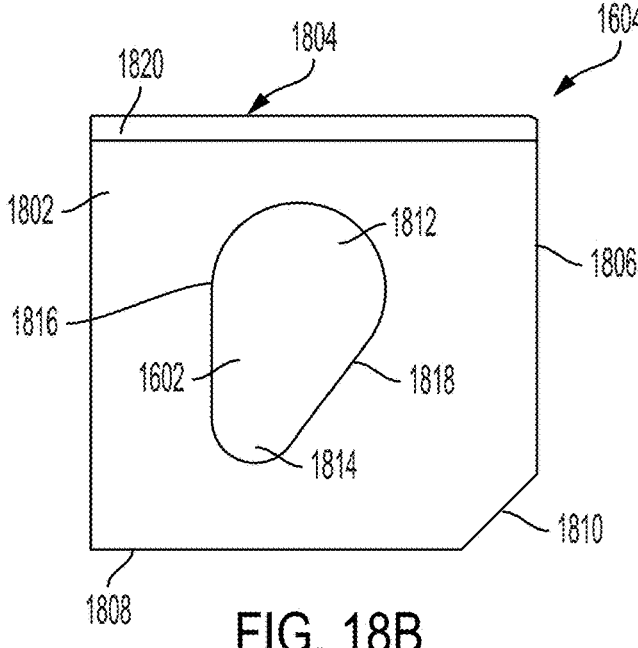
FIG. 18B is a front view of a first face of a lifting corner of a multipurpose relocatable structure according to various embodiments described below.
Figure 18C:
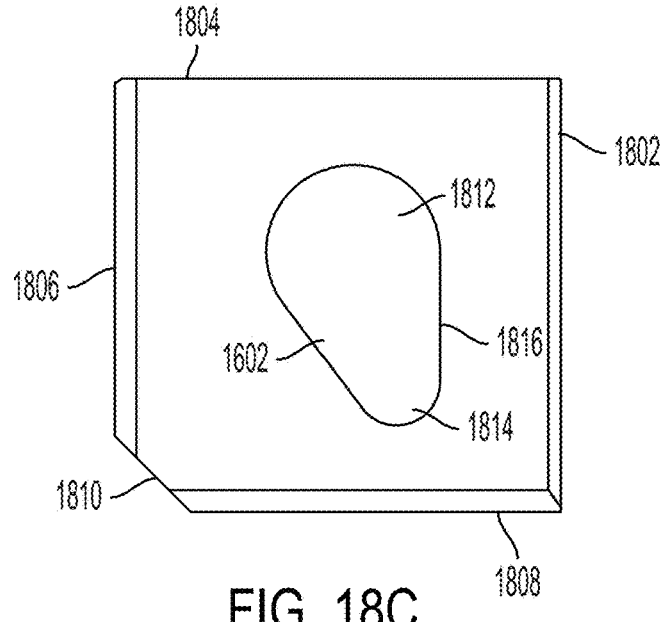
FIG. 18C is a rear view of a first face of a lifting corner of a multipurpose relocatable structure according to various embodiments described below.

Each of the first face 1604 and the second face 1606 includes a securement aperture 1602 that allows for a chain, hook, and/or other tie-down or lifting mechanism to pass through or to attach to. FIGS. 18A-18C show perspective, front, and rear views, respectively, of a first face 1604 of a lifting corner 114 according to various embodiments. One with ordinary skill in the art would recognize that the second face 1606 comprises identical features but configured for attachment to the first face 1604 and other components of the lifting corner 114 and structure as shown in the Figs. and described herein.

The first face 1604 includes a front edge 1802, a top edge 1804, a rear edge 1806, a bottom edge 1808, and a chamfered corner 1810. The front edge 1802 is chamfered or angled to mate with a corresponding front edge of a second face 1606. The front edge 1802 may be formed or cut with an approximately 45-degree angle so that when the two faces are mated, they form an approximately 90-degree angle around the corner of the structure. Similarly, the top edge 1804 may be chamfered to mate with a corresponding edge of a top face of the lifting corner 114. The rear edge 1806 and the bottom edge 1808 may be chamfered as desired according to the weld or attachment mechanism to the upper end posts 604, upper side posts 606, and corner posts 602. The chamfered corner 1810 may be chamfered or alternatively be substantially squared off.

The securement aperture 1602 provides a unique means for providing a lifting and tie-down mechanism for the structure. The securement aperture 1602 is defined by a first circular opening 1812 and a second circular opening 1814 connected by tangential cuts to create a front aperture edge 1816 and a rear aperture edge 1818. Specifically, according to one embodiment, the radius of the first circular opening 1812 is two times the radius of the second circular opening 1814. The circular openings are positioned to provide a front aperture edge 1816 that is substantially vertical. The rounded edges of the securement aperture 1602 distributes the stress and forces applied to the lifting corner 114. The first circular opening 1812 is larger to receive and accommodate a hook, chain, and/or other lifting or securing device, while the second circular opening 1814 facilitates receipt and attachment of the lifting or securing device while minimizing the opening to maximize the strength of the lifting corner 114.

Figure 19B:
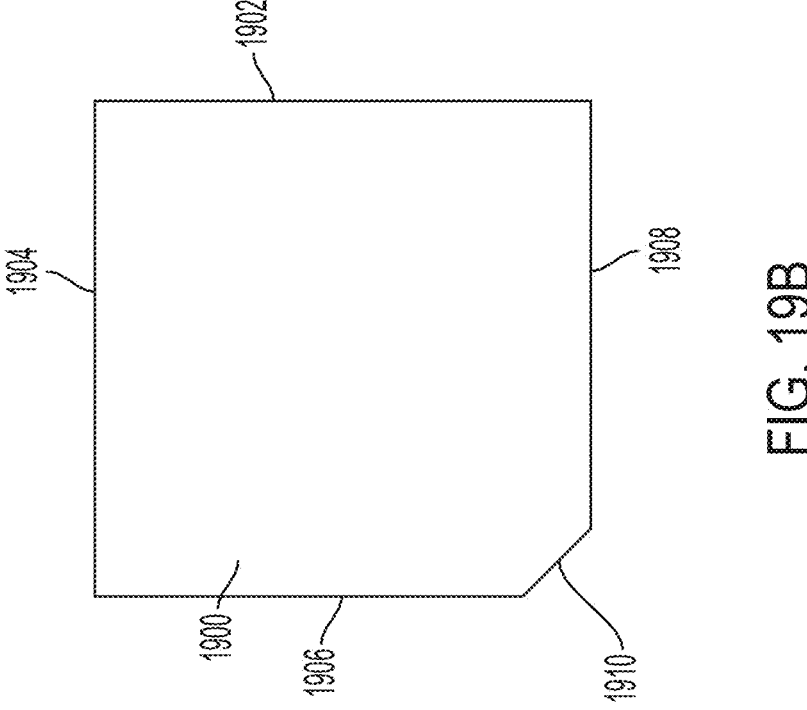
FIGS. 19A and 19B are front and rear views, respectively, of a top face of a lifting corner of a multipurpose relocatable structure according to various embodiments described below.
Figure 19A:
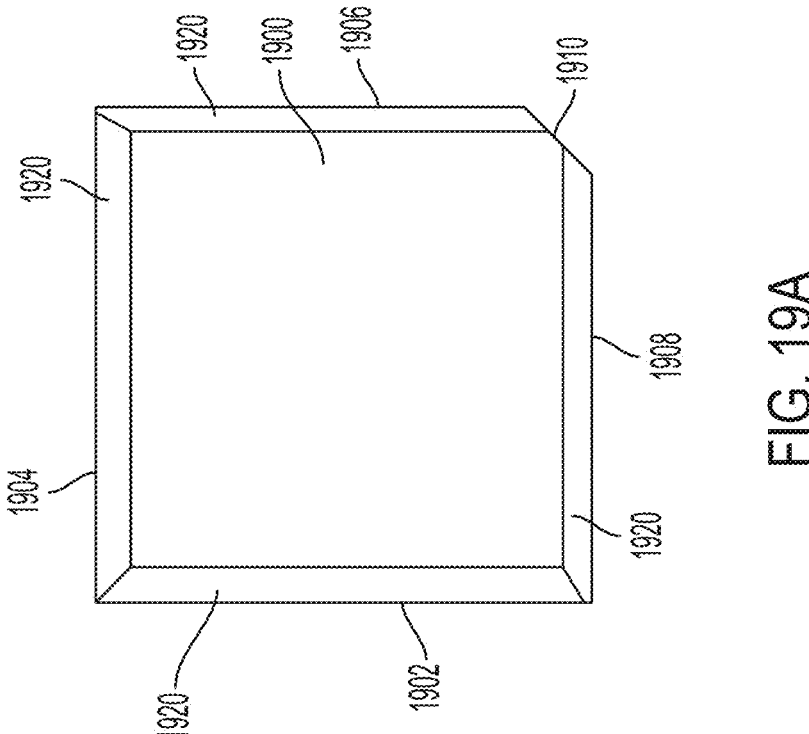

FIGS. 19A and 19B show front and rear views, respectively, of a top face 1900 of a lifting corner 114 of a multipurpose relocatable structure 100. The front view would be visible from within the lifting corner 114 looking upward. The rear view would be visible from the top of the lifting corner 114 looking downward on the top face 1900. The top face 1900 has a first face edge 1902 configured for coupling to the top edge 1804 of the first face 1604. The top face 1900 has a second face edge 1904 configured for coupling to the top edge of the second face 1606. A third edge 1906 and a fourth edge 1908 face the ceiling pan 110 and meet at a chamfered corner 1910.

The configuration of the securement aperture 1602 allows for a chain or strap (e.g., a conventional ⅜-inch chain and corresponding hook) to be threaded through both securement apertures 1602 of a single lifting corner 114 and secured to itself. Alternatively, a hook or component on a chain or strap may be hooked into or otherwise attached to a securement aperture 1602 of a lifting corner 114, particularly when tying the structure down to a vehicle. A chain or ratchet strap may also be secured to the bed of a vehicle, passed through the securement aperture 1602 in the first face 1604, threaded out of the securement aperture 1602 of the second face 1606, and secured to the bed of the vehicle.

According to one example, the front edge 1802 is approximately 5 inches in length and the top edge 1804 is approximately 5.15 inches in length. The center of the second circular opening 1814 is approximately 1.5 inches from the bottom edge 1808, and the center of the first circular opening 1812 is approximately 1.5 inches above the center of the second circular opening 1814. The first face 1604, the second face 1606, and the top face 1902 may each be manufactured from 0.5-inch steel plate. It should be appreciated that any suitable thicknesses and dimensions of the lifting corners 114 and corresponding components may be used without departing from the scope of this disclosure.

Figure 20:
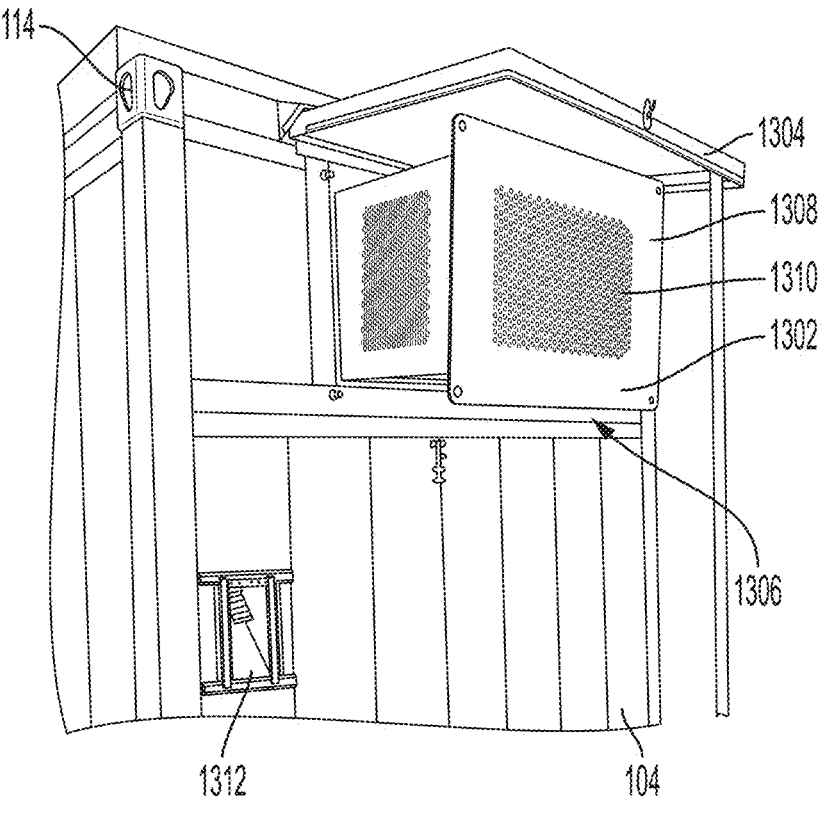
FIG. 20 is a front perspective view of a protected electrical connector on a multipurpose relocatable structure according to various embodiments described below.
Figure 21:
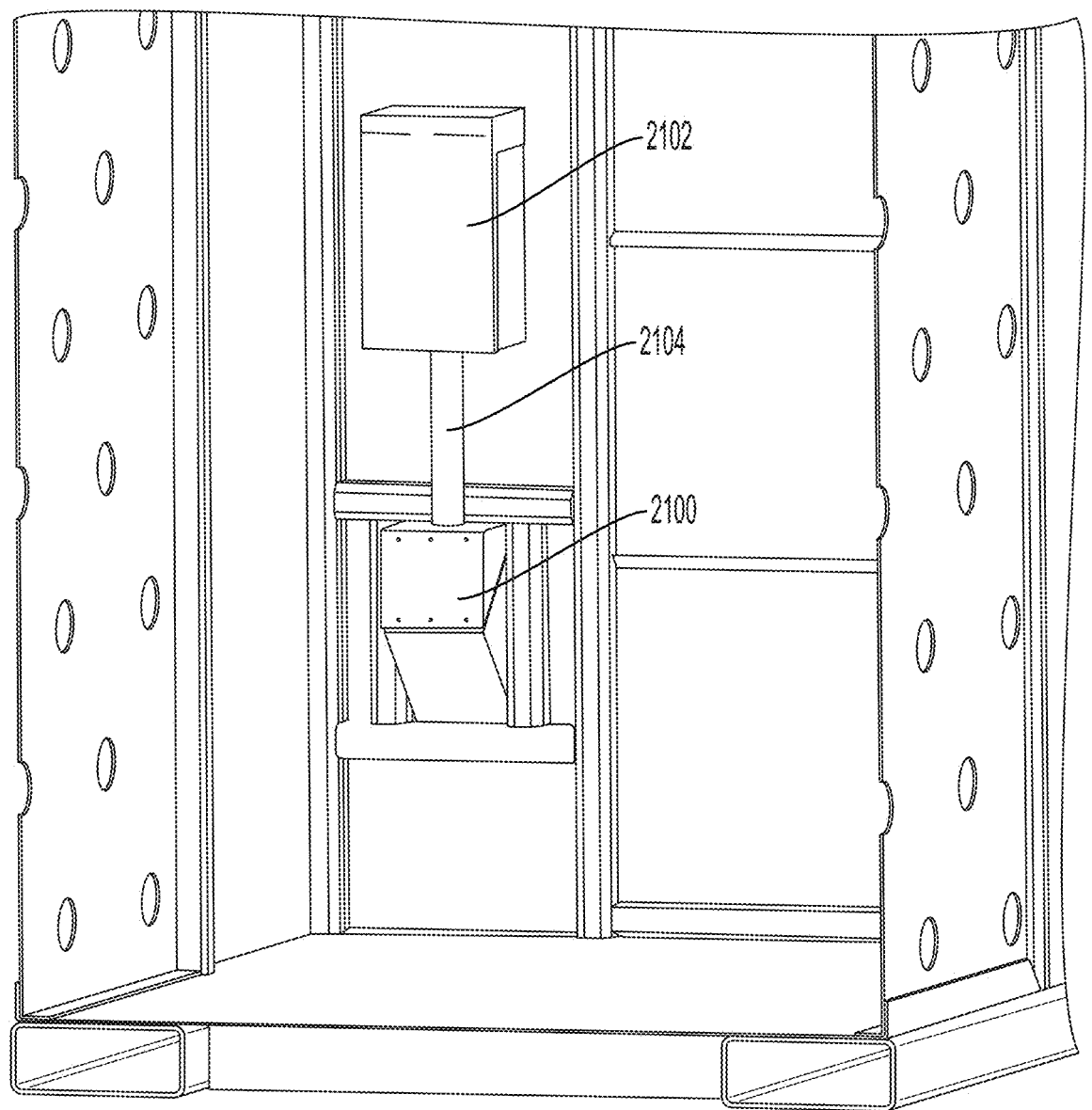
FIG. 21 is a rear perspective view of a protected electrical connector on a multipurpose relocatable structure according to various embodiments described below.
Figure 22:
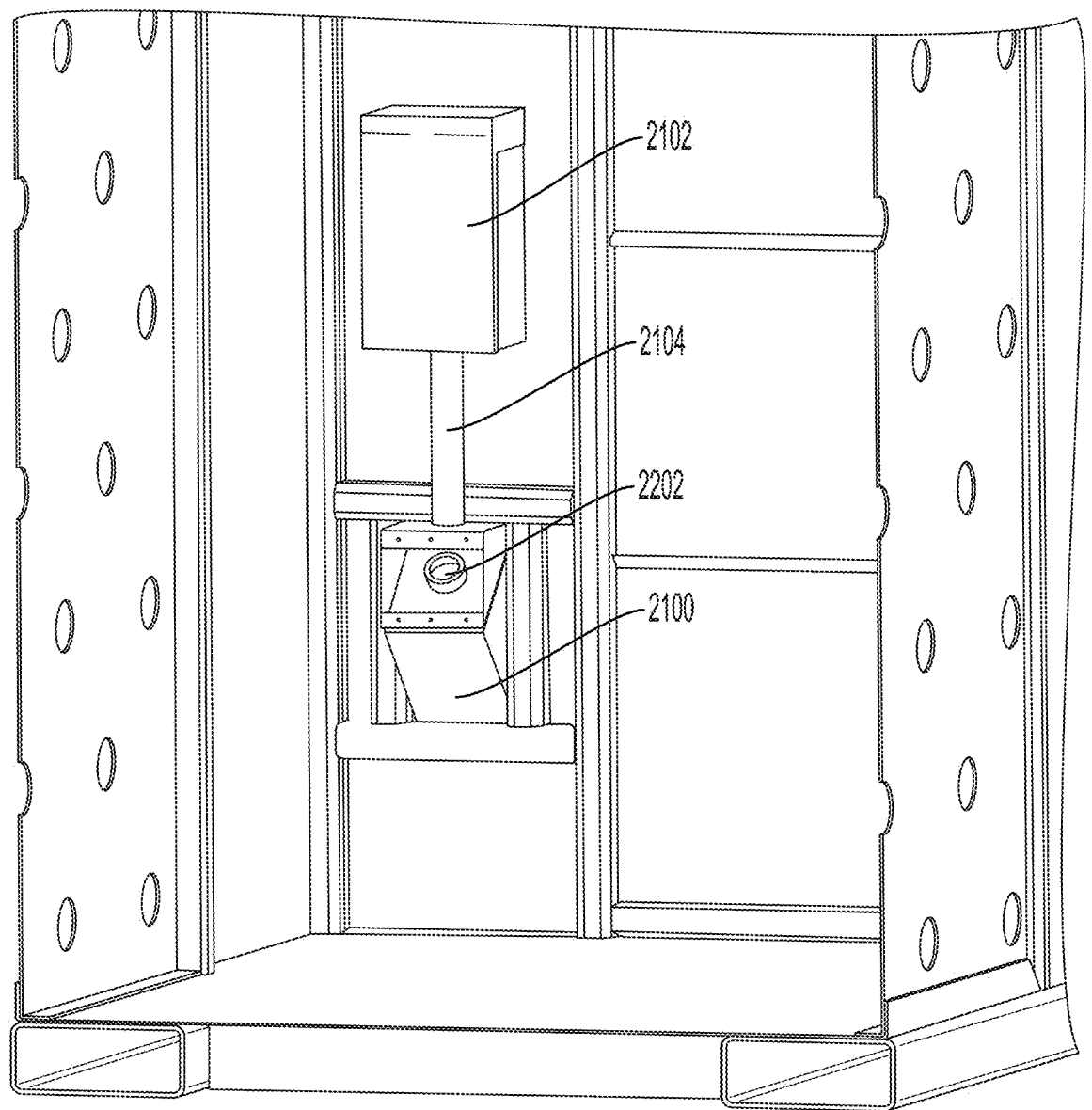
FIG. 22 is a rear perspective view of a protected electrical connector with a portion of a housing removed according to various embodiments described below.

FIGS. 20-22 show various views of a protected electrical connector 1312 that is used to electrically connect the multipurpose relocatable structure and interior circuitry to an external power source, such as a generator or a power grid. According to one embodiment, the protected electrical connector 1312 is utilized with the shorty structure 902. Conventional designs often include power inlets that include hardware that is mounted to the exterior of the structure. In doing so, the electrical connector projects outward from the wall of the structure, subjecting the connector to damage caused by impact with a vehicle or other structure during deployment. However, the protected electrical connector 1312 disclosed herein provides for a recessed connector that does not project outward from the wall 104. Rather, as shown in FIG. 20, the protected electrical connector 1312 is positioned within a wall 104 between a plane defined by an external surface of the wall and an interior of the multipurpose relocatable structure 100. The interface that mates with the external electrical connector from the power source is configured at an angle with respect to the plane defined by the external surface of the wall 104. By angling the interface and recessing the protected electrical connector 1312, the connector is protected from impact damage, yet accessible for quick and easy hook up and disconnect to and from an external power source.

FIG. 21 shows an interior view of the structure, showing a rear side 2100 of the protected electrical connector 1312. FIG. 22 shows the rear side 2100 of the protected electrical connector 1312 with a plate or portion 2100 of the connector housing removed to show the back side of the interface where electrical wires (not shown) route electricity from the external electrical connector through a wire conduit 2104 to a circuit breaker 2102.

Laterally Combinable Multipurpose Relocatable Structures

Various embodiments are adapted to allow multiple multipurpose relocatable structures to be laterally combined to form a larger cohesive multipurpose relocatable structure. In various embodiments, each individual multipurpose relocatable structure includes one or more side access openings that may be used by an individual (e.g., an adult human) to pass from one multipurpose relocatable structure to another. The structure and use of various examples of such multipurpose relocatable structures are described below.

Side Access Openings

A multipurpose relocatable structure 100A according to a particular embodiment has at least substantially the same structure (e.g., the same structure) as the multipurpose relocatable structure 100 shown and described with reference to FIG. 1 above except that the side walls 105A, 107A that are on the respective lateral sides of the multipurpose relocatable structure 100A include one or more access openings 130A that are sufficiently sized to allow an adult human to pass through the access opening 130A while walking in an upright orientation. In particular embodiments, these access openings 130A are at least substantially rectangular in shape, although they may be any other suitable shape.

Figures 23, 24:
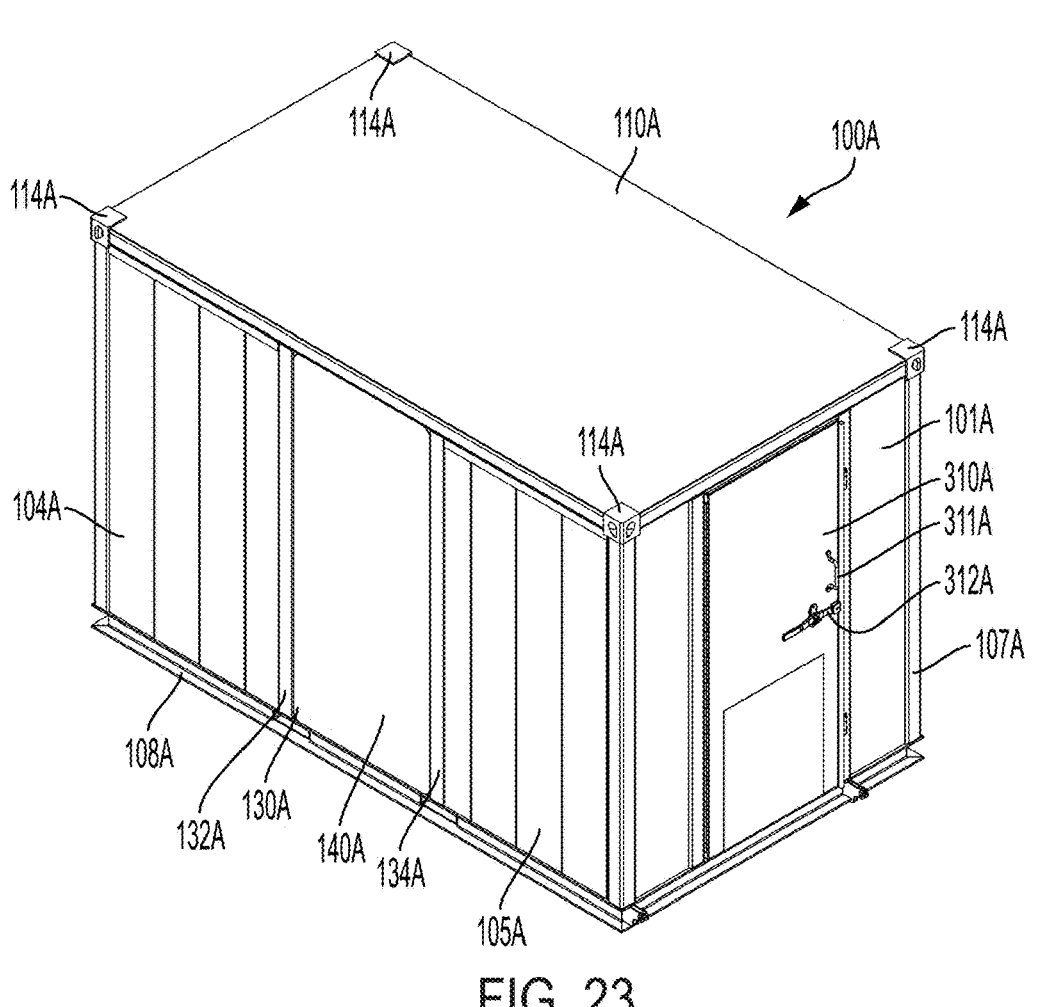
FIG. 23 is a multipurpose relocatable structure with side access openings that are configured to be aligned with (and e.g., permanently or temporarily attached adjacent—e.g., to) one or more similarly structured multipurpose relocatable structures to form a larger integrated structure.
FIG. 24 is front elevation view of the multipurpose relocatable structure of FIG. 23.
Figures 25, 26:
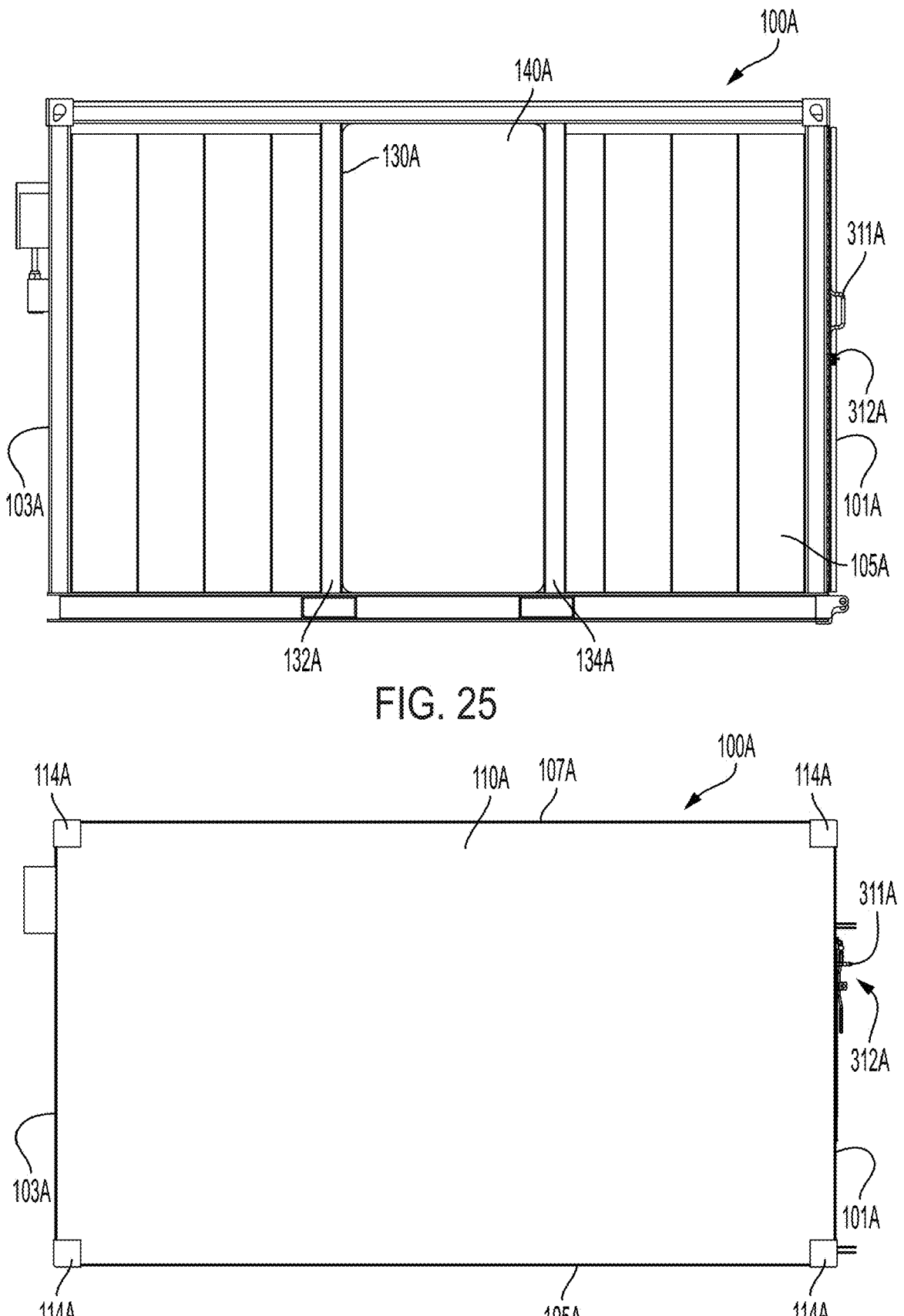
FIG. 25 is a right-side elevation view of the multipurpose relocatable structure of FIG. 23.
FIG. 26 is a top plan view of the multipurpose relocatable structure of FIG. 26.
Figure 33:
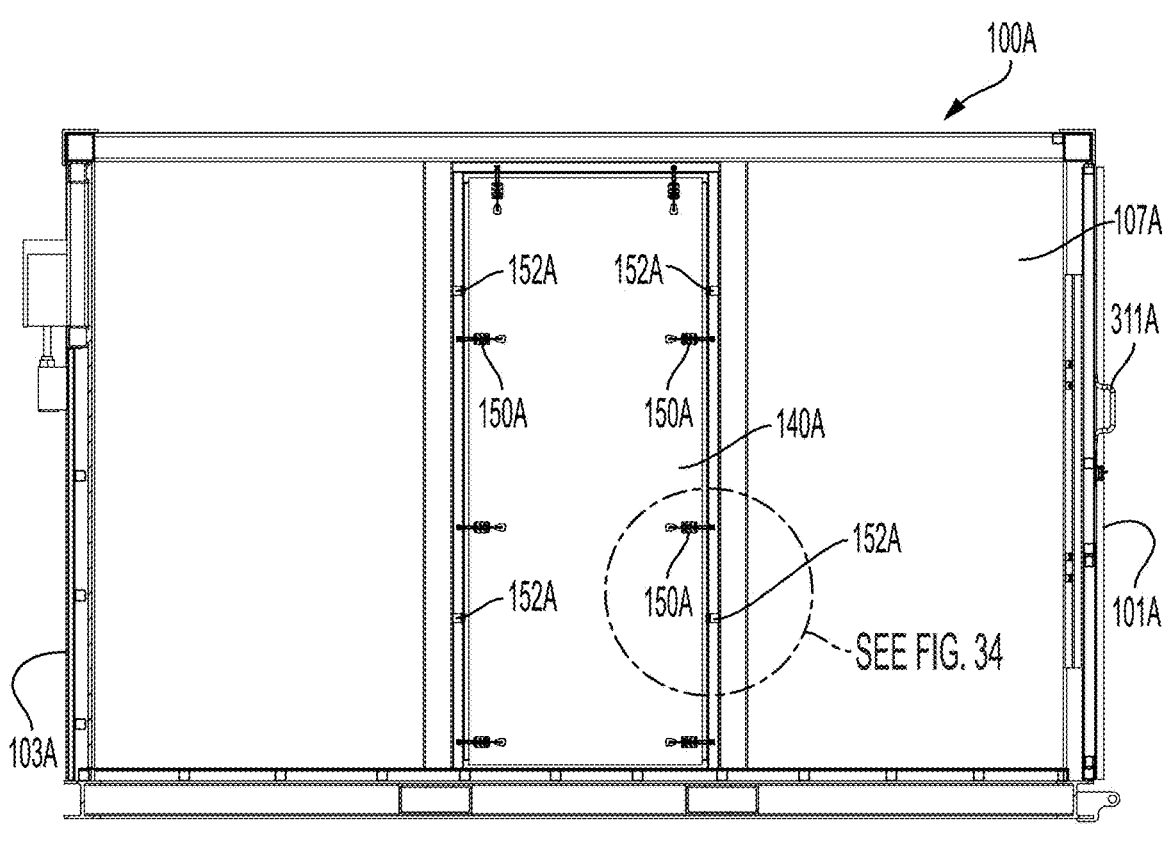
FIG. 33 is a cross-sectional view of the multipurpose relocatable structure of FIG. 26, taken about section 33-33 of FIG. 32.
Figure 34:
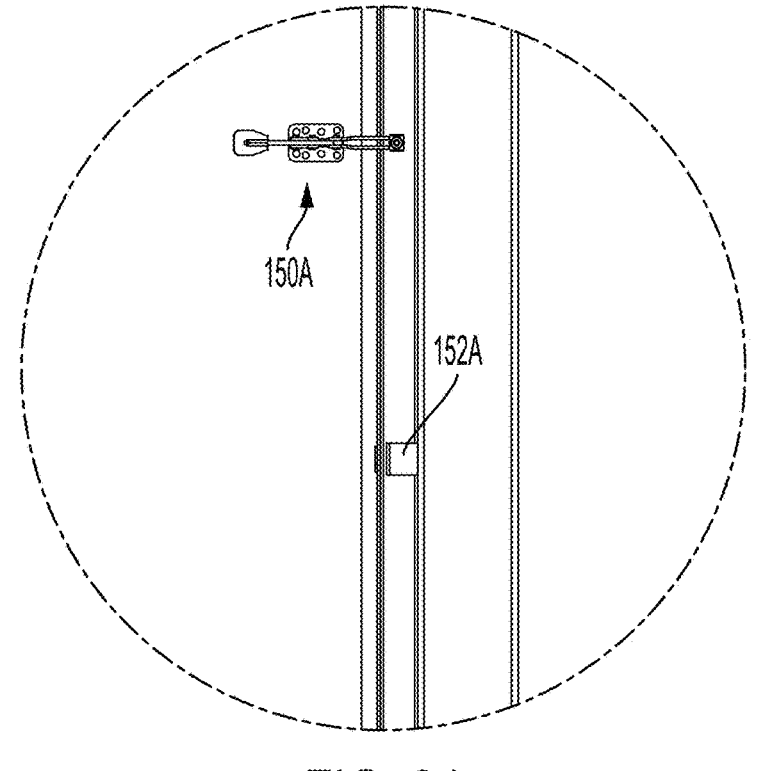
FIG. 34 is a plan detail view of the attachment member and tabs shown in FIG. 33.

A particular example of a multipurpose relocatable structure 100A with side access openings 130A is shown in FIGS. 23-36. As may be understood from these figures, the multipurpose relocatable structure 100A is structurally similar to the multipurpose relocatable structure 100 described in reference to FIG. 1, above, except that the multipurpose relocatable structure's lateral sidewalls 105A, 107A, each define an access opening 130A that is substantially laterally centered on each respective one of the lateral sidewalls 105A, 107A. For example, FIGS. 23 and 25 show a first, substantially rectangular lateral sidewall 105A having a substantially rectangular access opening 130A that is centered on the first lateral sidewall 105A between the front and rear walls 101A, 103A of the multipurpose relocatable structure 100A. In this example, the access opening 130A is defined by right and left lateral frame members 132A, 134A, the multipurpose relocatable structure's ceiling pan 107, and the multipurpose relocatable structure's floor system 108A.

Figures 35, 36:
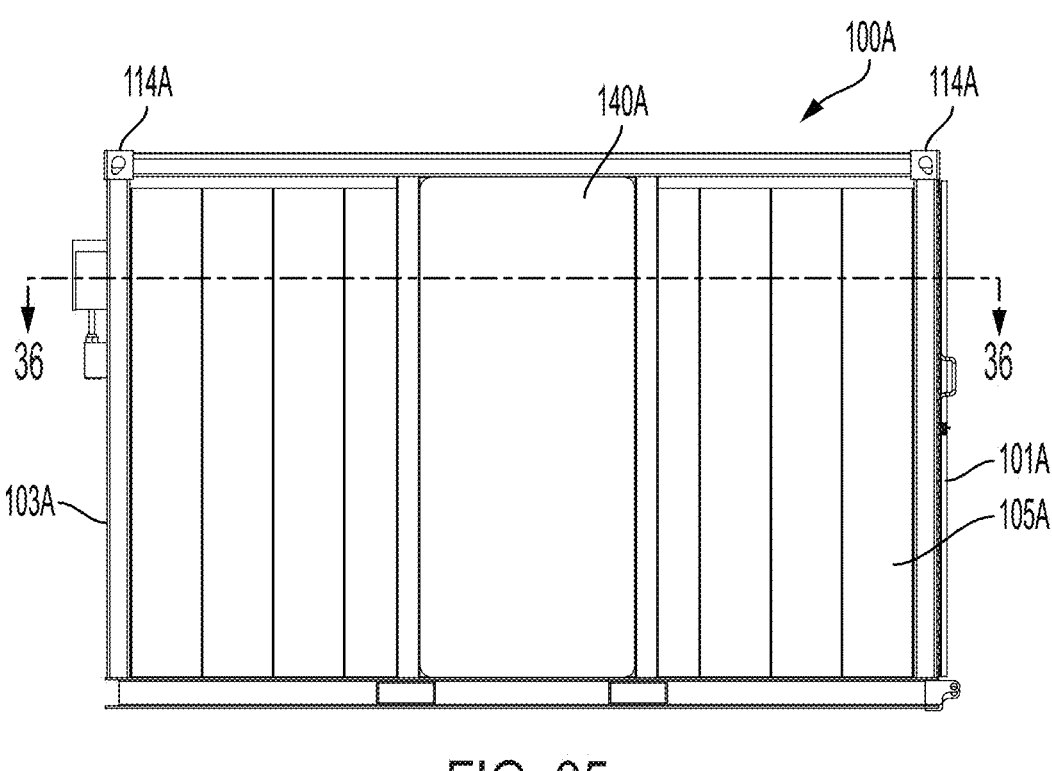
FIG. 35 is a second right side elevation view of the multipurpose relocatable structure of FIG. 23.
FIG. 36 is a cross-sectional plan view of the multipurpose relocatable structure of FIG. 36, taken about section 36-36 of FIG. 35.

The multipurpose relocatable structure's second lateral sidewall 107A, which as shown for example in FIGS. 26 and 36, is spaced apart from and co-facing the multipurpose relocatable structure's first lateral side 105A, is structurally similar to the first lateral sidewall 105A. Like the first lateral sidewall 105A, the second lateral sidewall 107A has a substantially rectangular access opening 130A that is centered on the second lateral sidewall 107A between the front and rear walls 101A, 103A of the multipurpose relocatable structure 100A. The second lateral side wall's access opening 130A is defined by right and left lateral frame members 132A, 134A, the multipurpose relocatable structure's ceiling pan, and the multipurpose relocatable structure's floor system 108A.

Door Panels

In particular embodiments, the multipurpose relocatable structure 100A includes one or more door panels 140A that are each respectively dimensioned and configured to selectively cover one of the multipurpose relocatable structure's access openings 130A (e.g., when the multipurpose relocatable structure is in transit and/or when the multipurpose relocatable structure is set up for use but when the access opening 130A adjacent the door panel 140A is not positioned adjacent a corresponding access opening 130A of another multipurpose relocatable structure 100A). In particular embodiments, each door panel 140A is substantially planar and dimensioned so that the exterior dimensions of the door panel 140A substantially correspond to the exterior dimensions of an access opening 130A that the door panel 140A is dimensioned to selectively cover. For example, both an access opening 130A and a corresponding door panel 140A may be substantially rectangular and the substantially planar door panel 140A may be slightly larger (e.g., about 2%-about 5% larger) than the access opening 130A.

In various embodiments, the door panels are made of a material that is strong enough to prevent an unauthorized entry through the access opening 130A, but that is light enough to allow a single individual (e.g., an adult human) to remove the door panel 140A and move it to a secure location for storage. In other embodiments, the material may be light enough to allow two or more individuals (e.g., adult humans) to remove the door panel 140A and move it to a secure location for storage. Such materials may include, for example, a metal such as steel or aluminum, a suitable plastic material, or any other suitable material.

As may be understood from FIGS. 29 and 30, in particular embodiments, the door panel 140A includes an interior frame 142A that is dimensioned to at least substantially correspond in size and shape to the size and shape of the access opening 130A. For example, in the embodiment shown in FIGS. 23 through 37, the interior frame 142A is substantially in the shape of a rectangle that has substantially the same dimensions as the rectangular perimeter of the access opening 130A. In particular embodiments, the door panel 140A includes a sealing lip 146A that extends at least substantially about the entire perimeter as the interior frame 142A. Suitable weather-stripping material (e.g., rubber or foam weather stripping) may be included on an interior side of this lip to help maintain a weather-tight connection (e.g., a water-tight seal) between the sealing lip 146A and the rest of the multipurpose relocatable structure 100A when the door panel 140A is secured in place adjacent the access opening 130A. In various embodiments, the weather stripping material comprises a length of rubber that is between about 1 inch and 1.5 inches thick and that compresses down to about 0.5 inches to about 0.8 inches when the door panel 140A is secured in place adjacent the access opening 130A.

In particular embodiments, weather stripping may alternatively, or in addition, be provided adjacent the external perimeter of the multipurpose relocatable structure's access opening 130A to create a weather-tight seal between the door panel 140A and a corresponding exterior wall of the multipurpose relocatable structure (e.g., between the door panel's sealing lip 146A and a corresponding exterior wall of the multipurpose relocatable structure 100A) when the door panel 140A is installed operatively in place adjacent the access opening 130A. In this configuration, the weather stripping may also be configured to form a weathertight seal between two multipurpose relocatable structures 100A when the two multipurpose relocatable structures 100A are operatively attached to each other as described herein.

More particularly, in particular embodiments, weather stripping is provided around at least substantially the entire circumference of each access opening 130A so that when two multipurpose relocatable structures 100A are operatively attached together, a weatherproof seal (e.g., a waterproof seal) is created at least substantially around the corresponding access openings 130A of the respective connected multipurpose relocatable structures 100A. In particular embodiments, this weather stripping is substantially in the shape of a substantially continuous rectangle that extends at least substantially around each access opening 130A and which, in various embodiments, may be substantially centered around the access opening. In particular embodiments, the weather stripping may be spaced evenly apart from the access opening's perimeter at least substantially about the perimeter of the access opening (e.g., between about 0.01 inches and about 3 inches apart from the access opening 130A). In particular embodiments, the weather stripping extends substantially around and abuts the access opening 130A.

The weather stripping may be made of any suitable material. In various embodiments, the weather stripping material comprises a length of rubber that is between about 1 inch and 1.5 inches thick and that compresses down to about 0.5 inches to 0.8 inches when the door panel 140A is secured in place adjacent the access opening 130A or when two multipurpose relocatable structures 100A are operatively installed adjacent each other as described above so that their respective access openings 130A align to permit a weatherproof (e.g., waterproof) passage between the two multipurpose relocatable structures 100A.

As shown in FIGS. 29 and 30, the interior frame 142A may be at least substantially centered relative to the outer perimeter 143A of the door panel 140A so that the outer parameter of the interior frame 142A is spaced substantially uniformly apart from the outer perimeter 143A of the door panel 140A. In the example shown in FIG. 30, for example, the interior frame 142A is substantially centered relative to the outer perimeter 143A of the door panel 140A so that there is a substantially uniform distance of between about 1 inch and about 2 inches between the respective outer perimeters of the interior frame 142A and the door panel 140A. As noted above, for purposes of this disclosure, the portion of the door panel 140A that extends between the outer perimeter of the interior frame 142A and the outer perimeter of the door panel 140A is referred to as a sealing lip 146A.

In particular embodiments, due at least in part to the structural dimensioning described immediately above, when the door panel 140A is operatively positioned in place adjacent the access opening 130A, the interior frame 142A extends at least partially and in some embodiments at least substantially entirely into the access opening 130A so that weather stripping material 144A on the exterior perimeter of the interior frame 142A lies substantially flush with the interior of the access opening 130A. In this way, the weather-stripping material 144A and the interior of the access opening 130A cooperate to form a substantially airtight seal between the door panel 140A and a respective lateral sidewall of the multipurpose relocatable structures 100A. This arrangement also allows the sealing lip 146A to lie substantially flush with the exterior portion of the lateral sidewall of the multipurpose relocatable structures 100A which may help to prevent unauthorized removal of the door panel 140A. In addition, this arrangement may prevent the lateral or vertical movement of the door panel 140A relative to the respective lateral sidewall of the multipurpose relocatable structure 100A so that the door panel 140A stays securely in place relative to the lateral sidewall of the multipurpose relocatable structure 100A. In certain embodiments, suitable weather-stripping material may be provided (alternatively or in addition) on the interior of the sealing lip 146A to provide the desired seal between the door panel 140A and the rest of the multipurpose relocatable structure 100A.

In various embodiments, the multipurpose relocatable structure 100A includes a selectively-removable faux wall portion that is sized and dimensioned to cover the interior entrance to the access opening 130A when the access opening 130A is not in use (e.g., when the door panel 140A is operably positioned in place adjacent the access opening 130A). This faux wall portion may comprise (e.g., be), for example, a piece of material (e.g., metal or plastic) that is substantially in the shape of the interior entrance of the access opening 130A, or just larger than, and substantially in the shape of the interior entrance of the access opening 130A. In various embodiments, the faux wall portion is substantially rectangular.

In particular embodiments, the faux wall portion includes a plurality of fastener openings that are dimensioned to allow suitable fasteners (e.g., bolts) to extend through the fastener openings and into corresponding threaded recesses in the multipurpose relocatable structure's wall so that the bolts hold the faux wall portion in place adjacent the wall. When in this position, the faux wall portion may cover the access opening 130A. In a particular embodiment, when the faux wall portion is operably installed adjacent the access opening 130A, the faux wall portion is substantially flush against the adjacent interior wall of the multipurpose relocatable structure 100A so that the wall and the faux wall portion at least substantially appear to be a continuous wall.

In particular embodiments, the faux wall portion is adapted to be used as a table top or desk top when not operably attached adjacent the access opening 130A. For example, the faux wall portion may include a plurality of threaded openings (e.g., four threaded openings that are adjacent four respective corner portions of the faux wall portion) that are adapted to securely receive respective threaded ends of four respective table legs that are at least substantially equal in length. In particular embodiments, the faux wall portion may be selectively removed from the wall and the four table legs may be attached to the faux wall portion so that each of the table legs extends substantially perpendicular to the bottom side of the faux wall portion about a respective corner portion of the faux wall portion. The assembled table may then be placed upright so that the faux wall portion is supported by the four legs in a position in which the faux wall portion is at least substantially parallel to the ground. The faux wall portion may then be used as a tabletop.

Latching Mechanisms

As may be understood from FIGS. 27-37, in particular embodiments, the door panel 140A includes one or more attachment members 150A and one or more tabs 152A that are dimensioned and positioned to selectively secure the door panel 140A in place adjacent the access opening 130A so that the door panel 140A prevents unauthorized access into the multipurpose relocatable structure 100A through the access opening 130A. In various embodiments, for example, when positioned in this manner adjacent the access opening 130A, the door panel 140A may at least substantially cover the entire access opening 130A. In alternative embodiments, when positioned adjacent the access opening 130A, the door panel 140A may not entirely cover the access opening 130A, but any gaps between the door panel 140A and the perimeter of the access opening 130A may not be large enough for a human to pass through the gaps.

The attachment member 150A may be in the form of any sort of mechanism that is suitable to facilitate securely maintaining the door panel 140A in place relative to the access opening 130A so that the door panel 140A doesn't substantially move relative to the access opening 130A during transport or use of the multipurpose relocatable structure 100A. Various examples of suitable attachment members 150A include horizontal- or vertical-handle toggle clamps, latch-type toggle clamps, or any other suitable attachment member 150A.

Figure 37:
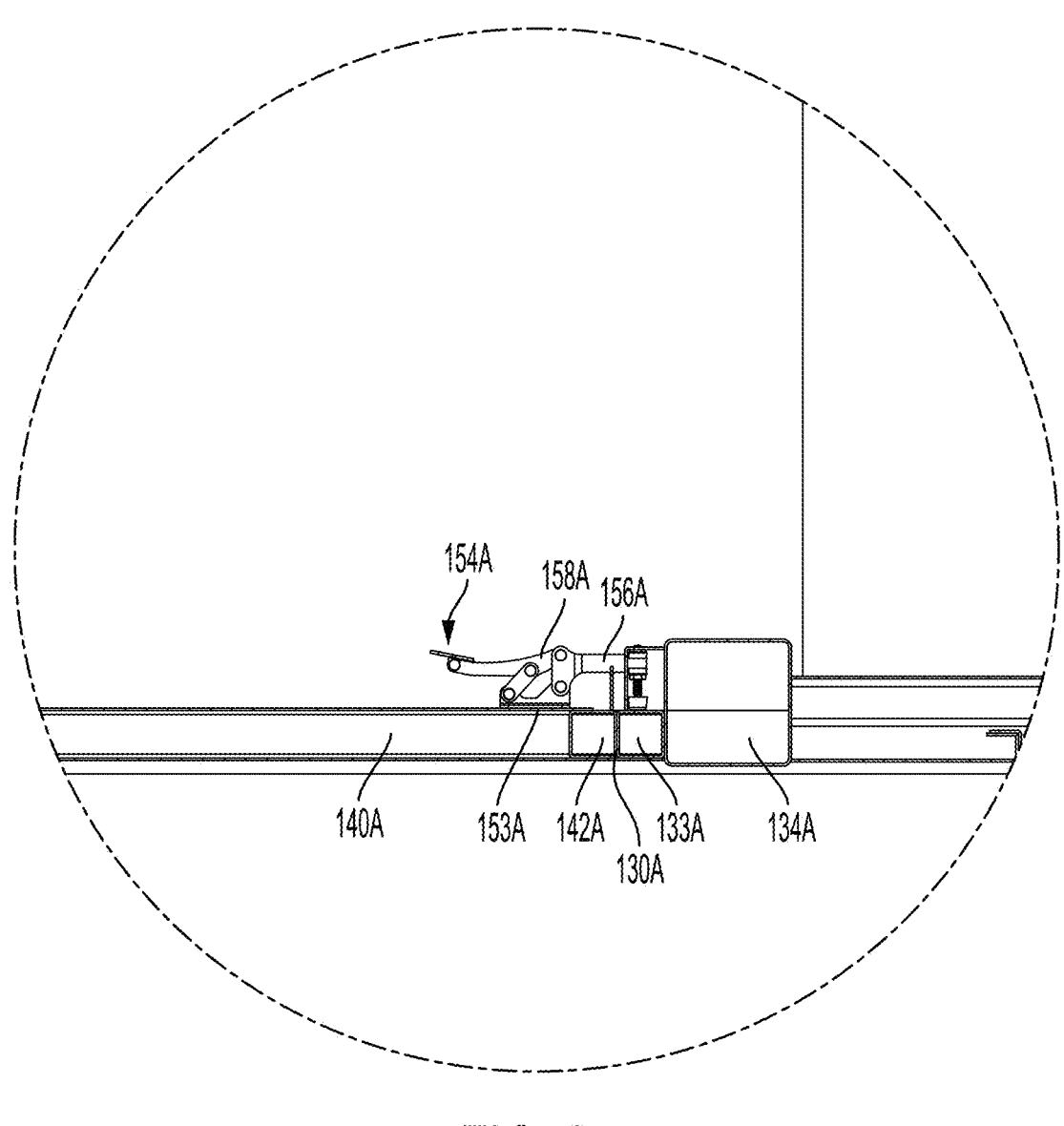
FIG. 37 is a detail view of an attachment member shown in FIG. 36.

FIG. 37 shows an attachment member 150A according to a particular embodiment. In this example, the attachment member 150A is a horizontal-handle toggle clamp having a base 153A (which is fastened—e.g., using screws or bolts—adjacent (e.g., to) the door panel 140A), a lever 154A, a connecting linkage 158A, and an arm 156A that is used to selectively maintain a clamping plate 159A in place adjacent an inner portion of a frame member 133A of the access opening 130A. In particular embodiments, a user may secure the door panel 140A in place by positioning the door panel 140A in an operable position adjacent the access opening 130A (e.g., as described above) and then pressing the lever 154A toward the door panel 140A. This causes the connecting linkage 158A to move the arm 156A and the clamping plate 159A toward the interior of the frame member 133A which thereby holds the door panel 140A in place relative to the access opening 130A. A user may release the attachment member 150A by moving the lever 154A away from the door panel 140A, which in turn moves the arm 156A away from the inner portion of the frame member 133A, which causes the connecting linkage 158A to disengage from the interior surface of the frame member 133A. Doing this for all of the various attachment members 150A on the door panel 140A causes the door panel 140A to release from adjacent the access opening 130A.

As noted above, each door panel 140A may include a plurality of attachment members 150A to help secure the door panel 140A in place adjacent the access opening 130A. In particular embodiments, as shown in FIG. 30, the plurality of attachment members 150A are distributed substantially evenly about the perimeter of the door panel 140A in order to apply securing forces substantially uniformly about the perimeter of the door panel 140A. This may, for example, help prevent an individual from prying the door panel 140A off of the multipurpose relocatable structure 100A to gain unauthorized access to the interior of the multipurpose relocatable structure 100A. As shown in FIG.

30, in particular embodiments, the door panel 140A includes a first plurality of attachment members 150A that are spaced substantially vertically and substantially equally apart adjacent the door panel's 140A right lateral side, and a second plurality of attachment members 150A that are spaced substantially vertically and substantially equally apart adjacent the door panel 140A's left lateral side. In various embodiments, such as the embodiment of FIG. 30, each of the plurality of attachment members 150A on the right lateral side of the door panel 140A at least substantially vertically aligns with a corresponding attachment member 150A on the left lateral side of the door panel 140A. As also shown in FIG. 30, the door panel 140A may include one or more (e.g., two or three) attachment member 150A's adjacent its upper perimeter to help secure the door panel 140A in place adjacent the access opening 130A.

Electrical and Data Connectivity

In various embodiments, at least one of the multipurpose relocatable structures 100A is configured with one or more electrical and/or data connectors that are selected, sized and dimensioned to allow for the multipurpose relocatable structure 100A to be connected to a second multipurpose relocatable structure 100A (e.g., a second multipurpose relocatable structure 100A that is positioned immediately adjacent to it) to facilitate the transfer of electricity and/or data between the two multipurpose relocatable structures 100A and in some embodiments, and/or from exterior sources. The transfer may either be one-way (in either direction) or two-way transfers of power and/or data. Such electrical and/or data connectors may include, for example, suitable electrical cables and/or data cables such as cabling used to facilitate communications within a local area network (LAN). Suitable data connectors may include, for example, Cat5 or Cat6 ethernet cables. In other embodiments, one or more of the multipurpose relocatable structures 100A may include wireless communications hardware (e.g., one or more suitable wireless routers) for facilitating communications with one or more nearby (e.g., adjacent) multipurpose relocatable structures 100A.

In particular embodiments, the above configuration may allow for multiple multipurpose relocatable structures 100A to obtain power or data via a single power and/or wired or wireless data source. For example, when setting up multiple multipurpose relocatable structures 100A, a user may plug a first multipurpose relocatable structure 100A into an external power source, and use an electrical connector from the first multipurpose relocatable structure 100A to electrically connect the first multipurpose relocatable structure 100A to a second multipurpose relocatable structure 100A (e.g., via a suitable electrical connector on or in the second multipurpose relocatable structure 100A). In this configuration, power may, for example, flow from the power source, to the first multipurpose relocatable structure 100A, and then from the first multipurpose relocatable structure 100A, through the electrical connector and into the second multipurpose relocatable structure 100A.

A similar approach may be used to attach the first multipurpose relocatable structure 100A to an external data source (e.g., a modem providing connectivity to a wide area network or other network such as the Internet), and then to use a data connector to connect the first multipurpose relocatable structure 100A to a second multipurpose relocatable structure 100A to provide data communications between the data source, the first multipurpose relocatable structure 100A and the second multipurpose relocatable structure 100A.

Similarly, the second multipurpose relocatable structure 100A may be connected via suitable electrical and/or data connectors to establish electrical and/or data communications with a third multipurpose relocatable structure 100A so that power and data passes from the first multipurpose relocatable structure 100A to the second multipurpose relocatable structure 100A and then to the third multipurpose relocatable structure 100A. In this arrangement, the second multipurpose relocatable structure 100A may be attached to the first multipurpose relocatable structure 100A on its first lateral side and to the third multipurpose relocatable structure 100A on its second lateral side so that the second multipurpose relocatable structure 100A is essentially sandwiched between the first and third multipurpose relocatable structures 100A. It should be understood that the same techniques may be used to power or transmit data to/from four our more multipurpose relocatable structures 100A.

In particular embodiments, the above techniques may be used to establish electrical and/or data connections between any number of adjacent multipurpose relocatable structures 100A. Such connections may be made in series or in parallel. As noted above, one or more of the multipurpose relocatable structures 100A may alternatively or in addition be configured for wireless data communications (and/or power transfer) between each other.

In particular embodiments, rather than electrically connecting the multipurpose relocatable structure 100A together in series, one or more (e.g., some or all) of the units may be connected directly to an external power source for purposes of simplicity. In various embodiments, the data connectors in each multipurpose relocatable structure 100A are suitable for connecting at least 8 (e.g., at least 9, 10, 11, 12 or more) computers to a LAN.

Positioning and Use of Laterally Combinable Multipurpose Relocatable Structures

Having discussed the structure of the laterally combinable multipurpose relocatable structures 100A, the positioning and use of the structures will now be discussed. In various embodiments, because the respective access openings 130A on the lateral sides of the multipurpose relocatable structures 100A are in the same location relative to the front and rear ends 101A, 103A of the respective multipurpose relocatable structures 100A (e.g., the same distance from the front and rear ends 101A, 103A—e.g., the access openings 103A are at least substantially laterally centered between the front and rear ends 101A, 103A), it is possible to combine any number of the laterally combinable multipurpose relocatable structures to form larger working structures.

Figure 38:
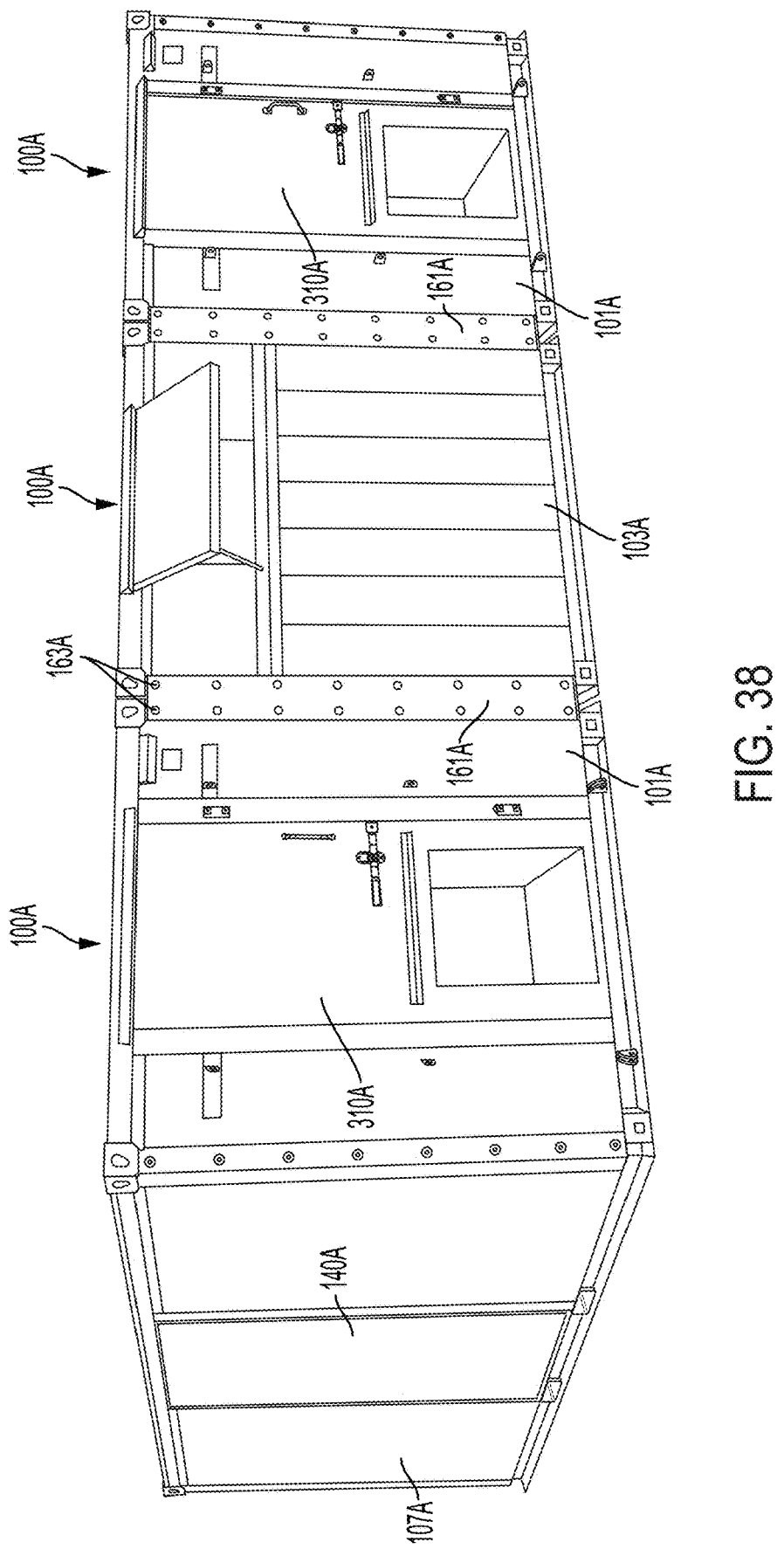
FIG. 38 is a perspective view of three multipurpose relocatable structures 100A where the multipurpose relocatable structures 100A are shown with their front and/or rear sides aligned, and the multipurpose relocatable structures 100A are attached laterally together so that a respective lateral side of each "end" multipurpose relocatable structure 100A abuts a respective lateral side of the center multipurpose relocatable structure 100A. In this configuration, an adult human may pass between the multipurpose relocatable structures 100A through the multipurpose relocatable structures' 100A respective side access openings.
Figure 39:
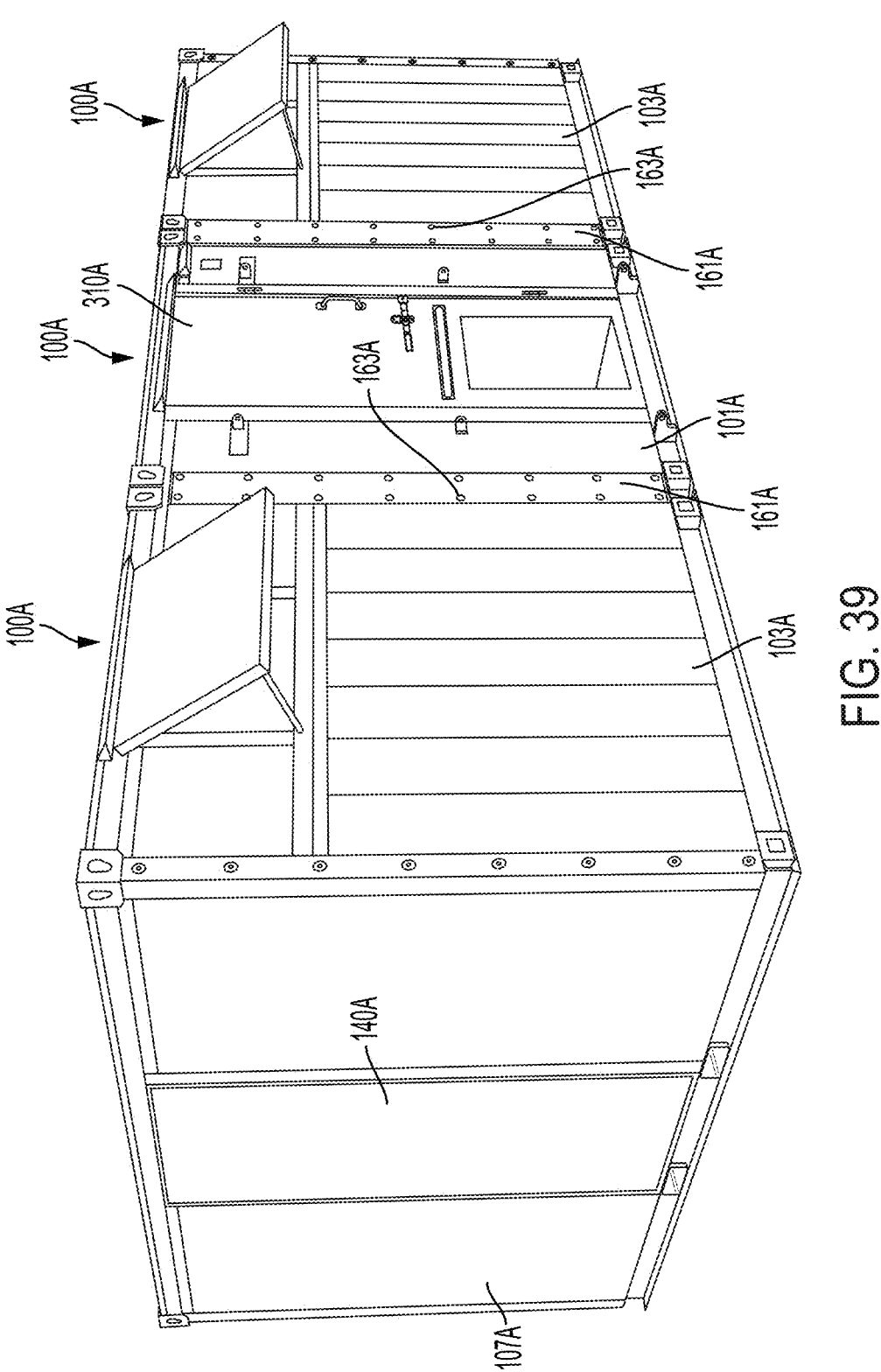
FIG. 39 is another perspective view of the multipurpose relocatable structures 100A of FIG. 38.
Figure 40:
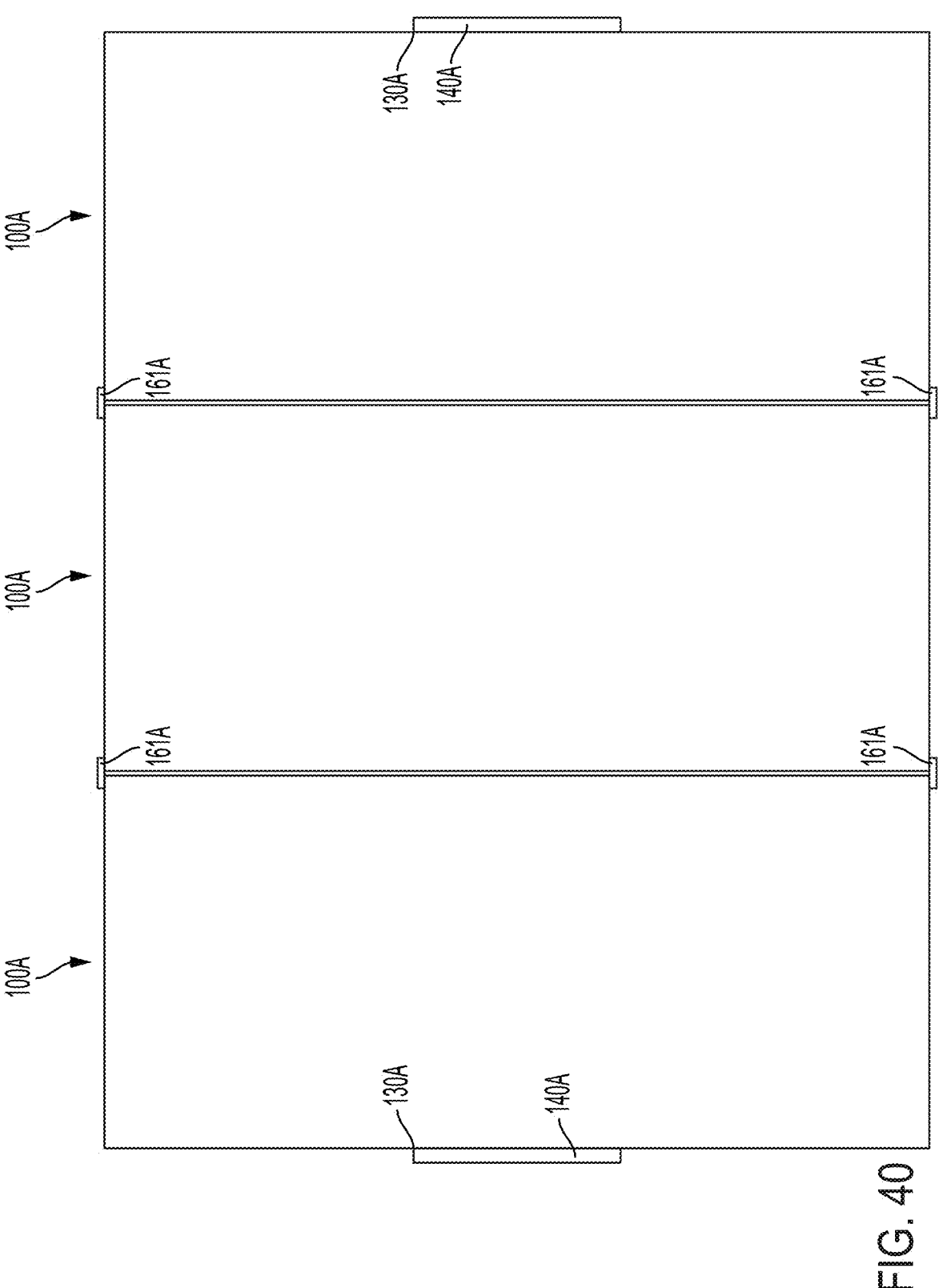
FIG. 40 is a top cross-sectional view of the multipurpose relocatable structures 100A of FIG. 38 taken about cross-section 40-40.
Figure 41:
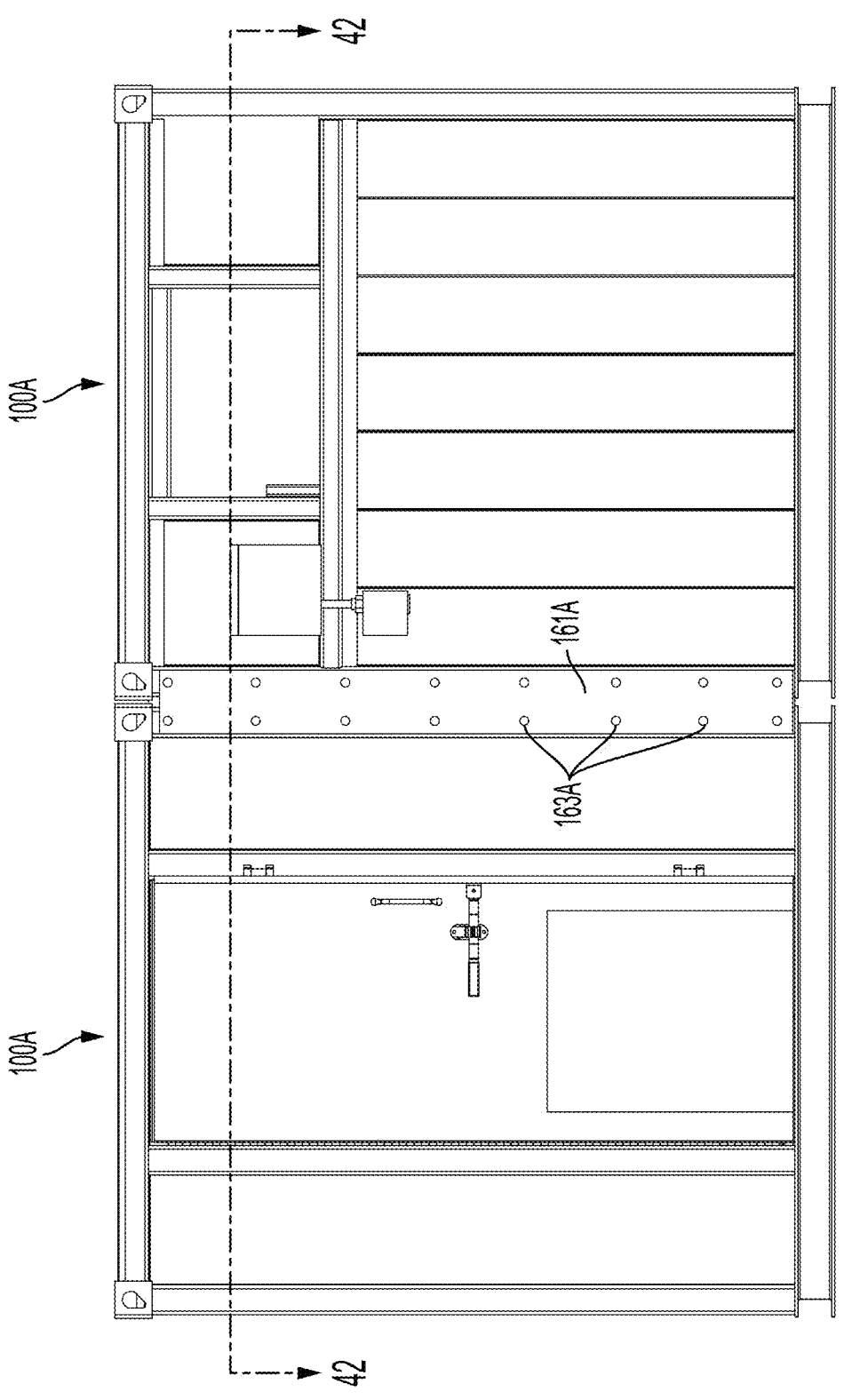
FIG. 41 is an elevation view of two multipurpose relocatable structures 100A that are secured together with metal plates 161A so that the multipurpose relocatable structures 100A are adjacent to and attached to one another.
Figure 42:
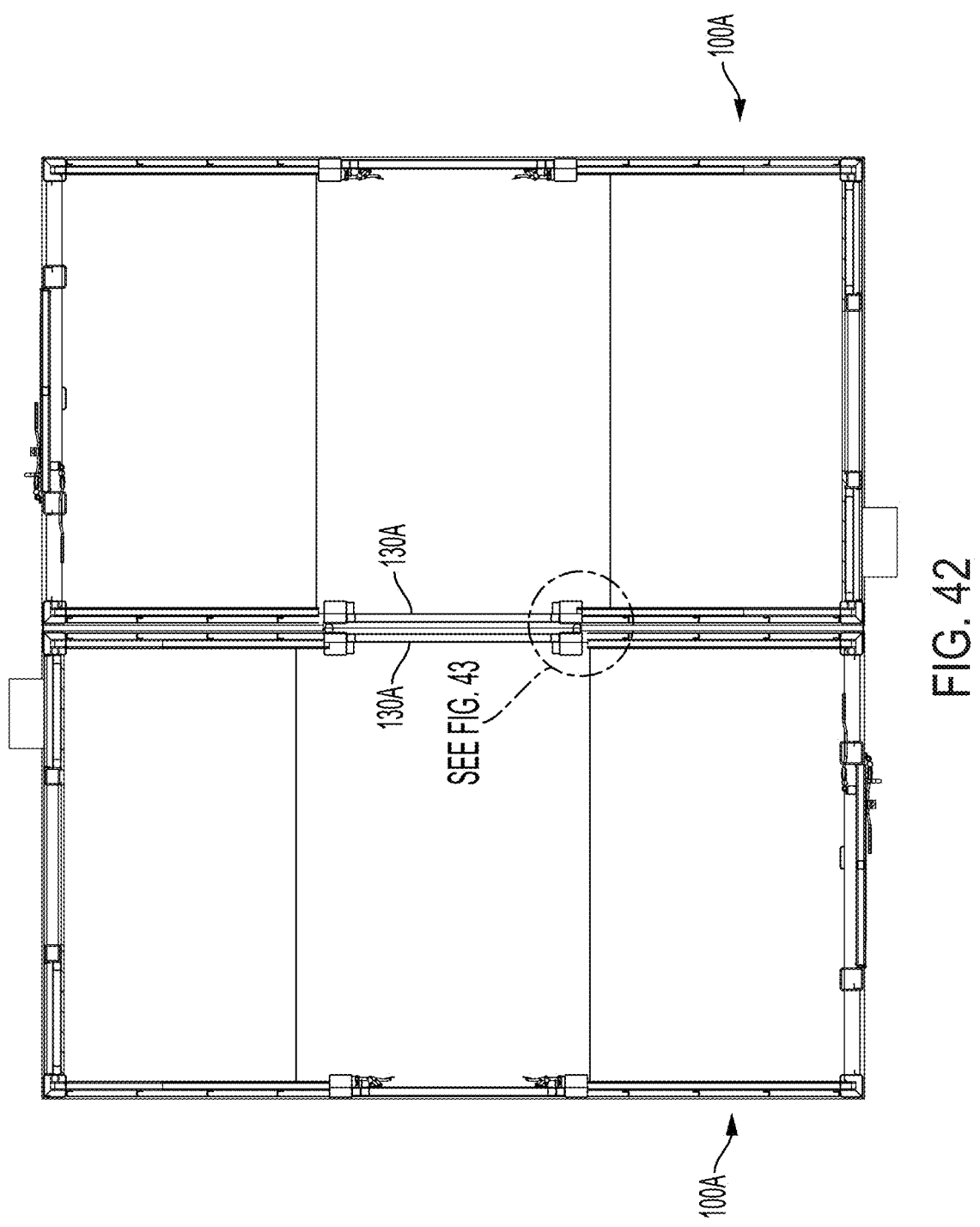
FIG. 42 is a cross-sectional plan view of the combined set of adjacent and attached multipurpose relocatable structures 100A of FIG. 41 taken about section 42-42.
Figure 43:
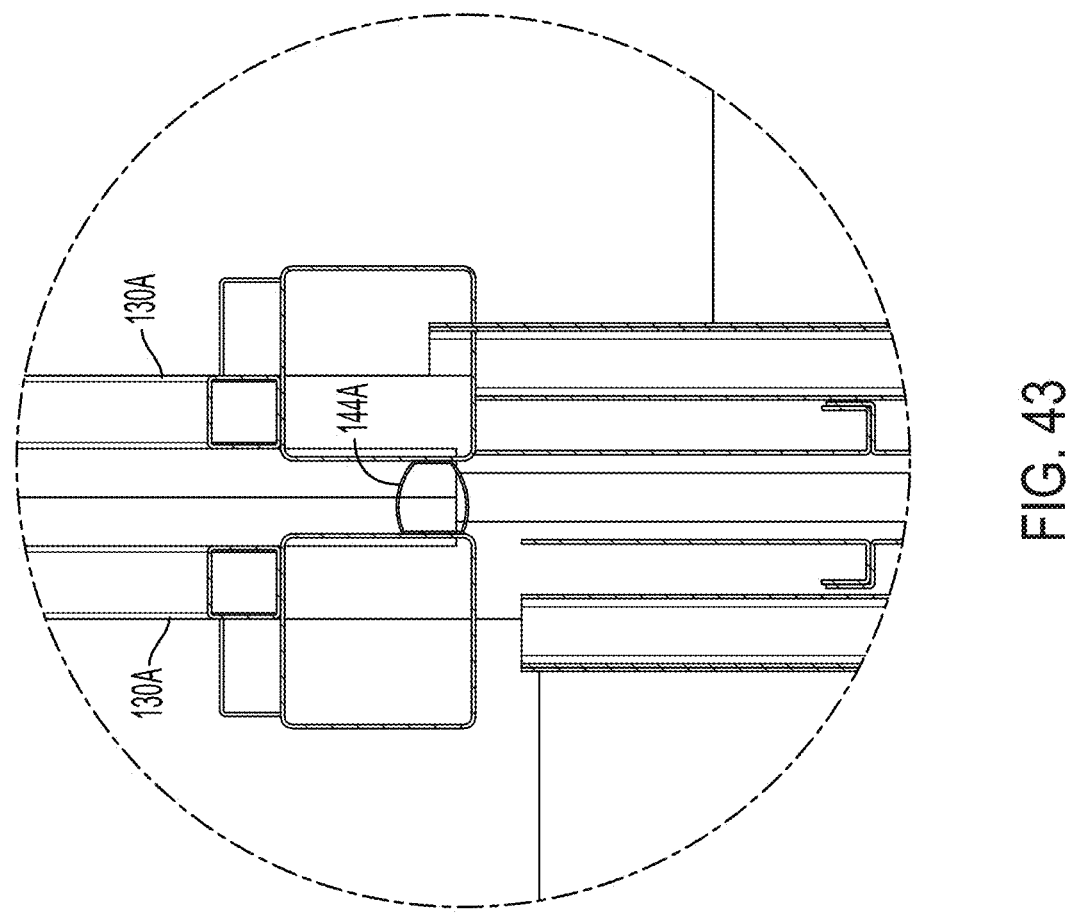
FIG. 43 is a detail view of the area circled in broken lines in FIG. 42 showing the orientation of weather stripping 144A between two adjacent and attached multipurpose relocatable structures 100A.
Figure 44:
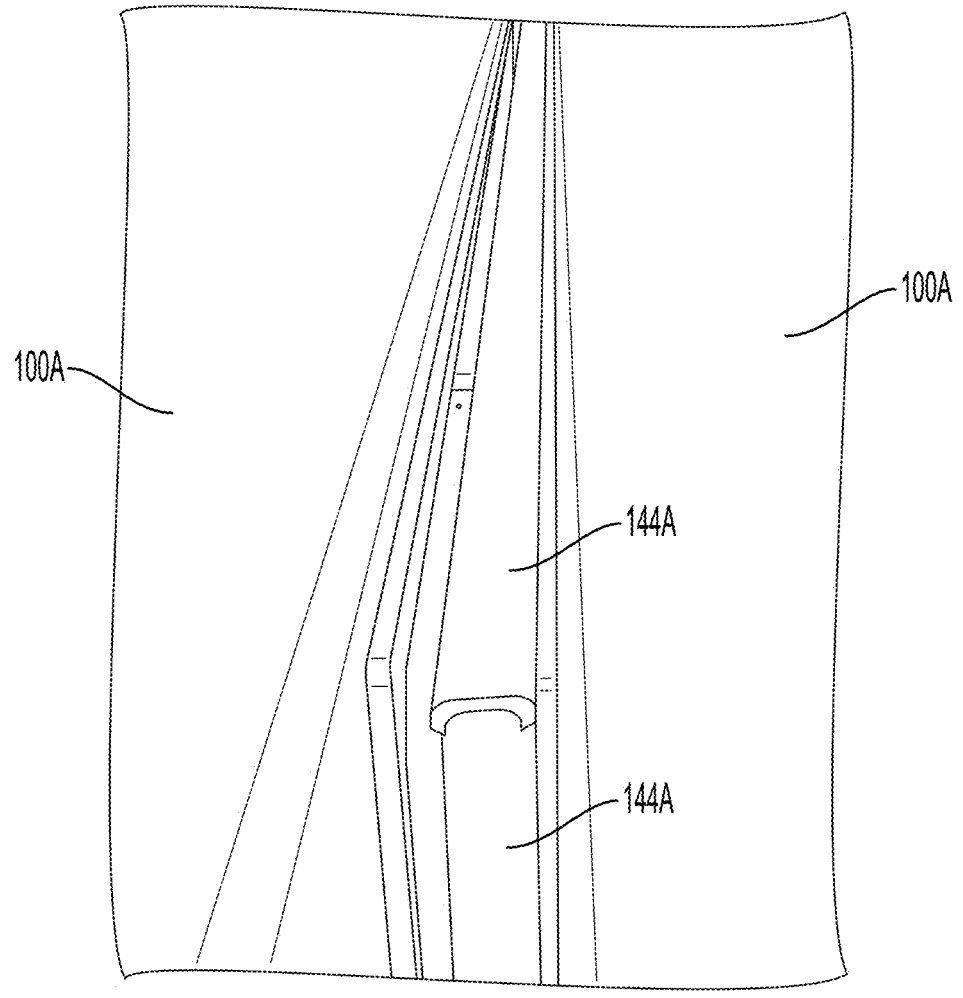
FIG. 44 is a perspective view of a top surface of two adjacent multipurpose relocatable structures in which weather stripping 144A is shown between two adjacent and attached multipurpose relocatable structures 100A.
Figure 45:
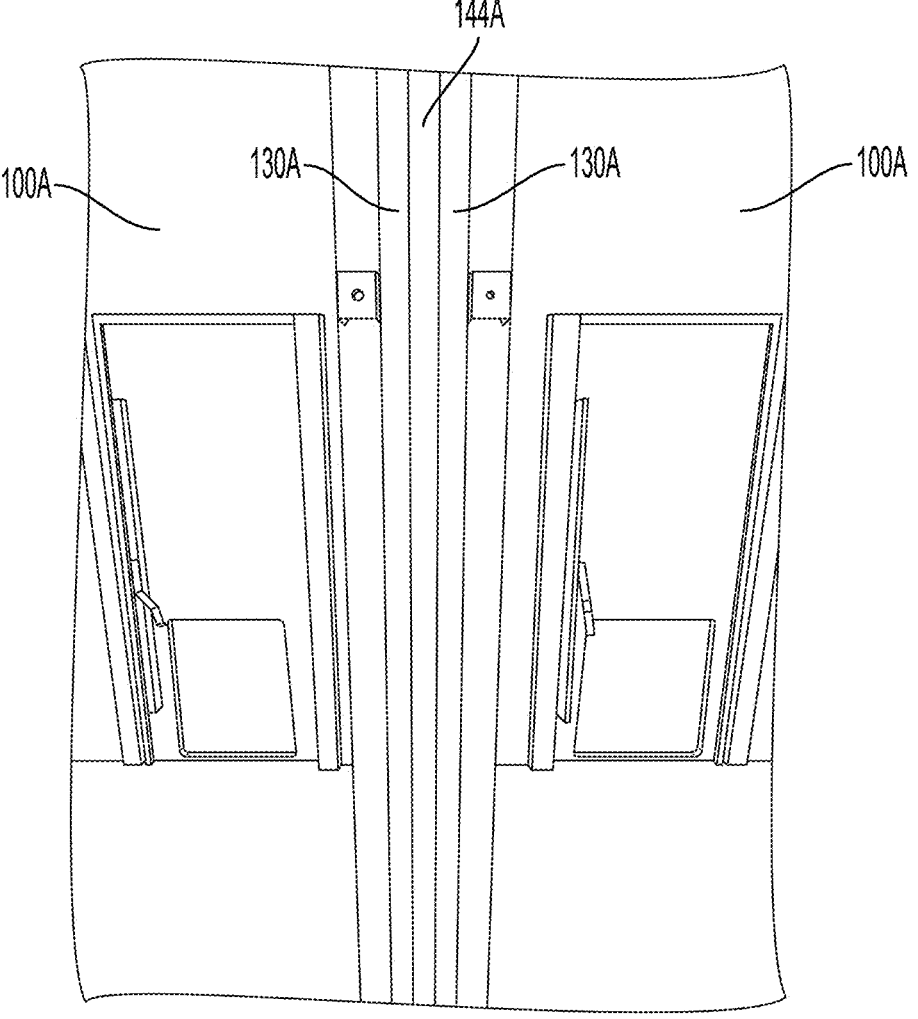
FIG. 45 is a perspective elevation view taken from within a door opening 130A between two adjacent and attached multipurpose relocatable structures 100A.
Figure 46:
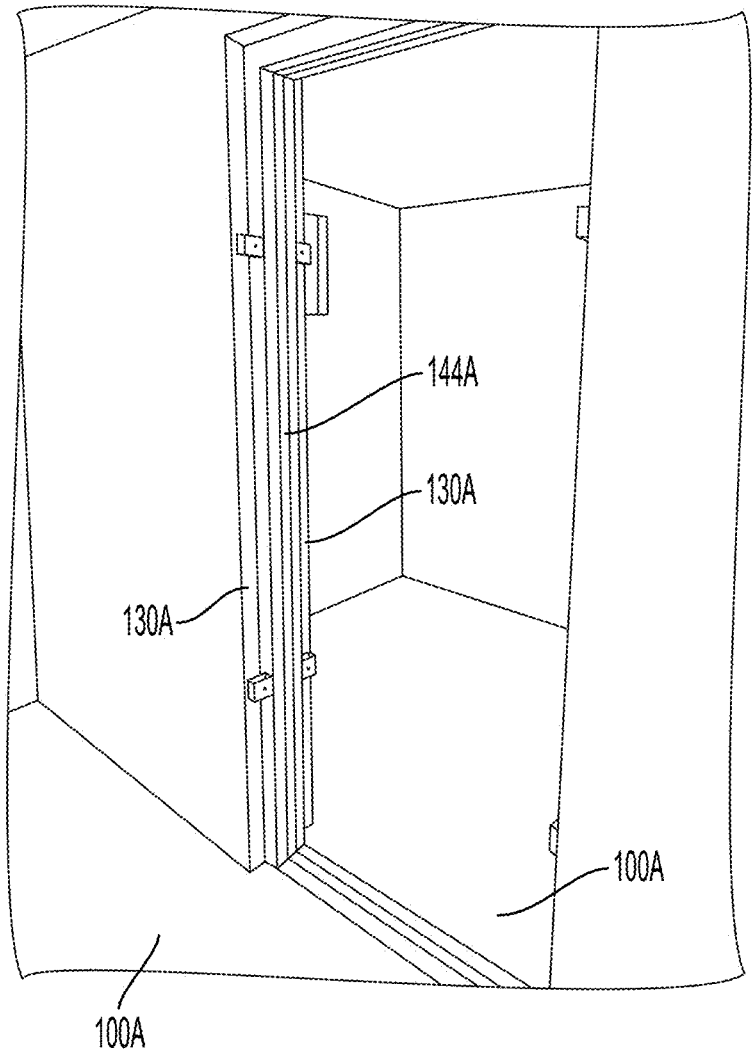
FIG. 46 is a perspective elevation view of a door opening 130A between two adjacent and attached multipurpose relocatable structures 100A.
Figure 47:
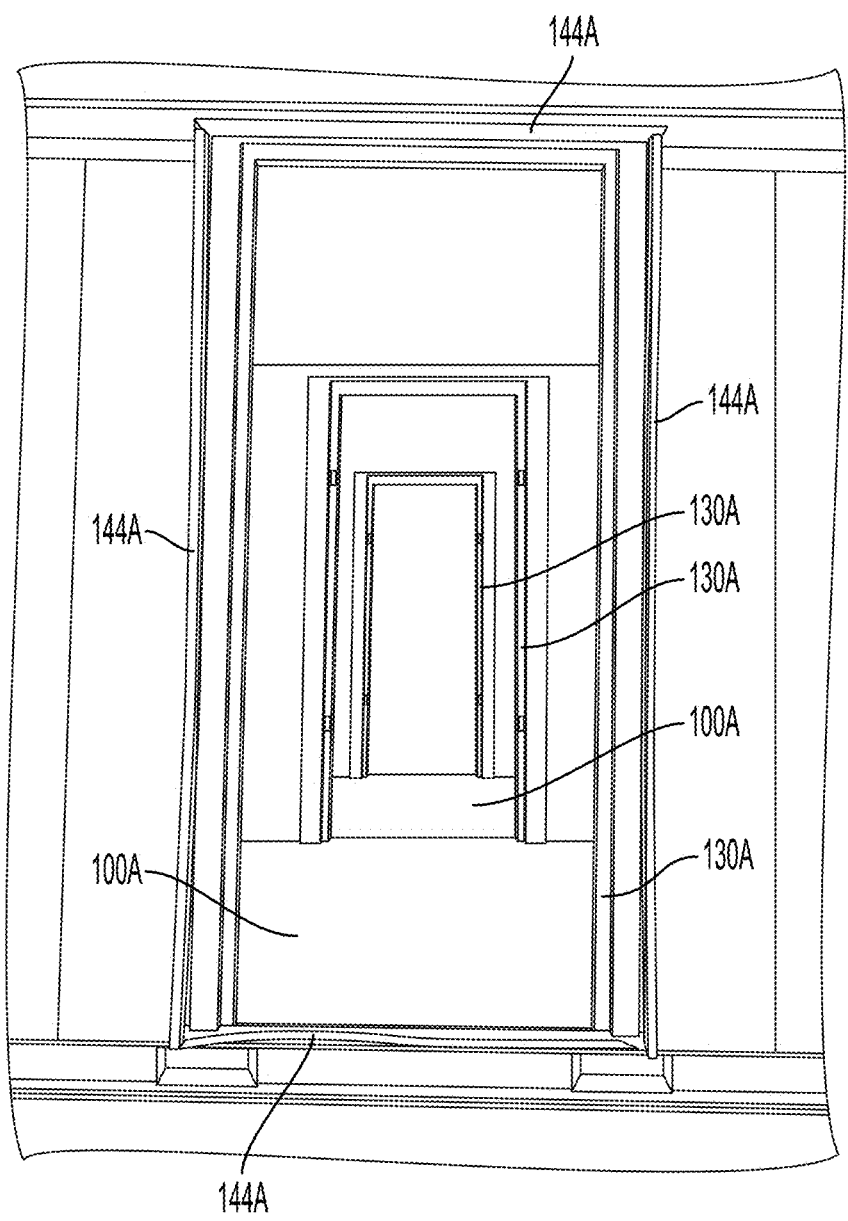
FIG. 47 is a perspective elevation view looking through three aligned door openings 130A within respective walls of two adjacent and attached multipurpose relocatable structures 100A.

FIGS. 38-40 show an example of a combined structure that includes three laterally-combinable multipurpose relocatable structures. As shown in FIG. 38, in this embodiment, the three multipurpose relocatable structures 100A are aligned so that their end walls 101A, 103A are in alignment and so that the three multipurpose relocatable structures 100A are laterally spaced so that there are no gaps or only relatively small gaps between the respective multipurpose relocatable structures 100A. In this arrangement, the three multipurpose relocatable structures 100A are aligned so that the respective door openings 130A of adjacent multipurpose relocatable structures 100A are aligned and co-facing each other so that they define a combined door opening through which an adult human may pass between the adjacent multipurpose relocatable structures as discussed above.

FIGS. 41-47 show how weather stripping material 144A may be used to at least substantially (e.g., entirely) surround each respective door opening 130A on an exterior surface of respective adjacent and/or attached multipurpose relocatable structures 100A adjacent each respective door opening 130A so that an at least substantially weatherproof (e.g., water and/or air tight) barrier is formed around adjacent, co-facing door openings 130A of adjacent and attached multipurpose relocatable structures 100A (in this case, two adjacent and attached multipurpose relocatable structures 100A are shown).

In various embodiments, such as the embodiment shown in FIG. 38, the multipurpose relocatable structures 100A are attached together so that they maintain a fixed orientation relative to each other. For example, in the embodiment shown in FIG. 38, the multipurpose relocatable structures 100A are attached together at their ends by plates 161A (e.g., metal plates) that extend laterally over the gaps between the multipurpose relocatable structures 100A. The plates 161A are secured in place by suitable fasteners that are located on both sides of the gap between the multipurpose relocatable structures 100A. For example, in the embodiment shown in FIG. 38, the plates 161A are secured in place on each side of the gap by a vertical array of bolts 163A that each extend into an end wall of one of the multipurpose relocatable structures 100A to hold the plate 161A in place. In particular embodiments, such plates may also be used in a horizontal orientation to secure the respective top portions of two adjacent multipurpose relocatable structures 100A together.

In particular embodiments, each of the multipurpose relocatable structures 100A are configured so that they may be attached in either a front-forward or a rear-forward orientation. For example, in the example of FIG. 38, the two "end" multipurpose relocatable structures 100A are attached to a central multipurpose relocatable structure 100A so that the "end" multipurpose relocatable structures 100A are in a front-forward orientation, and so that the central multipurpose relocatable structure 100A is in a rear-forward orientation. This feature allows for flexibility in configuring the combined structure.

As noted above, in particular embodiments, any number of multipurpose relocatable structures 100A (for example, 2-100 or more of the multipurpose relocatable structures 100A) may be combined to form a larger, combined structure. For example, two multipurpose relocatable structures 100A may be combined as described above to form a double-wide structure, three multipurpose relocatable structures 100A may be combined as described above to form a triple-wide structure (see FIG. 38), and four multipurpose relocatable structures 100A may be combined as described above to form a quadruple-wide structure.

It should be understood that multipurpose relocatable structures according to various embodiments may take the form of any number of alternative configurations. For example, while particular examples are described above as having a single, centrally located side access opening 130A to facilitate laterally combining the multipurpose relocatable 100A with multipurpose relocatable structures 100A having a similar or the same structure, other embodiments may have multiple side access openings 130A, or may have a single side opening in a location other than the middle of the sides.

In a particular alternative embodiment, the multipurpose relocatable structure has two side access openings on each of its lateral sides (e.g., of a similar or same size and shape as described above in conjunction with the multipurpose relocatable structure 100A of FIGS. 23-37). In this embodiment, a first of the side access openings may be spaced a first lateral distance from the front side of the multipurpose relocatable structure on a first lateral side of the multipurpose relocatable structure, and a second of the side access openings may be spaced a second distance from the front side of the multipurpose relocatable structure on the first lateral side of the multipurpose relocatable structure. In particular embodiments, the lateral distance between the front end of the multipurpose relocatable structure and the lateral midpoint of the first side access opening is at least substantially the same (e.g., the same) as the lateral distance between the rear end of the multipurpose relocatable structure and the lateral midpoint of the second side access opening. This arrangement of two side access openings may be repeated on the multipurpose relocatable structure's second side. In various embodiments, this arrangement allows the multipurpose relocatable structure to be laterally aligned with (e.g., and attached to) similarly (e.g., the same) structured multipurpose relocatable structures as described above so that the respective access openings on respective co-facing lateral sides of the multipurpose relocatable structures align to permit passage of adult individuals between the different containers through the access openings. In particular embodiments, as was the case in regard to the multipurpose relocatable structures shown in FIG. 23, two adjacent multipurpose relocatable structures may be aligned so that either: (1) their front walls are adjacent to and aligned with one another; or (2) a front wall of one multipurpose relocatable structure is adjacent and aligned with the rear wall of the other multipurpose relocatable structure, and so that, in either orientation, their respective access openings on respective co-facing lateral walls still align. It should be understood that alternative embodiments may include different numbers of side access openings (e.g., 3 or 4 access openings per side) and that the access openings may be suitably positioned to align with corresponding access openings of other multipurpose relocatable structures (in either of the two noted orientations) as described above.

As discussed above, as part of the process of positioning and/or connecting the multipurpose relocatable structures 100A for use, one or more of the various multipurpose relocatable structures 100A may be connected to a suitable external power and/or data source and the multipurpose relocatable structures 100A may be connected together (e.g., as discussed above) to facilitate the transfer of electricity and/or data between one or more of (e.g., all of) the multipurpose relocatable structures 100A that make up a particular unified structure (and/or other nearby multipurpose relocatable structure 100A).

CONCLUSION

Many modifications and other embodiments of the disclosure will come to mind to one skilled in the art to which this disclosure pertains having the benefit of the teachings presented in the foregoing descriptions and the associated drawings. For example, as will be understood by one skilled in the relevant field in light of this disclosure, the embodiments may take form in a variety of different mechanical and operational configurations. As a particular example, while the selection of the access opening positions on the multipurpose relocatable structures' lateral walls are described above as facilitating attachment of the various multipurpose relocatable structures together so that the respective front and/or rear walls are at least substantially aligned in a plane, in other embodiments, the respective access opening positions may be selected so that the multipurpose relocatable structures 100A are attached together in a staggered arrangement in which the front and/or rear walls of immediately adjacent multipurpose relocatable structures don't align in a single plane. Therefore, it is to be understood that the disclosure is not to be limited to the specific embodiments disclosed herein, and that the modifications and other embodiments are intended to be included within the scope of the appended exemplary concepts. Although specific terms are employed herein, they are used in a generic and descriptive sense only and not for the purposes of limitation.

What is claimed is:

1. A multipurpose relocatable structure, comprising:
a floor;
a framework secured adjacent the floor;
at least one ceiling pan secured adjacent the framework; and
a plurality of walls secured adjacent the framework, wherein:
the multipurpose relocatable structure is substantially in the shape of an elongated rectangular prism having a length that is greater than its width;
the plurality of walls comprise a first lateral side wall and a second lateral side wall, the first and second lateral side walls being disposed so that they are co-facing and at least substantially parallel to and spaced apart from each other,
the first lateral side wall comprises a first access opening that is sized to permit an adult human to walk through the first access opening in an upright orientation,
the second lateral side wall comprises a second access opening that is sized to permit an adult human to walk through the second access opening in an upright orientation, and
the first and second access openings are co-facing and spaced apart from each other, wherein:
the access openings are substantially rectangular; and the multipurpose relocatable structure further comprises,
a first panel that is configured and dimensioned to be used to selectively cover the first access opening while the multipurpose relocatable structure is in transit; and
a second panel that is configured and dimensioned to be used to selectively cover the second access opening while the multipurpose relocatable structure is in transit.

2. The multipurpose relocatable structure of claim 1, wherein the first panel is adapted to be converted to a table or desktop.

3. The multipurpose relocatable structure of claim 1, further comprising:
a first plurality of fasteners that are positioned and configured to selectively secure the first panel in place adjacent the first opening so that the first panel covers the first opening while the multipurpose relocatable structure is in transit; and
a second plurality of fasteners that are positioned and configured to selectively secure the second panel in place adjacent the second opening so that the second panel covers the second opening while the multipurpose relocatable structure is in transit.

4. The multipurpose relocatable structure of claim 3, wherein:
a first plurality of fasteners are disposed on the first panel; and
a second plurality of fasteners are disposed on the second panel.

5. The multipurpose relocatable structure of claim 1, wherein:
the multipurpose relocatable structure is a first multipurpose relocatable structure that is adapted to cooperate with a second multipurpose relocatable structure of claim 1 to form a combined, at least double-wide, multipurpose relocatable structure in which an adult human may pass between the first multipurpose relocatable structure and the second multipurpose relocatable structure via a combined access opening defined by the first access opening of the first multipurpose relocatable structure and the second access opening of the second multipurpose relocatable structure.

6. The multipurpose relocatable structure of claim 5, wherein:
the first multipurpose relocatable structure and second multipurpose relocatable structure are dimensioned so that, when the first multipurpose relocatable structure is operatively positioned adjacent the second multipurpose relocatable structure so that its first side wall abuts the second side wall of the second multipurpose structure and the respective lateral ends of the first multipurpose relocatable structure's first side wall and the second multipurpose relocatable structure's second side wall are aligned, the first access opening of the first multipurpose relocatable structure aligns with the second access opening of the second multipurpose structure.

7. The multipurpose relocatable structure of claim 6, wherein when the first multipurpose relocatable structure is operatively positioned adjacent the second multipurpose relocatable structure:
the first access opening of the first multipurpose relocatable structure is at least substantially longitudinally centered on the first side wall of the first multipurpose relocatable structure; and
the second access opening of the second multipurpose relocatable structure is at least substantially longitudinally centered on the second side wall of the second multipurpose relocatable structure.

8. The multipurpose relocatable structure of claim 7, wherein when the first multipurpose relocatable structure is operatively positioned adjacent the second multipurpose relocatable structure:
the second access opening of the first multipurpose relocatable structure is at least substantially longitudinally centered on the second side wall of the first multipurpose relocatable structure; and
the first access opening of the second multipurpose relocatable structure is at least substantially longitudinally centered on the first side wall of the second multipurpose relocatable structure.

9. The multipurpose relocatable structure of claim 8, wherein:
the first and second access openings of the first multipurpose relocatable structure are substantially rectangular; and
the first and second access openings of the second multipurpose relocatable structure are substantially rectangular.

10. The multipurpose relocatable structure of claim 5, wherein:
the first multipurpose relocatable structure comprises weatherstripping adjacent at least one of its access openings that is sufficient to provide a substantially weatherproof seal between respective access openings of the first multipurpose relocatable structure and the second relocatable structure when the first relocatable structure is operatively positioned adjacent the second relocatable structure.

11. The multipurpose relocatable structure of claim 10, wherein the weatherstripping extends at least substantially around an exterior portion of a particular access opening of the first multipurpose relocatable structure.

12. The multipurpose relocatable structure of claim 5, wherein:

the first multipurpose relocatable structure comprises one or more electrical connectors that are collectively configured for establishing electrical connections between the first multipurpose relocatable structure and an external power source, and between the first relocatable structure and the second multipurpose relocatable structure when the first relocatable structure is operatively positioned adjacent the second relocatable structure.

13. The multipurpose relocatable structure of claim 5, wherein:

the first multipurpose relocatable structure comprises one or more data connectors that are collectively configured for establishing data connections between the first multipurpose relocatable structure and an external power source, and between the first relocatable structure and the second multipurpose relocatable structure.

14. The multipurpose relocatable structure of claim 1, wherein:

the multipurpose relocatable structure is a first multipurpose relocatable structure that is adapted to cooperate with both a second multipurpose relocatable structure of claim 1 and a third multipurpose structure of claim 1 to form a combined, at least triple-wide, multipurpose relocatable structure in which an adult human may selectively pass between: (1) the first multipurpose relocatable structure and the second multipurpose relocatable structure via a combined access opening defined by the second access opening of the first multipurpose relocatable structure and the first access opening of the second multipurpose relocatable structure; and (2) the second multipurpose relocatable structure and the third multipurpose relocatable structure via a combined access opening defined by the second access opening of the second multipurpose relocatable structure and a first access opening of the third multipurpose relocatable structure.

15. A method of constructing a temporary relocatable structure comprising:

providing a first multipurpose relocatable structure comprising:

a floor;

a framework secured adjacent the floor;

a ceiling pan secured adjacent the framework; and a plurality of walls secured adjacent the framework, wherein:

the first multipurpose relocatable structure is substantially in the shape of an elongated rectangular prism having a length that is greater than its width;

the first multipurpose relocatable structure comprises a first lateral side wall and a second lateral side wall, the first and second lateral side walls of the first multipurpose relocatable structure being disposed so that they are co-facing and at least substantially parallel to and spaced apart from each other, the first lateral side wall of the first multipurpose relocatable structure comprises a first access opening that is sized to permit an adult human to walk through the first access opening of the first multipurpose relocatable structure in an upright orientation, the second lateral side wall of the first multipurpose relocatable structure comprises a second access opening that is sized to permit an adult human to walk through the second access opening of the first multipurpose relocatable structure in an upright orientation, and the first and second access openings of the first multipurpose relocatable structure are co-facing and spaced apart from each other; and providing a second multipurpose relocatable structure comprising:

a floor;

a framework secured adjacent the floor;

a ceiling pan secured adjacent the framework; and a plurality of walls secured adjacent the framework, wherein:

the second multipurpose relocatable structure is substantially in the shape of an elongated rectangular prism having a length that is greater than its width;

the second multipurpose relocatable structure comprises a first lateral side wall and a second lateral side wall, the first and second lateral side walls of the second multipurpose relocatable structure being disposed so that they are co-facing and at least substantially parallel to and spaced apart from each other, the first lateral side wall of the second multipurpose relocatable structure comprises a first access opening that is sized to permit an adult human to walk through the first access opening of the second multipurpose relocatable structure in an upright orientation, the second lateral side wall of the second multipurpose relocatable structure comprises a second access opening that is sized to permit an adult human to walk through the second access opening of the second multipurpose relocatable structure in an upright orientation, and the first and second access openings of the second multipurpose relocatable structure are co-facing and spaced apart from each other; and positioning the first multipurpose relocatable structure and the second multipurpose relocatable structure in a particular physical arrangement in which the first access opening of the first multipurpose relocatable structure is adjacent and at least substantially aligns with the second access opening of the second multipurpose relocatable structure, so that an adult human can pass between the first and second multipurpose relocatable structures through an opening that includes the second access opening of the first multipurpose relocatable structure and the first access opening of the second multipurpose relocatable structure; and fastening the first multipurpose relocatable structure and the second multipurpose relocatable structure together so that they are maintained in the particular physical arrangement, wherein the first multipurpose relocatable structure further comprises:

a first panel that is configured and dimensioned to be used to selectively cover the first opening while the multipurpose relocatable structure is in transit; and a second panel that is configured and dimensioned to be used to selectively cover the second opening while the multipurpose relocatable structure is in transit.

16. The method of claim 15, wherein the first multipurpose relocatable structure further comprises:

a first plurality of fasteners that are positioned and configured to selectively secure the first panel in place adjacent the first opening so that the first panel covers the first opening while the multipurpose relocatable structure is in transit; and a second plurality of fasteners that are positioned and configured to selectively secure the second panel in place adjacent the second opening so that the second panel covers the second opening while the multipurpose relocatable structure is in transit.

17. The method of claim 15, wherein:

the first access opening of the first multipurpose relocatable structure is at least substantially longitudinally centered on the first side wall of the first multipurpose relocatable structure; and the second access opening of the second multipurpose relocatable structure is at least substantially longitudinally centered on the second side wall of the second multipurpose relocatable structure.

18. The method of claim 17, wherein:

the second access opening of the first multipurpose relocatable structure is substantially longitudinally centered on the second side wall of the first multipurpose relocatable structure; and the first access opening of the second multipurpose relocatable structure is substantially longitudinally centered on the first side wall of the second multipurpose relocatable structure.

19. A multipurpose relocatable structure comprising:

a floor system;

a framework secured adjacent the floor system, the framework comprising:

a plurality of corner posts, a pair of upper end posts, a pair of upper side posts;

a ceiling pan secured adjacent the framework; and a plurality of walls secured adjacent the framework, wherein:

the multipurpose relocatable structure is substantially in the shape of an elongated rectangular prism having a length that is greater than its width;

the plurality of walls comprise a first lateral side wall and a second lateral side wall, the first and second lateral side walls being disposed so that they are co-facing and at least substantially parallel to and spaced apart from each other, the first lateral side wall comprises a first access opening that is sized to permit an adult human to walk through the first access opening in an upright orientation, the second lateral side wall comprises a second access opening that is sized to permit an adult human to walk through the second access opening in an upright orientation, and the first and second access openings are co-facing and spaced apart from each other.

20. The multipurpose relocatable structure of claim 19, wherein the floor system comprises:

a plurality of side beams;

a plurality of end beams;

a plurality of treadplate support members;

a plurality of perimeter treadplate support members; and a treadplate secured adjacent the plurality of treadplate support members and the plurality of perimeter treadplate support members, wherein the plurality of side beams and the plurality of end beams are configured in a substantially rectangular configuration, and wherein the plurality of perimeter treadplate support members and the plurality of treadplate support members are secured adjacent the plurality of side beams and the plurality of end beams.

21. The multipurpose relocatable structure of claim 19, further comprising:

a first panel that is configured and dimensioned to be used to selectively cover the first opening while the multipurpose relocatable structure is in transit; and a second panel that is configured and dimensioned to be used to selectively cover the second opening while the multipurpose relocatable structure is in transit.

22. The multipurpose relocatable structure of claim 21, further comprising:

a first plurality of fasteners that are positioned and configured to selectively secure the first panel in place adjacent the first opening so that the first panel covers the first opening while the multipurpose relocatable structure is in transit; and a second plurality of fasteners that are positioned and configured to selectively secure the second panel in place adjacent the second opening so that the second panel covers the second opening while the multipurpose relocatable structure is in transit.

23. The multipurpose relocatable structure of claim 19, wherein:

the multipurpose relocatable structure is a first multipurpose relocatable structure that is adapted to cooperate with a second multipurpose relocatable structure of claim 22 to form a combined, at least double-wide, multipurpose relocatable structure in which an adult human may pass between the first multipurpose relocatable structure and the second multipurpose relocatable structure via a combined access opening defined by the first access opening of the first multipurpose relocatable structure and the second access opening of the second multipurpose relocatable structure.

24. The multipurpose relocatable structure of claim 23, wherein the first multipurpose relocatable structure and second multipurpose relocatable structure are dimensioned so that, when the first multipurpose relocatable structure is operatively positioned adjacent the second multipurpose relocatable structure so that its first side wall abuts the second side wall of the second multipurpose structure and the respective lateral ends of the first multipurpose relocatable structure's first side wall and the second multipurpose relocatable structure's second side wall are aligned, the first access opening of the first multipurpose relocatable structure aligns with the second access opening of the second multipurpose structure.

25. The multipurpose relocatable structure of claim 23, wherein when the first multipurpose relocatable structure is operatively positioned adjacent the second multipurpose relocatable structure:

the first access opening of the first multipurpose relocatable structure is at least substantially longitudinally centered on the first side wall of the first multipurpose relocatable structure; and the second access opening of the second multipurpose relocatable structure is at least substantially longitudinally centered on the second side wall of the second multipurpose relocatable structure.

* * * * *